US012612238B2

(12) United States Patent
Mather et al.

(10) Patent No.: US 12,612,238 B2
(45) **Date of Patent: *Apr. 28, 2026**

(54) DOUBLE NOZZLE OVERCAP ASSEMBLY

(71) Applicant: S. C. JOHNSON & SON, INC., Racine, WI (US)

(72) Inventors: David P. Mather, South Milwaukee, WI (US); Ngoc Pham, Kenosha, WI (US)

(73) Assignee: S. C. JOHNSON & SON, INC., Racine, WI (US)

( * ) Notice: Subject to any disclaimer, the term of this patent is extended or adjusted under 35 U.S.C. 154(b) by 318 days.

This patent is subject to a terminal disclaimer.

(21) Appl. No.: 18/242,093

(22) Filed: Sep. 5, 2023

(65) Prior Publication Data

US 2023/0406605 A1 Dec. 21, 2023

Related U.S. Application Data

(63) Continuation of application No. 17/549,191, filed on Dec. 13, 2021, now Pat. No. 11,820,583.

(Continued)

(51) Int. Cl.
*B65D 83/206* (2025.01)
*B05B 1/14* (2006.01)

(52) U.S. Cl.
CPC .............. *B65D 83/206* (2013.01); *B05B 1/14* (2013.01)

(58) Field of Classification Search
CPC ................................ B65D 83/206; B05B 1/14

(Continued)

(56) References Cited

U.S. PATENT DOCUMENTS 3,373,908 A 3/1968 Crowell
3,406,913 A * 10/1968 Frangos ................ B65D 83/20 222/402.1

(Continued)

FOREIGN PATENT DOCUMENTS

BR PI0908091 A2 8/2015
BR PI0920849 A2 12/2015

(Continued)

OTHER PUBLICATIONS

International Search Report and Written Opinion for PCT/US2021/063215, dated May 13, 2022. (18 pages).

(Continued)

*Primary Examiner* — Paul R Durand
*Assistant Examiner* — Michael J. Melaragno
(74) *Attorney, Agent, or Firm* — Quarles & Brady LLP

(57) ABSTRACT

An overcap assembly includes an actuating button attached to and surrounded by the body. The actuating button has a fluid passageway therein, and the fluid passageway is configured to receive a fluid when the actuating button is depressed. The overcap assembly further includes a first nozzle and a second nozzle. The first nozzle extends from the actuating button and is in fluid communication with the fluid passageway. The first nozzle includes a first exit aperture. The second nozzle extends from the actuating button and is positioned below the first nozzle. The second nozzle is in fluid communication with the fluid passageway. The second nozzle includes a second exit aperture angled differently than the first exit aperture. The first nozzle and the second nozzle each comprise an inner cylindrical wall and an outer cylindrical wall surrounding and spaced apart from the inner cylindrical wall.

20 Claims, 40 Drawing Sheets

Related U.S. Application Data

(60) Provisional application No. 63/126,615, filed on Dec. 17, 2020.

(58) Field of Classification Search
USPC ....................................................... 222/402.1
See application file for complete search history.

(56) References Cited

U.S. PATENT DOCUMENTS 3,628,733 A * 12/1971 Kahn ..................... B65D 83/20 239/543
3,767,125 A * 10/1973 Gehres ................... B65D 83/20 239/600
4,132,333 A 1/1979 Debard
4,690,312 A 9/1987 Crapser et al.
4,805,839 A 2/1989 Malek
4,819,878 A 4/1989 Bailey et al.
5,249,747 A * 10/1993 Hanson ................ B65D 83/753 239/544
5,388,730 A 2/1995 Abbott et al.
5,392,961 A 2/1995 Starrett
5,456,414 A 10/1995 Burns et al.
5,516,045 A * 5/1996 Baudin ................. B05B 1/3436 239/543
5,735,465 A 4/1998 Laforcade
5,785,250 A * 7/1998 De Laforcade ...... B65D 83/303 222/402.1
5,848,750 A * 12/1998 Schwab .................... B05B 7/10 239/432
5,890,661 A * 4/1999 Crampton ........... B29C 45/2628 239/333
6,142,388 A 11/2000 Schwab
RE38,023 E 3/2003 De Laforcade
6,817,493 B1 * 11/2004 Parsons .................. B65D 83/20 222/402.1
D529,381 S 10/2006 Castillo Higareda et al.
D538,651 S 3/2007 Nukuto et al.
D542,377 S 5/2007 Jou
D564,876 S 3/2008 Nickel et al.
D574,237 S 8/2008 Yates, III
D575,152 S 8/2008 Costa
D576,874 S 9/2008 Miller et al.
D587,576 S 3/2009 Miller et al.
D625,998 S 10/2010 Claassen
8,191,801 B2 6/2012 Khan et al.
8,276,832 B2 10/2012 Nelson et al.
8,393,554 B2 3/2013 Yamamoto et al.
8,596,557 B2 12/2013 Yamamoto et al.
8,622,256 B2 1/2014 Campbell
D698,892 S 2/2014 Frost
D716,657 S 11/2014 Caneer
D721,275 S 1/2015 Thijssen et al.
9,113,698 B2 8/2015 Blain et al.
9,120,109 B2 9/2015 Ganan-Calvo et al.
9,205,618 B2 12/2015 Campbell
9,242,256 B2 1/2016 Clark et al.
9,435,120 B2 9/2016 Hanson et al.
9,456,710 B2 10/2016 Blain et al.
D772,706 S 11/2016 Zhang et al.
9,505,546 B2 11/2016 Arora et al.
9,511,381 B2 12/2016 Takahashi
9,511,926 B2 12/2016 Arora et al.
9,714,131 B2 7/2017 Arora et al.
9,776,786 B2 10/2017 Nuijen et al.
D812,717 S 3/2018 Crenshaw
D851,212 S 6/2019 Crenshaw
D858,696 S 9/2019 Crenshaw
D858,697 S 9/2019 Crenshaw
D863,502 S 10/2019 Hsieh
10,427,862 B2 10/2019 Clark et al.
D872,576 S 1/2020 Tomassetti et al.
D876,581 S 2/2020 Hsieh
D878,918 S 3/2020 Furner et al.
D897,203 S 9/2020 Furner et al.
D897,204 S 9/2020 Furner et al.
11,034,507 B2 6/2021 Spang, Jr. et al.
2003/0029931 A1 2/2003 Zanma et al.
2005/0224608 A1 * 10/2005 Khan ................. B65D 83/7532 239/548
2005/0284951 A1 12/2005 Clarke, III et al.
2008/0290113 A1 11/2008 Helf et al.
2009/0020621 A1 * 1/2009 Clark .................... B05B 1/3442 222/402.1
2011/0017781 A1 1/2011 Nelson et al.
2013/0284196 A1 10/2013 Murdock et al.
2017/0233171 A1 8/2017 Christianson et al.
2020/0062489 A1 2/2020 Spang, Jr
2020/0148456 A1 5/2020 Mashima
2021/0261320 A1 8/2021 Spang, Jr. et al.
2022/0194687 A1 6/2022 Mather et al.

FOREIGN PATENT DOCUMENTS

CA 134460 S 10/2010
CN 3486100 11/2005
CN 2801694 Y 8/2006
CN 1859984 A 11/2006
CN 3595887 1/2007
CN 1934013 A 3/2007
CN 3623439 3/2007
CN 300735423 1/2008
CN 300769227 4/2008
CN 300812469 8/2008
CN 300903735 4/2009
CN 100560220 C 11/2009
CN 101959402 B 8/2012
CN 102171111 B 5/2014
CN 302947869 S 9/2014
CN 302947871 S 9/2014
CN 102481589 B 10/2014
CN 302989931 S 11/2014
CN 303048971 S 12/2014
CN 303528871 S 12/2015
CN 303543561 S 1/2016
CN 105366214 A 3/2016
CN 303646369 S 4/2016
CN 102639247 B 6/2016
CN 103998352 B 11/2016
CN 103998351 B 3/2017
CN 103998353 B 3/2017
CN 305171318 S 5/2019
CN 305261321 S 7/2019
CN 305619992 S 2/2020
CN 111386227 A 7/2020
EM 000271515-0001 S 3/2005
EM 000391719-0009 S 10/2005
EM 000607494-0002 S 7/2008
EM 000883616-0001 S 7/2008
EM 000883616-0002 S 7/2008
EM 001611401-0001 S 7/2010
EM 002283291-0001 S 6/2014
EM 005839826-0001 S 6/2019
EM 005839826-0002 S 6/2019
EM 005839826-0003 S 6/2019
EM 005839826-0004 S 6/2019
EM 005839826-0005 S 6/2019
EP 0761312 A1 3/1997
EP 2245927 B1 10/2012
ES 2396581 T3 2/2013
HK 1152459 A1 12/2012
ID P000043756 B 12/2016
IN 321828 B 9/2019
JP 1990149359 A 6/1990
JP 2579192 B2 2/1997
JP 2888797 B2 5/1999
JP 2003040370 A 2/2003
JP 1278001 S 7/2006
JP 4365472 B2 11/2009
JP 1413520 S 5/2011
JP 1413523 S 5/2011
JP 4681146 B2 5/2011
JP 4947517 B2 6/2012
JP 5522945 B2 6/2014

(56) References Cited

FOREIGN PATENT DOCUMENTS

| | | | |
|---|---|---|---|
| JP | 5586157 | B2 | 9/2014 |
| JP | 1508346 | S | 10/2014 |
| JP | 5603422 | B2 | 10/2014 |
| JP | 2015507580 | A | 3/2015 |
| JP | 5721292 | B2 | 5/2015 |
| JP | 2015091266 | A | 5/2015 |
| JP | 2015513463 | A | 5/2015 |
| JP | 2015163529 | A | 9/2015 |
| JP | 5788805 | B2 | 10/2015 |
| JP | 6050830 | B2 | 12/2016 |
| JP | 6134332 | B2 | 5/2017 |
| JP | 6350996 | B2 | 7/2018 |
| JP | 6483445 | B2 | 3/2019 |
| JP | 6489669 | B1 | 3/2019 |
| JP | 1645749 | S | 11/2019 |
| JP | 1645796 | S | 11/2019 |
| JP | 1646411 | S | 11/2019 |
| KR | 200178794 | Y1 | 4/2000 |
| KR | 2020000017817 | U | 10/2000 |
| KR | 300399668 | S | 11/2005 |
| KR | 300490329 | S | 5/2008 |
| KR | 300490330 | S | 5/2008 |
| KR | 300490331 | S | 5/2008 |
| KR | 101035642 | B1 | 5/2011 |
| KR | 101122576 | B1 | 3/2012 |
| KR | 300664488 | S | 10/2012 |
| KR | 300664540 | S | 10/2012 |
| KR | 300867327 | S | 8/2016 |
| KR | 301018961-0001 | S | 8/2019 |
| KR | 301018961-0002 | S | 8/2019 |
| KR | 301018961-0003 | S | 8/2019 |
| KR | 301018961-0004 | S | 9/2019 |
| KR | 301018961-0005 | S | 9/2019 |
| KR | 301018961-0006 | S | 9/2019 |
| MX | 2010009116 | A | 9/2010 |
| MY | 159381 | A | 12/2016 |
| MY | 344945 | B | 1/2017 |
| PH | 12010501887 | B1 | 9/2015 |
| PH | 12015501325 | B1 | 3/2017 |
| TW | I444136 | B | 7/2014 |
| VN | 37628 | A | 4/2014 |
| VN | 10018408 | B | 3/2018 |
| WO | 9505546 | A1 | 2/1995 |
| WO | 9511381 | A1 | 4/1995 |
| WO | 9511926 | A1 | 5/1995 |
| WO | 9714131 | A1 | 4/1997 |
| WO | 2005021164 | A1 | 3/2005 |
| WO | 2005095230 | A1 | 10/2005 |
| WO | 2009107827 | A1 | 9/2009 |
| WO | 2010042431 | A1 | 4/2010 |
| WO | 2011011087 | A1 | 1/2011 |
| WO | 2011065413 | A1 | 6/2011 |
| WO | 2012025735 | A1 | 3/2012 |
| WO | 2013008913 | A1 | 1/2013 |
| WO | 2013023019 | A1 | 2/2013 |
| WO | 2015115085 | A1 | 8/2015 |
| WO | 2020090210 | A1 | 5/2020 |

OTHER PUBLICATIONS

"Raid Double Nozzle Multipurpose Insect Killer Odourless 320g." winc. We stand for work incorporated https://www.winc.com.au/main-catalogue-productdetail/raid-double-nozzle-multipurpose-insect-killer-odourless-320g/25028520, published Dec. 1, 2021, accessed May 16, 2022.

* cited by examiner

DOUBLE NOZZLE OVERCAP ASSEMBLY

CROSS REFERENCE TO RELATED APPLICATIONS

This application is a continuation of U.S. application Ser. No. 17/549,191, filed Dec. 13, 2021, which claims priority to U.S. Provisional Application No. 63/126,615, filed on Dec. 17, 2020, each of which is incorporated herein by reference in its entirety.

BACKGROUND OF THE INVENTION

1. Field of the Invention

The present invention relates generally to an overcap assembly including a body and an actuating button, and more particularly, to a double nozzle overcap assembly with spherical, curved, or angled exit apertures.

2. Description of the Background of the Invention

Pressurized containers are commonly used to store and dispense volatile materials, such as air fresheners, deodorants, insecticides, germicides, decongestants, perfumes, and the like. The volatile materials are typically stored in a pressurized and liquefied state within the container. The product is forced from the container through an aerosol valve by a hydrocarbon or non-hydrocarbon propellant. A release valve with an outwardly extending valve stem may be provided to facilitate the release of the volatile material at a top portion of the container, whereby activation of the valve via the valve stem causes volatile material to flow from the container through the valve stem and into the outside atmosphere. The release valve may typically be activated by tilting, depressing, or otherwise displacing the valve stem. A typical valve assembly includes a valve stem, a valve body, and a valve spring. The valve stem extends through a pedestal, wherein a distal end extends upwardly away from the pedestal and a proximal end is disposed within the valve body.

Pressurized containers frequently include an overcap assembly that covers a top end of the container. Typical overcap assemblies are releasably attached to the container by way of an outwardly protruding ridge, which circumscribes the interior lower edge of the overcap assembly and interacts with a bead or seam that circumscribes a top portion of the container. When the overcap assembly is placed onto the top portion of the container, downward pressure is applied to the overcap assembly, which causes the ridge to ride over an outer edge of the seam and lock under a ledge defined by a lower surface of the seam.

Typical overcap assemblies include a mechanism for engaging the valve stem of the container. Some actuator mechanisms may include linkages that apply downward pressure to depress the valve stem and open the valve within the container. Other actuating mechanisms may instead apply radial pressure where the container has a tilt-activated valve stem. In any case, these actuating mechanisms provide a relatively convenient and easy to use interface for end users.

Conventional actuating mechanisms include either an actuating button or an actuating trigger. Traditional actuating buttons may include a discharge orifice along a portion of the button, or at a separate location along a body or base of the overcap assembly. Regardless of the positioning of the discharge orifice, after actuation by a user, the volatile material typically travels through a fluid passageway. Portions defining the passageway typically engage the valve stem of an associated container. Thus, when dispensement is desired, a user may actuate the actuator by pressing down on it, which in turn depresses the valve stem and opens the valve within the associated container, thereby releasing the contents of the container through the fluid passageway and out of the discharge orifice.

In other containers, the valve stem is tilted or displaced in a direction transverse to the longitudinal axis to radially actuate the valve stem. When the valve assembly is opened, a pressure differential between the container interior and the atmosphere forces the contents of the container out through an orifice of the valve stem.

Conventional overcap assemblies can include one or more nozzles extending from the actuating button. Numerous problems can arise with prior art actuation systems utilizing multiple nozzles. In particular, many prior art actuation systems with multiple nozzles extending from the actuating button have warpage or deformation along the nozzles during use. Further, prior art actuation systems with multiple nozzles include bad fluid atomization and spray paths that collide with each other or that catch an outer wall of the nozzle and flow back, pooling in an area surrounding the nozzles. Furthermore, prior art actuation systems with multiple nozzles require complex manufacturing processes requiring difficult molding operations. These and other disadvantage of the prior art are overcome by the overcap assembly described hereinafter.

SUMMARY OF THE INVENTION

According to a first aspect, an overcap assembly comprises a body configured to attach to a container. The overcap assembly also comprises an actuating button attached to and surrounded by the body. The actuating button comprises a fluid passageway therein. The fluid passageway is configured to receive a fluid when the actuating button is depressed. The overcap assembly further comprises a first nozzle and a second nozzle. The first nozzle extends from the actuating button and is in fluid communication with the fluid passageway. The first nozzle comprises a first exit aperture. The second nozzle extends from the actuating button and is positioned below the first nozzle. The second nozzle is in fluid communication with the fluid passageway. The second nozzle comprises a second exit aperture angled differently than the first exit aperture. The first nozzle and the second nozzle each comprise an inner cylindrical wall and an outer cylindrical wall surrounding and spaced apart from the inner cylindrical wall.

According to some embodiments, the first exit aperture and the second exit aperture are configured to direct the fluid in diverging directions from one another immediately outside the first nozzle and the second nozzle, respectively, prior to the fluids expanding in the atmosphere. In some embodiments, the first nozzle and the second nozzle are parallel. In some embodiments, the actuating button defines a longitudinal axis, and the first nozzle comprises a first longitudinal axis $C_1$ and the second nozzle comprises a second longitudinal axis $C_2$. In some embodiments, the inner cylindrical wall of the first nozzle extends farther from the longitudinal axis of the actuating button below the longitudinal axis $C_1$ than above it. In some embodiments, the inner cylindrical wall of the second nozzle extends farther from the longitudinal axis of the actuating button above the longitudinal axis $C_2$ than below it. In some embodiments, the outer cylindrical wall of the first nozzle comprises an outer distal end, and a top portion of the outer distal end of the first nozzle is not vertically aligned with a bottom portion of the outer distal end of the first nozzle. In some embodiments, the outer cylindrical wall of the second nozzle comprises an outer distal end, and a top portion of the outer distal end of the second nozzle is not vertically aligned with a bottom portion of the outer distal end of the second nozzle.

According to another aspect, an overcap assembly is configured to attach to a container. The overcap assembly comprises a body and an actuator. The actuator is integrally attached with the body and defines a longitudinal axis. The actuator comprises a fluid passageway that extends therein. The fluid passageway is configured to receive a fluid when the actuator is depressed. The overcap assembly also comprises a first nozzle and a second nozzle that extend laterally from the actuator. The first nozzle and the second nozzle define a portion of the fluid passageway. The first nozzle comprises a first exit aperture and the second nozzle comprises a second exit aperture. The first nozzle and the second nozzle each comprises an inner cylindrical wall and an outer cylindrical wall surrounding and spaced apart from the inner cylindrical wall. The first exit aperture is configured to direct the fluid immediately exiting the first exit aperture when the actuator is depressed, prior to the fluid expanding in the atmosphere, in a first direction and the second exit aperture is configured to direct the fluid immediately exiting the second exit aperture when the actuator is depressed, prior to the fluid expanding in the atmosphere, in a second direction, the first direction being non-parallel to the second direction.

According to some embodiments, the first direction diverges from the second direction. In some embodiments, the first nozzle and the second nozzle are orthogonal to the longitudinal axis. In some embodiments, the first exit aperture and the second exit aperture comprise a spherical opening. In some embodiments, each of the outer cylindrical walls defines an outer distal end, and each of the inner cylindrical walls defines an inner distal end. A top portion of the outer distal end of the first nozzle is vertically aligned above a top portion of the inner distal end of the first nozzle. A bottom portion of the outer distal end of the second nozzle is vertically aligned below a bottom portion of the inner distal end of the second nozzle.

According to yet another aspect, an overcap assembly is configured to attach to a container. The overcap assembly comprises a body and an actuator. The actuator is integrally attached with the body and defines a longitudinal axis. The actuator comprises a fluid passageway that extends therein. The overcap assembly also comprises a first nozzle that extends laterally from the actuator. The first nozzle comprises a first distal end that defines a first exit aperture. The first nozzle comprises a first longitudinal axis $C_1$. The overcap assembly further comprises a second nozzle that extends from the actuator parallel to the first nozzle. The second nozzle comprises a second distal end that defines a second exit aperture. The second nozzle comprises a second longitudinal axis $C_2$. The first distal end includes a spherical opening that is angled upward with respect to the longitudinal axis $C_1$ and that defines the first exit aperture. The second distal end includes a spherical opening that is angled downward with respect to the longitudinal axis $C_2$ and that defines the second exit aperture.

According to some embodiments, the first exit aperture and the second exit aperture are configured to direct a fluid in diverging directions from one another immediately outside the first nozzle and the second nozzle, respectively, prior to the fluids expanding in the atmosphere. In some embodiments, the first nozzle and the second nozzle each comprise an inner cylindrical wall and an outer cylindrical wall surrounding and spaced apart from the inner cylindrical wall. In some embodiments, each of the inner cylindrical walls defines an inner distal end. An angle $\Theta$ is measured from the first longitudinal axis $C_1$ to a topmost edge of the inner distal end of the first nozzle and from the second longitudinal axis $C_2$ to a bottom most edge of the inner distal end of the second nozzle. In some embodiments, the angle $\Theta$ of at least one of the first nozzle and the second nozzle is between about 100° and about 170°. In some embodiments, the angle $\Theta$ of at least one of the first nozzle and the second nozzle is at least 100°. In some embodiments, the angle $\Theta$ of at least one of the first nozzle and the second nozzle is between about 110° and about 150°.

DETAILED DESCRIPTION

The term "about," as used herein, refers to variations in the numerical quantity that may occur, for example, through typical measuring and manufacturing procedures used for product dispensing systems or other articles of manufacture that may include embodiments of the disclosure herein; through inadvertent error in these procedures; through differences in the manufacture, source, or purity of the ingredients used to make the compositions or mixtures or carry out the methods; and the like. Throughout the disclosure, the terms "about" and "approximately" refer to a range of values ±5% of the numeric value that the term precedes. Further, as noted herein, all numeric ranges disclosed within this application are inclusive of the outer bounds of the range.

Figure 1:
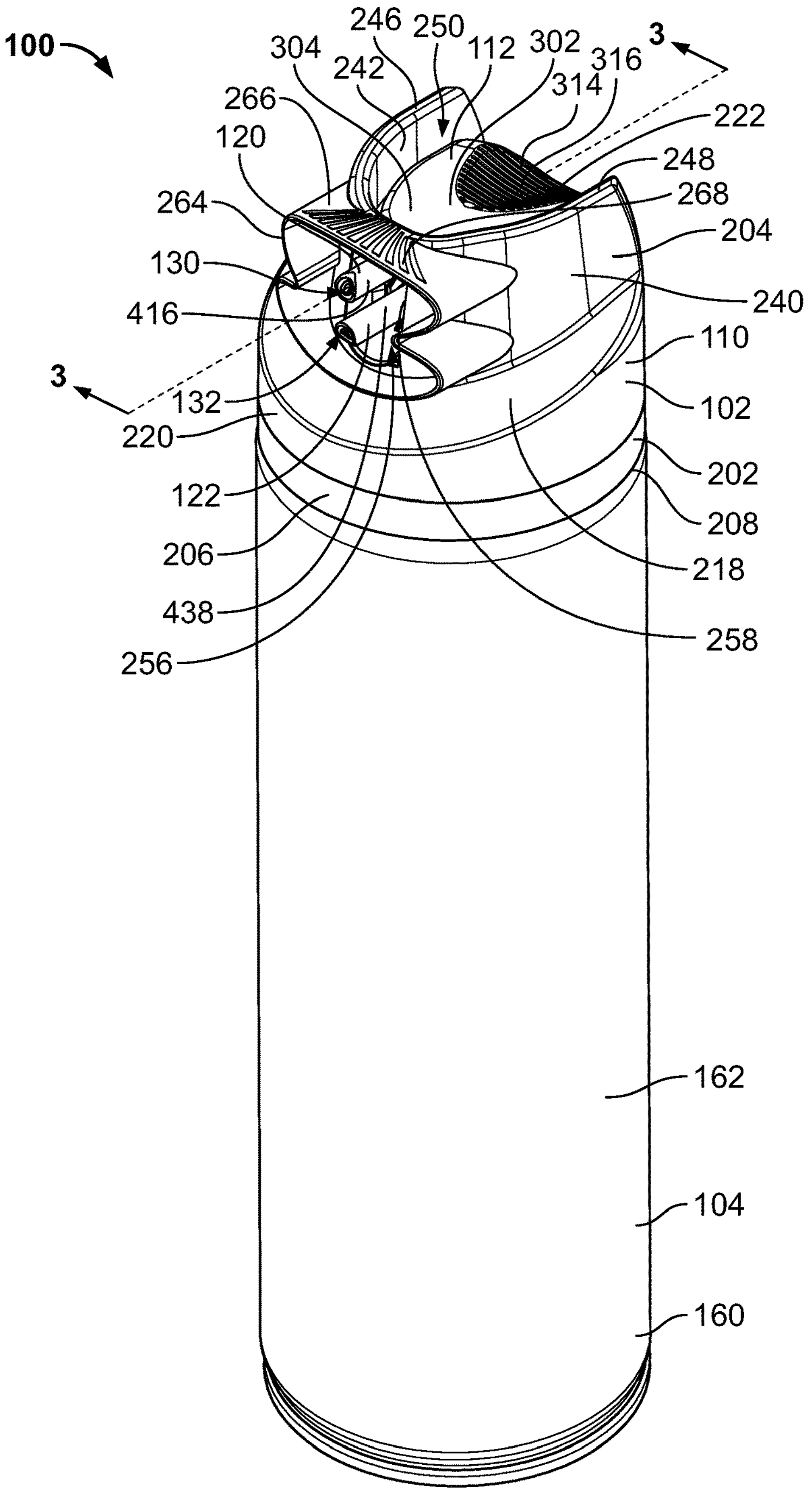
FIG. 1 is a top, front isometric view of a dispensing system including an overcap assembly attached to an aerosol container.

FIG. 1 depicts a product dispensing system 100 including an overcap assembly 102 and a container 104. The overcap assembly 102 includes a body 110, an actuator or actuating button 112, a first nozzle 120, and a second nozzle 122. The first and the second nozzle 120, 122 extend outwardly from the actuating button 112, parallel to each other. The actuating button 112 is at least partially disposed within the body 110 and facilitates the product being dispensed from the dispensing system 100. In use, the overcap assembly 102 is adapted to release a product from the container 104 upon the occurrence of a particular condition, such as the manual depression of the actuating button 112 by a user of the dispensing system 100. The product discharged may be a formulation, carrier, or substance for use in a household, commercial, or industrial environment. The product is discharged through a first angled exit aperture 130 of the first nozzle 120 and a second angled exit aperture 132 of the second nozzle 122. It is contemplated that the overcap assembly 102 can include more or fewer nozzles than shown. For example, in one embodiment, the overcap assembly 102 may include a third nozzle extending between the first nozzle 120 and the second nozzle 122.

In some embodiments, the product comprises an insect repellant or insecticide disposed within a carrier liquid or the like. The product may also comprise other actives, such as sanitizers, air fresheners, fragrances, deodorizers, cleaners, odor eliminators, mold or mildew inhibitors, and/or the like, and/or that have aromatherapeutic properties. The product alternatively comprises any solid, liquid, or gas known to those skilled in the art that may be dispensed from a container. It is contemplated that the container 104 may contain any type of pressurized or non-pressurized product, such as compressed gas that may be liquefied, non-liquefied, or dissolved, including carbon dioxide, helium, hydrogen, neon, oxygen, xenon, nitrous oxide, or nitrogen. The container 104 may alternatively contain any type of hydrocarbon gas, including acetylene, methane, propane, butane, isobutene, halogenated hydrocarbons, ethers, mixtures of butane and propane, otherwise known as liquid petroleum gas or LPG, and/or mixtures thereof. The product dispensing system 100 is therefore adapted to dispense any number of different products.

The container 104 and/or overcap assembly 102 may each be independently made of any appropriate material, including multiple layers of the same or different material, such as a polymer, a plastic, metal such as aluminum, an aluminum alloy, or tin plated steel, glass, a cellulosic material, a laminated material, a recycled material, and/or combinations thereof. The overcap assembly 102 may be formed from a wide variety of well-known polymeric materials, including, for example, polyethylene (PE), low density polyethylene (LDPE), high density polyethylene (HDPE), polyethylene terephthalate (PET), crystalline PET, amorphous PET, polyethylene glycol terephthalate, polystyrene (PS), polyamide (PA), polyvinyl chloride (PVC), polycarbonate (PC), poly (styrene:acrylonitrile) (SAN), polymethylmethacrylate (PMMA), polypropylene (PP), polyethylene naphthalene (PEN), polyethylene furanoate (PEF), PET homopolymers, PEN copolymers, PET/PEN resin blends, PEN homopolymers, overmolded thermoplastic elastomers (TPE), fluropolymers, polysulphones, polyimides, cellulose acetate, and/or combinations thereof. It is further envisioned that the container 104 may include an interior and/or exterior lining or coating to further strengthen the container 104 structurally, as well as make the container 104 resilient to harsh chemicals. The lining(s) and/or coating(s) may be made of any one of the preceding polymeric materials or may further be made of ethylenevinyl alcohol (EVOH). The container 104 may be opaque, translucent, or transparent.

Figure 2:
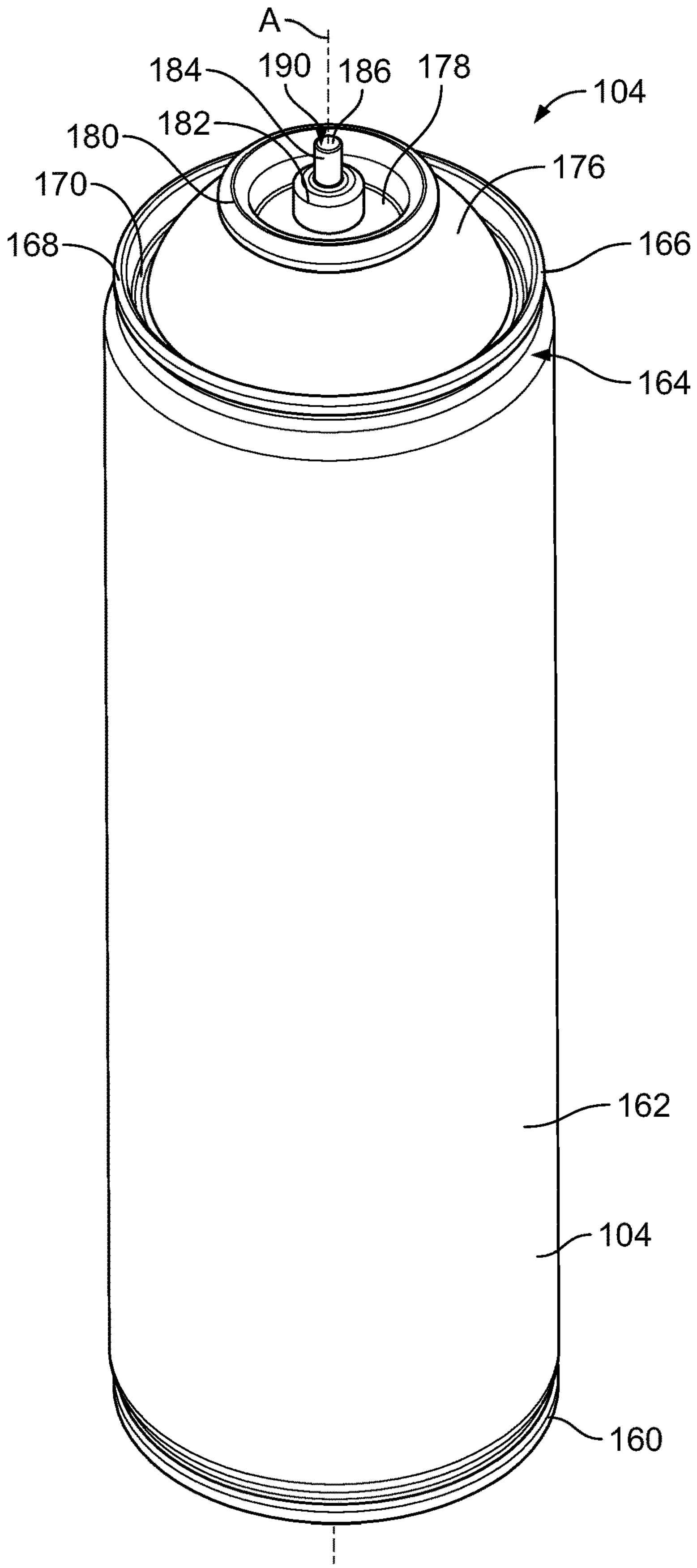
FIG. 2 is an isometric view of the aerosol container of FIG. 1 without the overcap assembly coupled thereto.

As best illustrated in FIG. 2, the container 104 includes a lower end 160 and a substantially cylindrical body 162, which terminates at a groove 164 disposed at an upper end 166 of the container 104. The overcap assembly 102 may be attached to the container 104 via the groove 164, as discussed below (see FIG. 4). A rim 168 is disposed adjacent and above the groove 164, and joins a platform 170 that partially defines the upper end 166 of the container 104. The platform 170 is generally annular. It is contemplated that the container 104 of the present disclosure may be a conventional aerosol container, which includes features that are externally or internally crimped to portions of the cylindrical body 162 and/or the rim 168. For example, as illustrated in FIG. 2, a dome 176 may be externally crimped to the container 104 at the rim 168.

Still referring to FIG. 2, the dome 176 of the container 104 is generally spherical and extends upwardly from the platform 170. An upwardly open valve cup 178 is located at the center of the dome 176 and is crimped or otherwise joined to the dome 176 to form a valve cup rim 180. A valve pedestal 182 extends from a central portion of the valve cup 178, and includes a conventional valve assembly (not shown in detail) having a valve stem 184, which is connected to a valve body (not shown) and a valve spring (not shown) disposed within the container 104. The valve stem 184 extends upwardly through the valve cup 178, wherein a distal end 186 of the valve stem 184 extends upwardly away from the valve cup 178 and is adapted to interact with a fluid inlet of the actuating button 112 of the overcap assembly 102 (see FIG. 4). A longitudinal axis A extends through the valve stem 184. It is also contemplated that other types of containers 104 or bottles may be used with the overcap assembly 102 disclosed herein.

Figure 3:
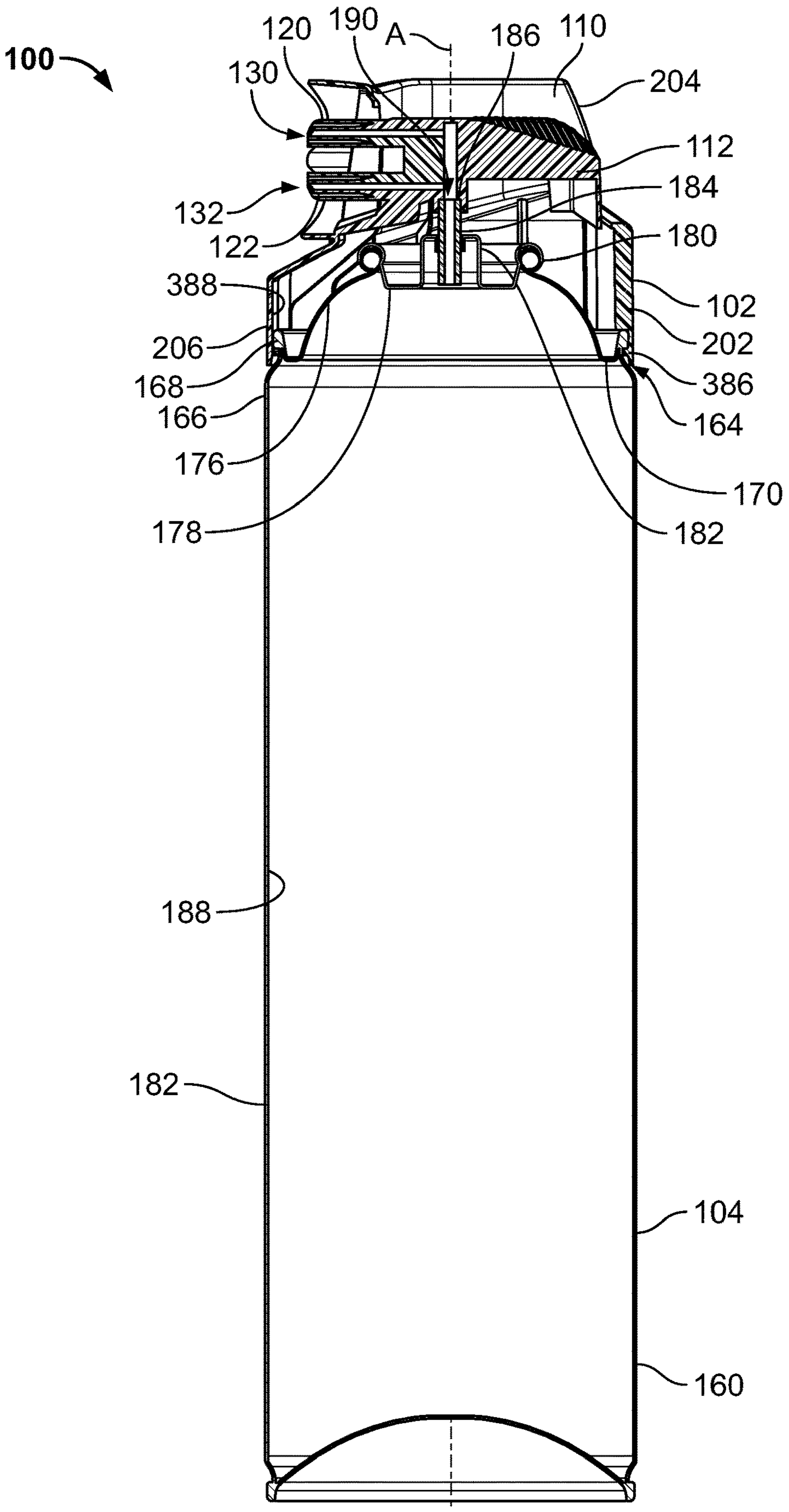
FIG. 3 is a cross-sectional side view of the dispensing system of FIG. 1 taken along the line 3-3 of FIG. 1.
Figure 4:
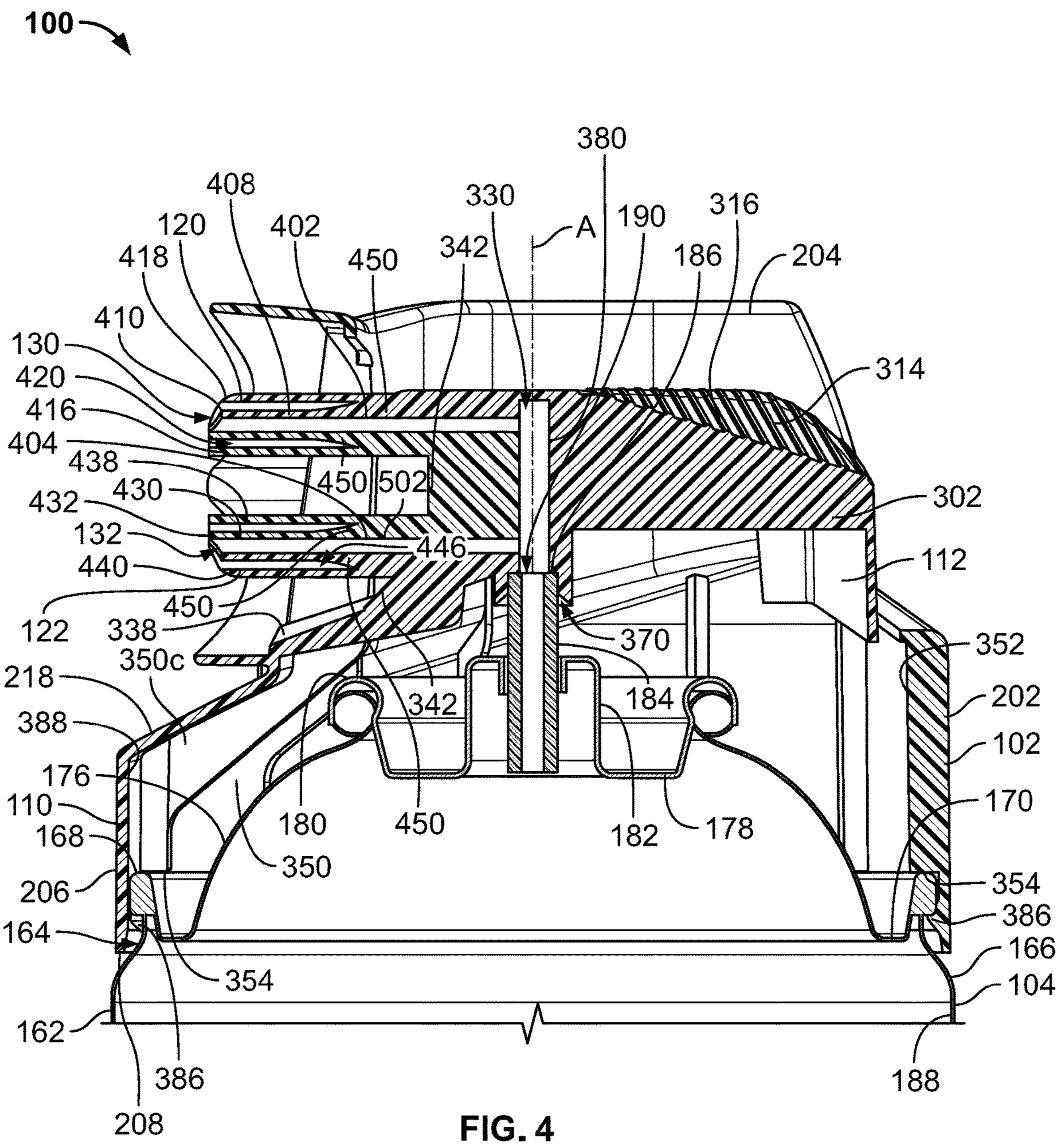
FIG. 4 is a partial, enlarged view of the cross-sectional side view of the dispensing system of FIG. 3.

As best shown in FIGS. 3 and 4, prior to use, the actuating button 112 is placed in fluid communication with the distal end 186 of the valve stem 184. A user may manually or automatically actuate the actuating button 112 to open the valve assembly, which causes a pressure differential between an interior 188 of the container 104 and the atmosphere to force the contents of the container 104 out through an orifice 190 of the valve stem 184, through the overcap assembly 102, and into the atmosphere.

Figure 9:
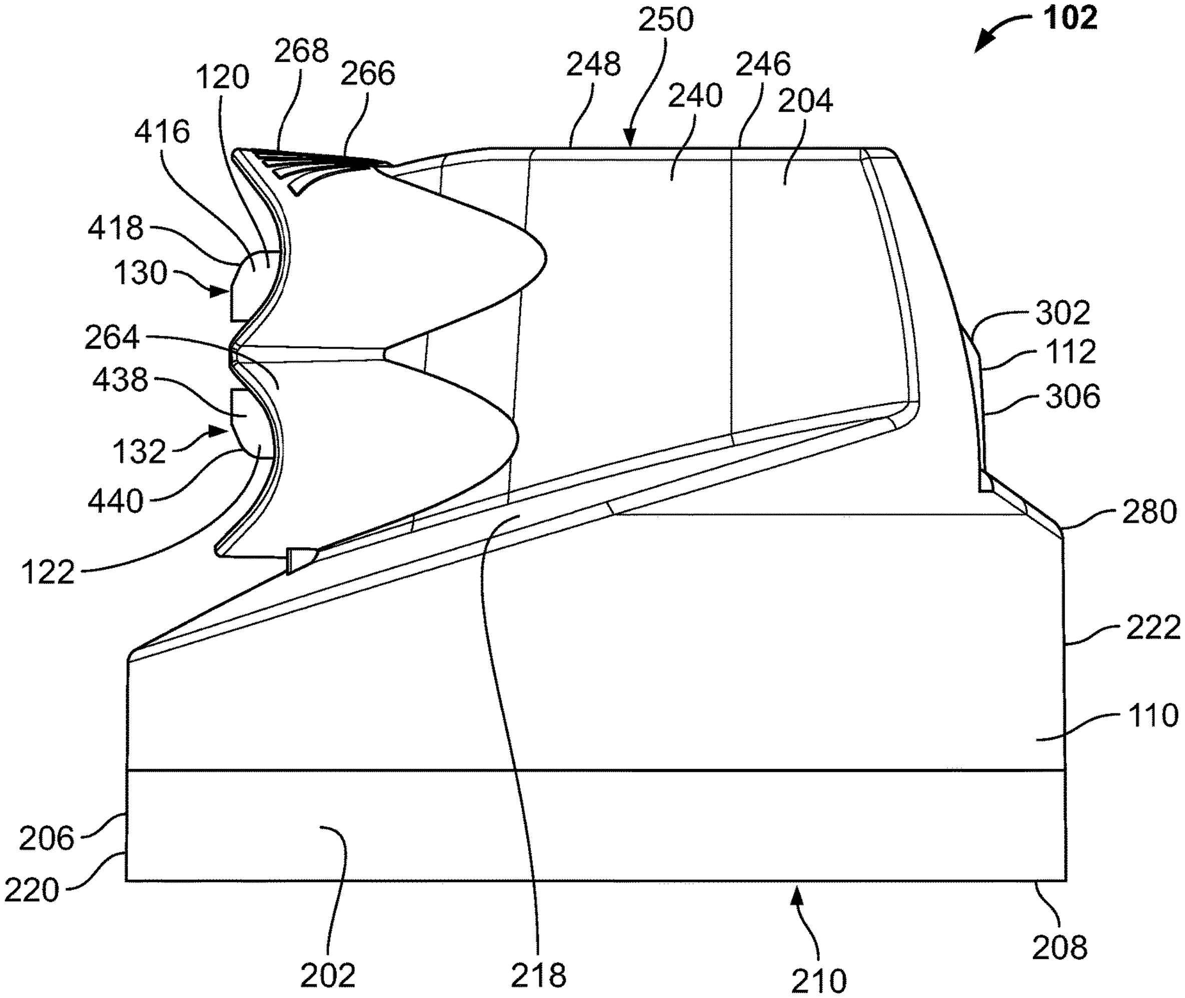
FIG. 9 is a right side elevational view of the overcap assembly of FIG. 5, the left side view being a mirror image thereof.
Figure 10:
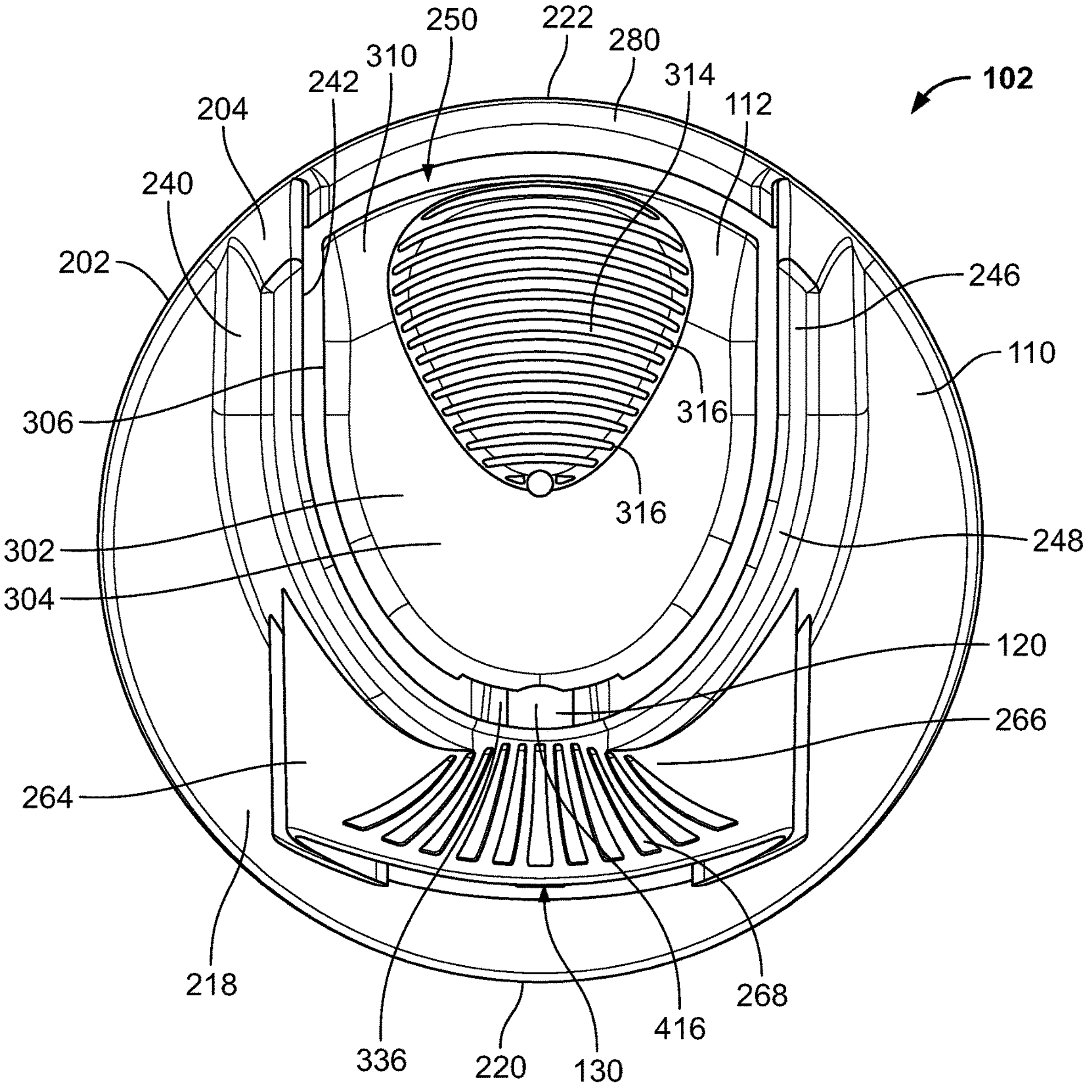
FIG. 10 is a top plan view of the overcap assembly of FIG. 5.
Figure 11:
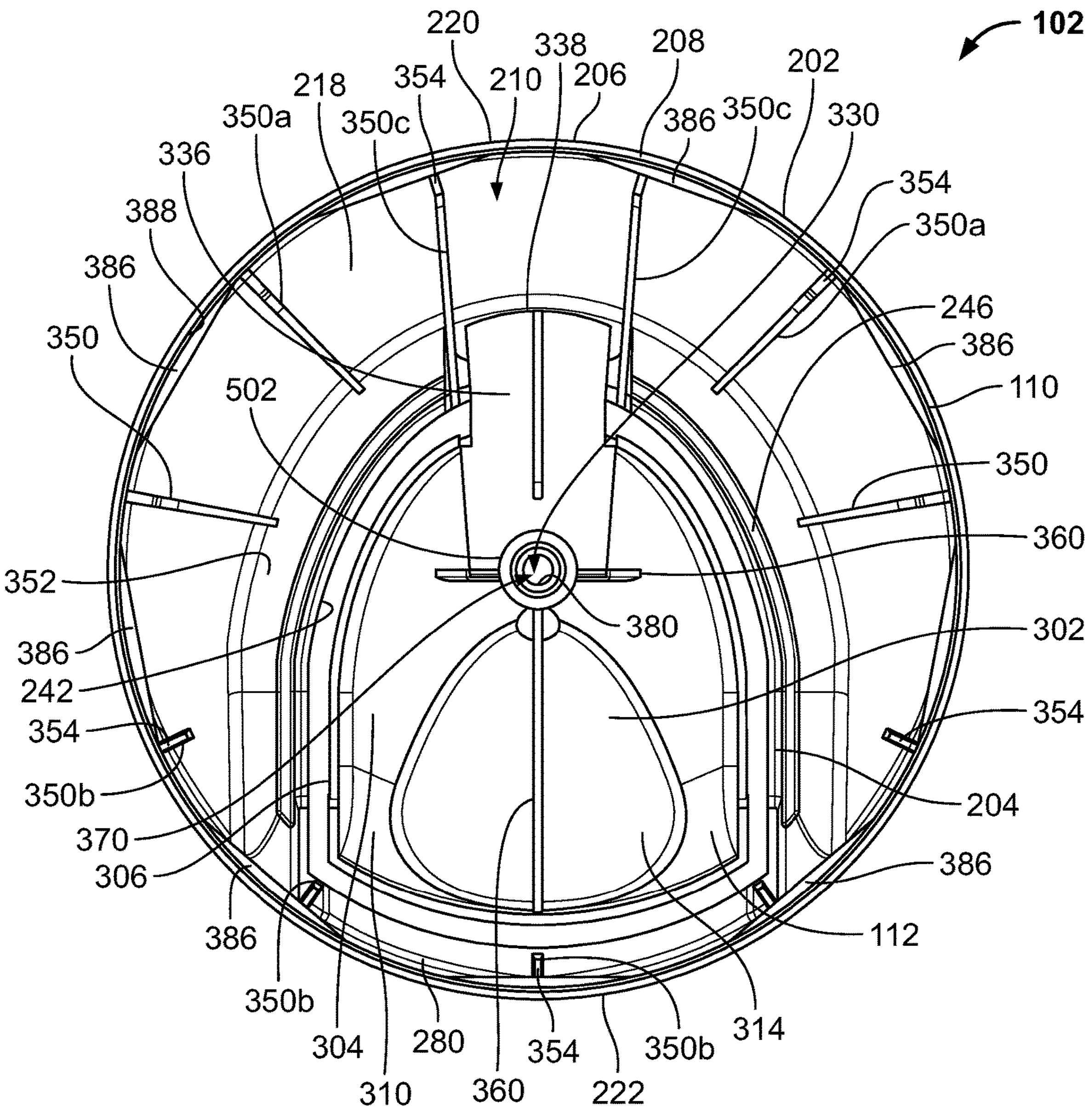
FIG. 11 is a bottom plan view of the overcap assembly of FIG. 5.
Figure 12:
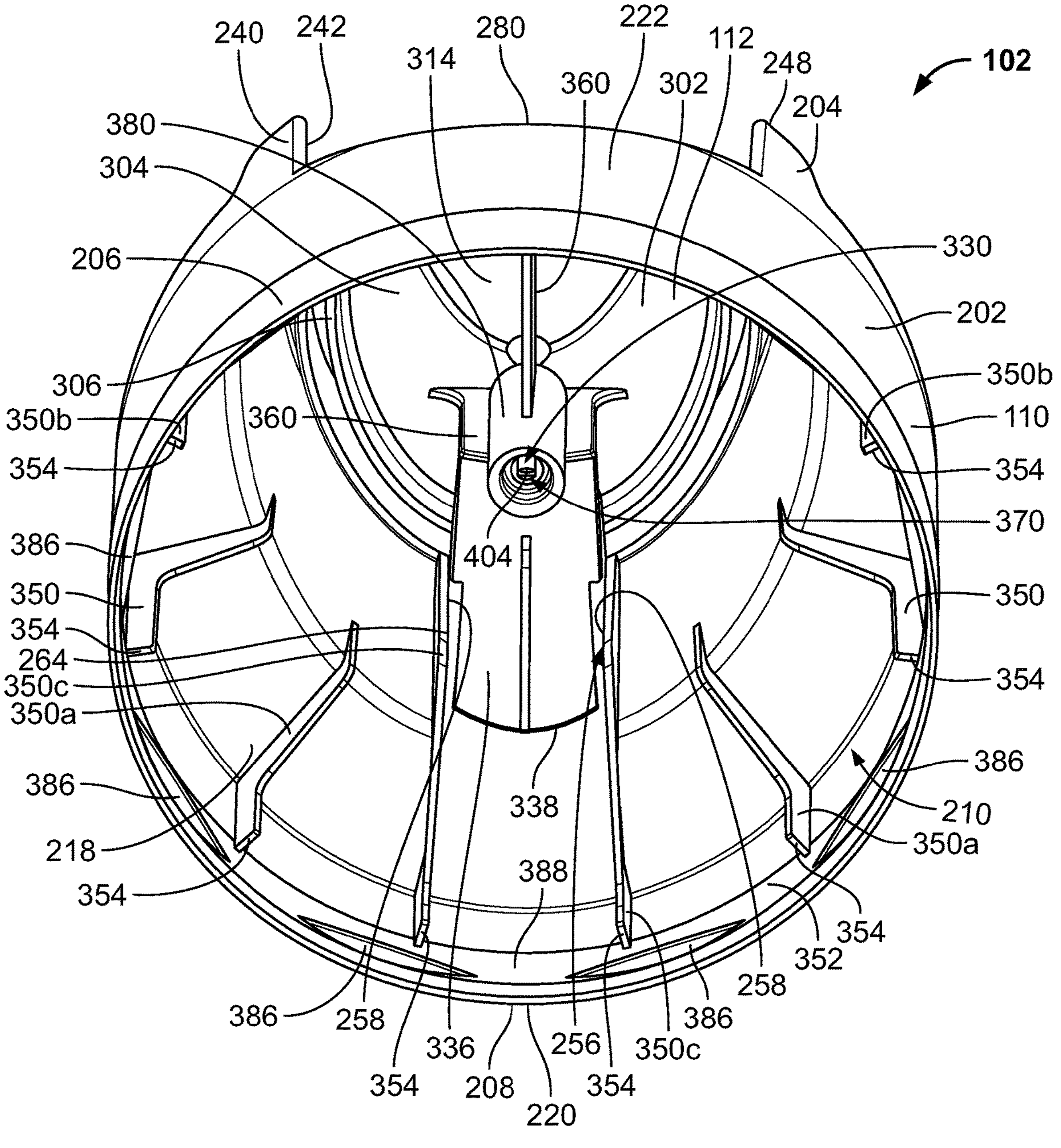
FIG. 12 is a bottom, rear isometric view of the overcap assembly of FIG. 5.
Figure 13:
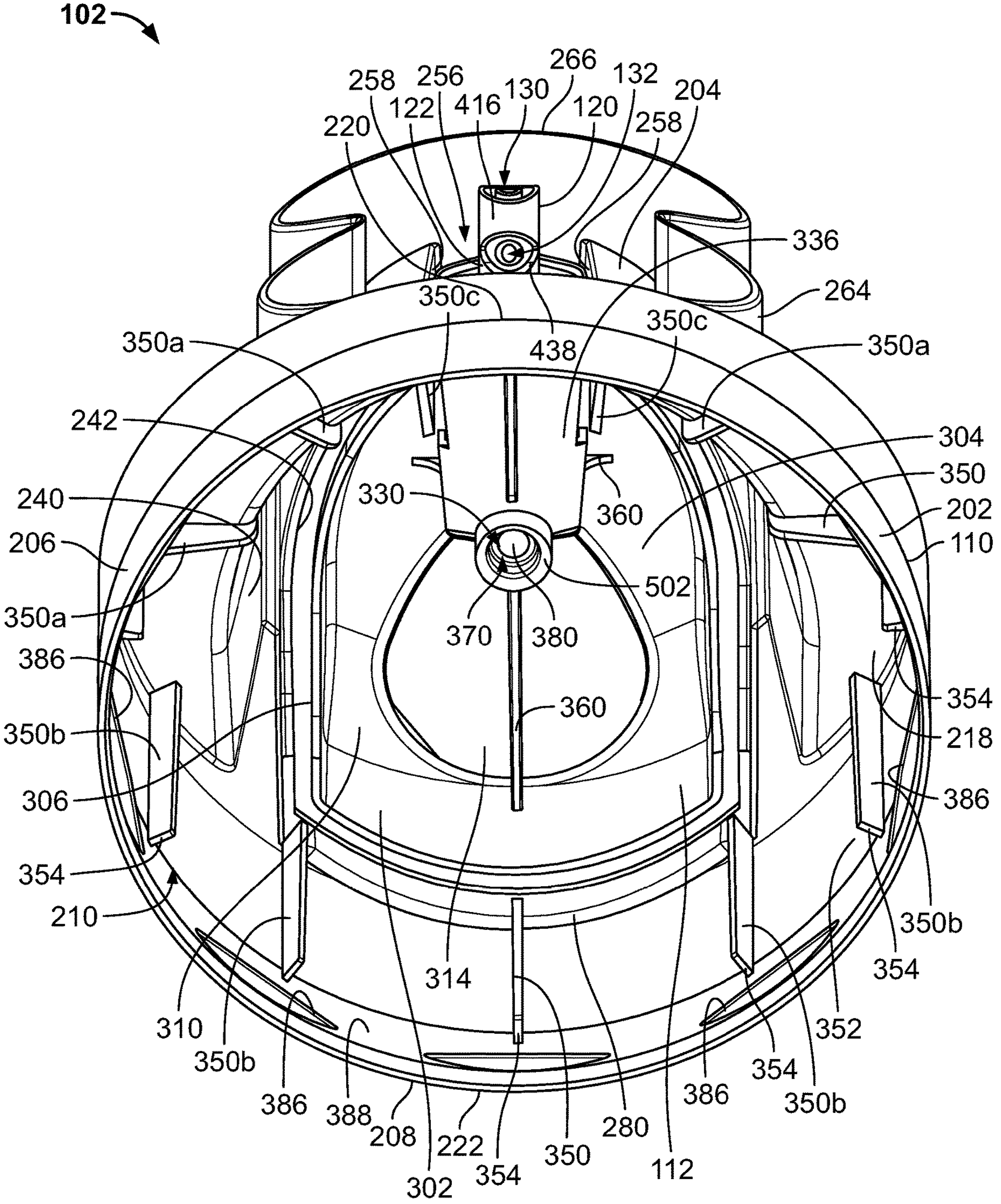
FIG. 13 is a bottom, front isometric view of the overcap assembly of FIG. 5.

Now turning to FIGS. 5-10, the overcap assembly 102 is described with greater particularity. The body 110 of the overcap assembly 102 is defined as having a lower portion 202 and an upper portion 204 extending from the lower portion 202. The lower portion 202 of the body 110 comprises a lower sidewall 206 that extends upward along the longitudinal axis A. As previously noted, the longitudinal axis A is defined through the valve stem 184 of the container 104 and also through the actuating button 112. The lower sidewall 206 of the lower portion 202 is generally cylindrical in the present embodiment; however, the lower sidewall 206 may also be tapered. Further, the lower sidewall 206 of the lower portion 202 defines a lower edge 208 of the body 110. As illustrated in FIGS. 11-13, the lower edge 208 of the lower portion 202 is generally circular and defines a lower opening 210 of the body 110. The lower portion 202 may optionally include a lip.

Figure 5:
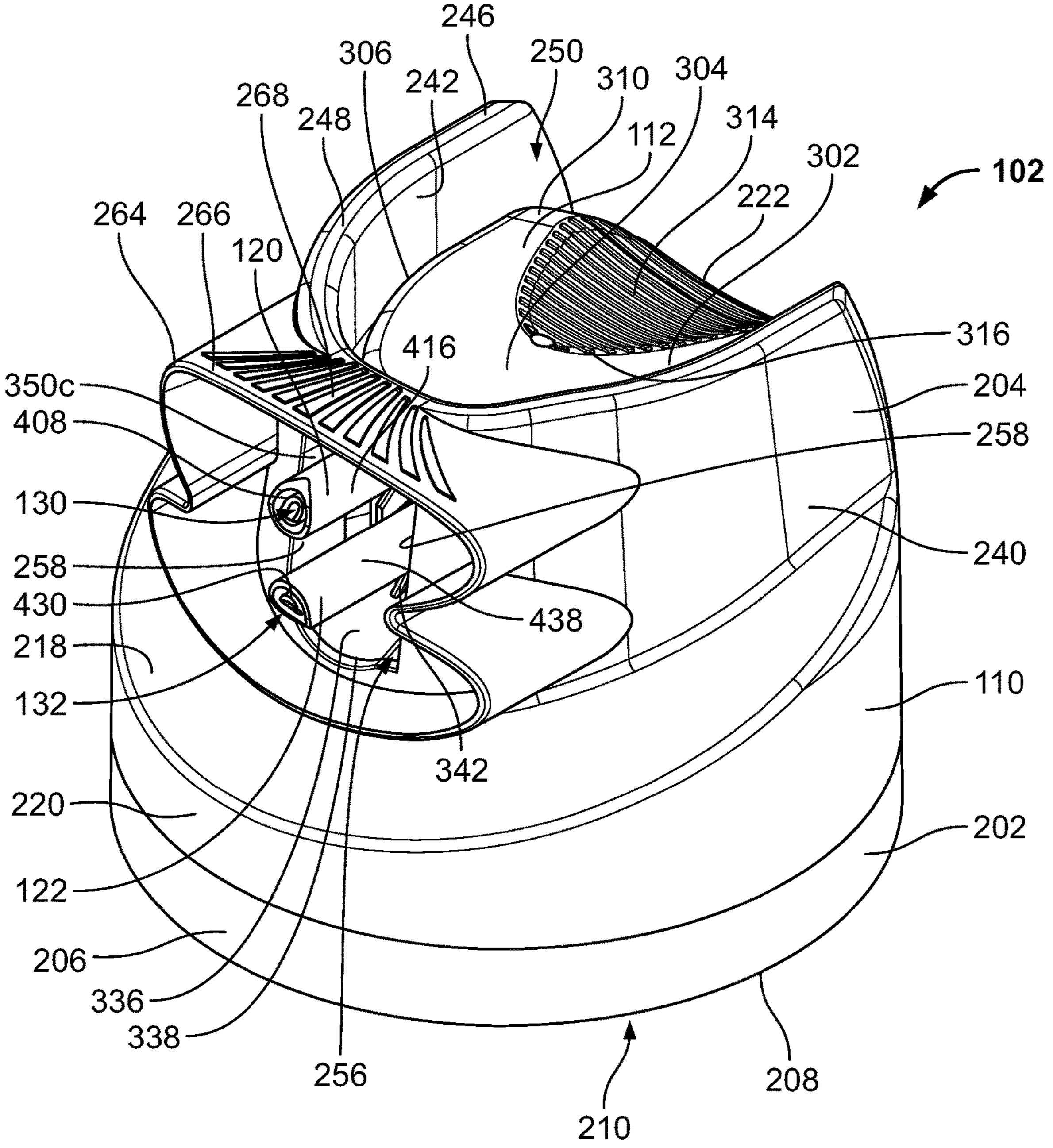
FIG. 5 is a top, front isometric view of the overcap assembly of FIG. 1.
Figure 6:
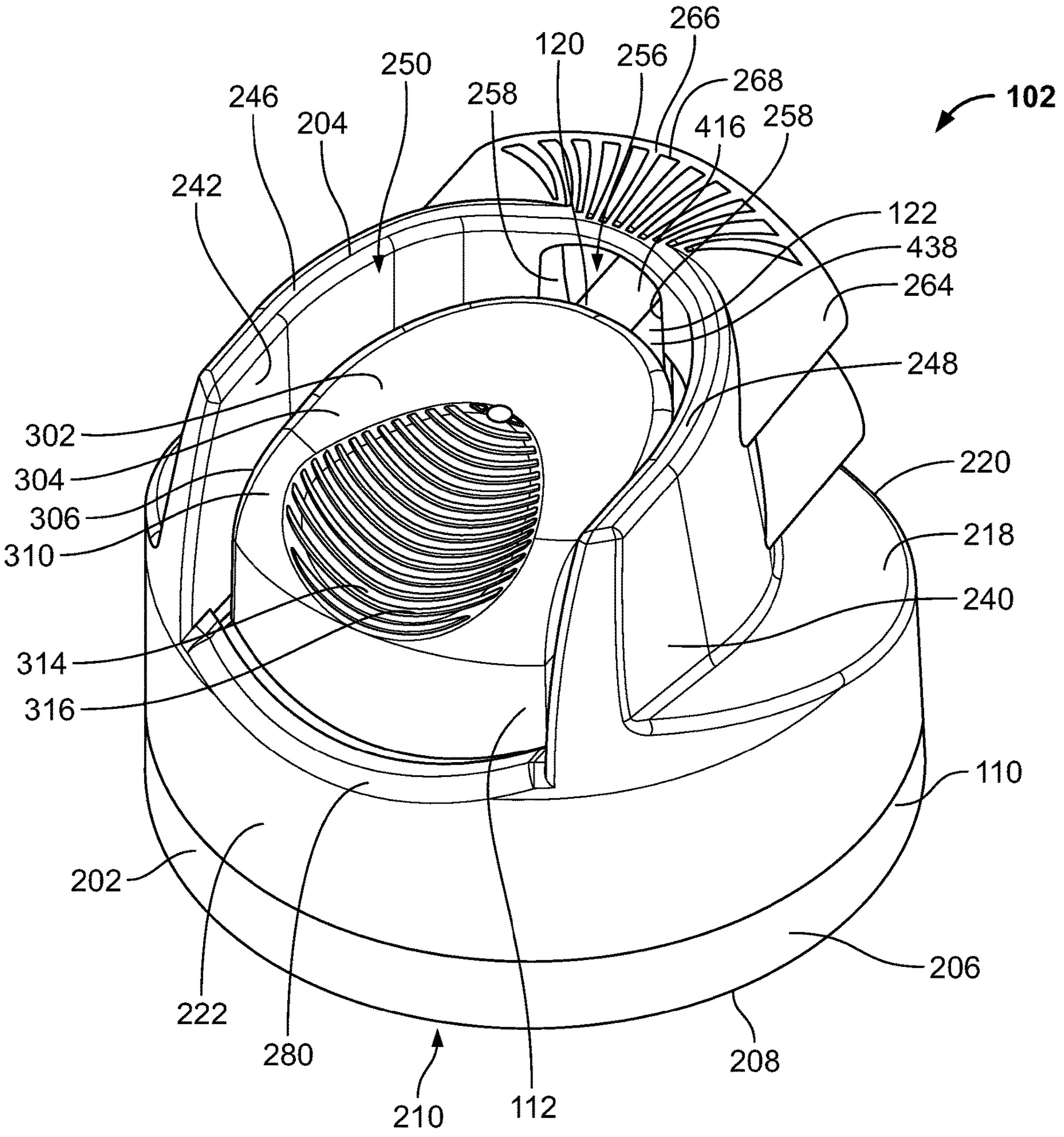
FIG. 6 is a top, rear isometric view of the overcap assembly of FIG. 5.
Figure 7:
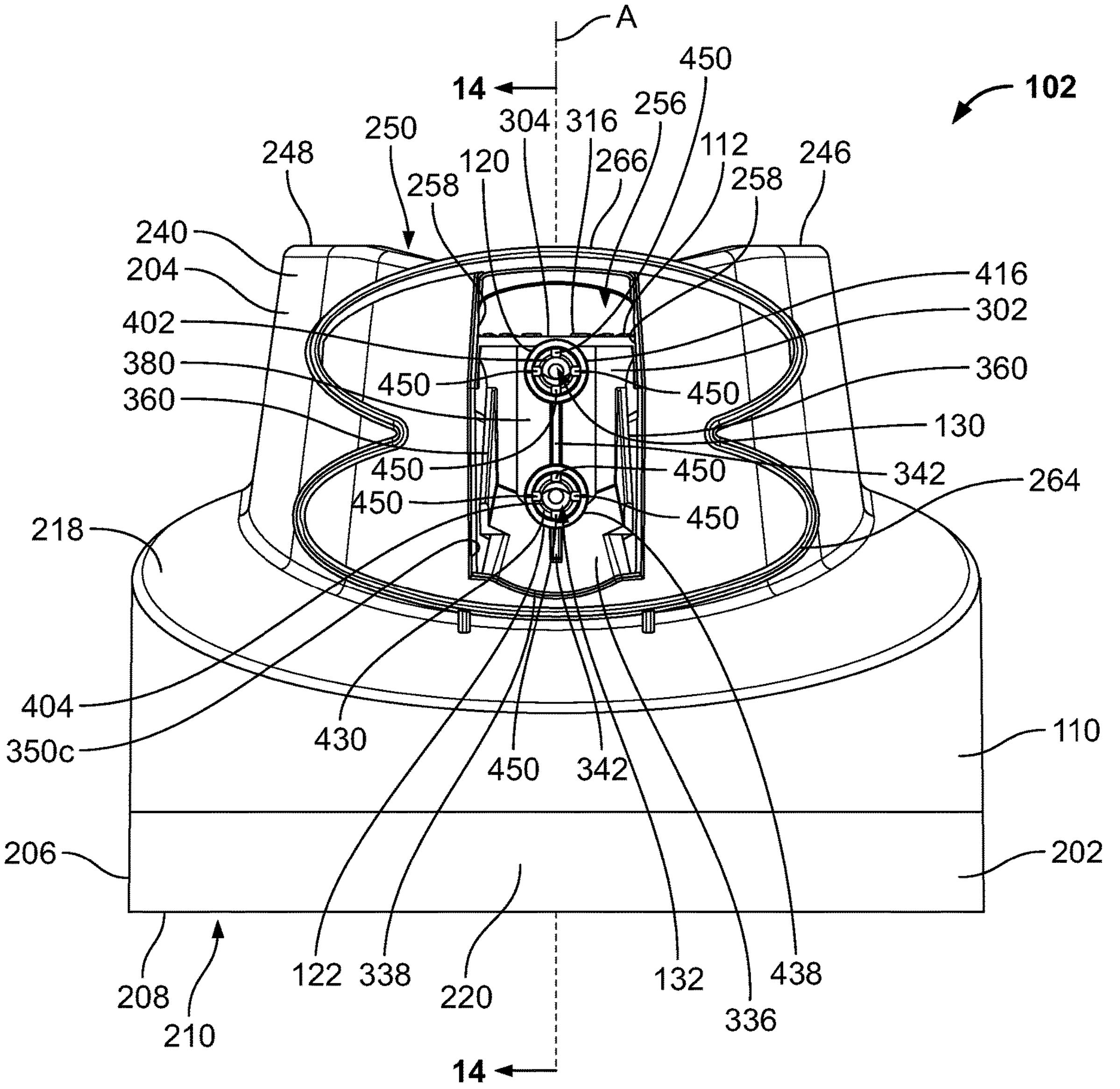
FIG. 7 is a front elevational view of the overcap assembly of FIG. 5.

Referring to FIGS. 5-7, the lower sidewall 206 terminates at an angled step 218 at a top of the lower portion 202 of the body 110. The angled step 218 is generally flat and angled upward from a front portion 220 of the body 110 to a rear portion 222 of the body 110. As illustrated in FIGS. 5 and 6, the upper portion 204 of the body 110 extends upwardly from the angled step 218. In particular, the upper portion 204 of the body 110 comprises an outer wall 240 that tapers toward the longitudinal axis A (see FIG. 7) and an inner wall 242 that is generally parallel to the longitudinal axis A (see FIG. 8). The outer wall 240 and the inner wall 242 are connected at a top wall 246 that defines a top edge 248 of the body 110. As illustrated in FIG. 10, the upper portion 204 of the body 110 defines an upper opening 250 of the body 110 that is in communication with the lower opening 210 of the body 110.

Referring again to FIGS. 5-7, the upper portion 204 of the body 110 comprise a window 256 that extends therethrough. In particular, the window 256 extends through the outer wall 240 and the inner wall 242 of the upper portion 204 and defines window sidewalls 258. The window 256 provides an opening in which the first and the second nozzle 120, 122 extend through. It is contemplated that the window 256 can comprise any type of shape or configuration such that the nozzles 120, 122 can extend through the upper portion 204 of the body 110. As illustrated in FIGS. 7 and 9, the body 110 also includes a horn 264 extending outwardly from the upper portion 204, away from the longitudinal axis A. The horn 264 comprise a generally hourglass shape and surrounds the first and the second nozzle 120, 122. The horn 264 further surrounds the window 256 in the upper portion 204 of the body 110. In preferred embodiments, the horn 264 is configured to catch any fluid that may drip from the nozzles 120, 122 during operation of the overcap assembly 102. As illustrated in FIG. 7, the horn 264 is connected with the angled step 218 at a lower portion. In alternative embodiments, the horn 264 may include any shape or size. For example, the horn 264 may comprise a circular, square, or triangular shape instead of having an hourglass configuration.

Referring still to FIGS. 5-7, the top wall 246 of the body 110 is recessed above the window 256. In particular, the top wall 246 is flush with a top portion 266 of the horn 264. As illustrated in FIGS. 5 and 6, the top portion 266 of the horn 264 comprises a spray indicator 268 indicating to the user the direction of the aerosol spray once the actuating button 112 is depressed. The spray indicator 268 may extend onto a portion of the top wall 246. In alternative embodiments, the top portion 266 of the horn 264 may not include the spray indicator 268. Further, it is contemplated that the spray indicator 268 may be any shape, size, or indicator to instruct the user during operation of the overcap assembly 102.

Referring to FIGS. 5 and 6, the actuating button 112 is positioned in the upper opening 250 of the body 110. In particular, the actuating button 112 is surrounded by the inner wall 242 of the upper portion 204 and a recessed lip 280 in the rear portion 222 of the body 110. The actuating button 112 is depressably connected to the body 110 such that it can move from a first position or unactuated state (see FIG. 14) to a second position or actuated state (see FIG. 26). In preferred embodiments, the actuating button 112 is integrally connected or attached with the body 110. Put differently, in some embodiments, the actuating button 112 is monolithic or monolithically formed with the body 110. However, in alternative embodiments, the actuating button 112 may be separate or independent from the body 110. In preferred embodiments, the body 110 and the actuating button 112 are molded together during an injection molding operation.

Figure 8:
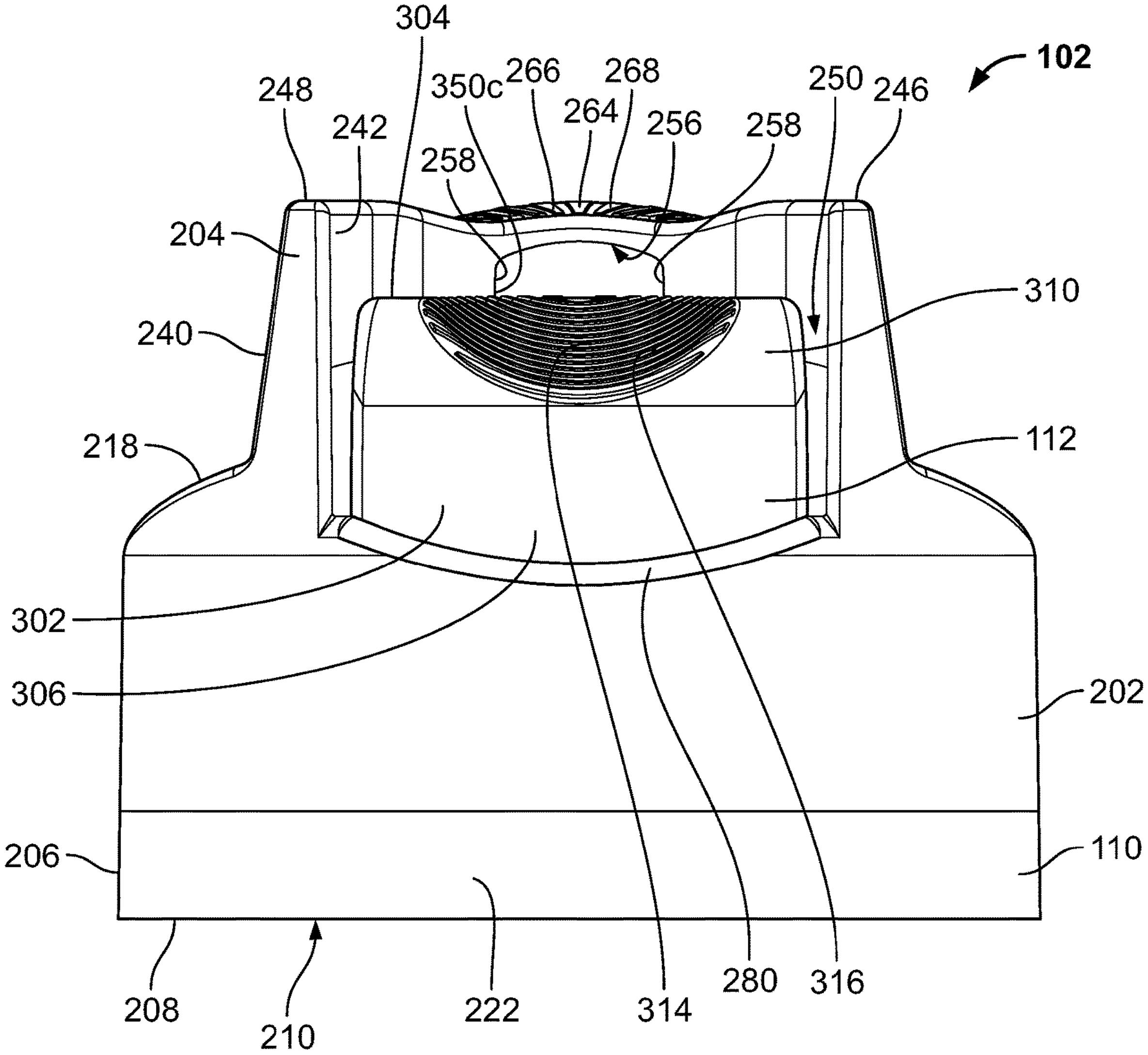
FIG. 8 is rear elevational view of the overcap assembly of FIG. 5.

Referring still to FIGS. 5 and 6, the actuating button 112 comprises an actuator body 302 having a generally elongated oval shape. The shape of the actuator body 302 is generally similar to the shape of the upper opening 250 of the body 110 (see FIG. 10). The actuator body 302 comprises an upper wall 304 and a sidewall 306 extending around the upper wall 304. The sidewall 306 tapers away from the longitudinal axis A on both sides of the actuating button 112 (see FIG. 10), and the sidewall 306 is generally parallel to the longitudinal axis A on the rear side of the actuating button 112 (see FIG. 14). As illustrated in FIGS. 7 and 8, the upper wall 304 of the actuating button 112 is generally flat and orthogonal to the longitudinal axis A.

Referring still to FIGS. 5 and 6, the upper wall 304 is connected to a rounded wall 310 that connects the upper wall 304 with the sidewall 306 near the rear portion 222 of the body 110. A landing area 314 is positioned on the upper wall 304 and the rounded wall 310. More particularly, the landing area 314 extends into the actuator body 110 of the actuating button 112 and comprises a rounded or bowl like shape. In preferred embodiments, the landing area 314 comprises a plurality of gripping features 316 that extend outwardly from the landing area 314. The landing area 314 is provided as a visual cue for the user on where they should place their finger during operation of the overcap assembly 102. Additionally, the landing area 314 is intended to position the user's finger on a centerline of the actuating button 112, of which the cross-sectional view of FIG. 14 defines the centerline of the actuating button 112 of the overcap assembly 102. Thus, allowing easier (consumer-friendly) actuation of the actuating button 112. The plurality of gripping features 316 give the landing area 314 extra grip such that the user's finger does not slide while actuating the actuating button 112. In some embodiments, the actuating button 112 may not comprise the landing area 314. Instead, the upper wall 304 of the actuating button 112 may be substantially flat and uninterrupted.

Figure 14:
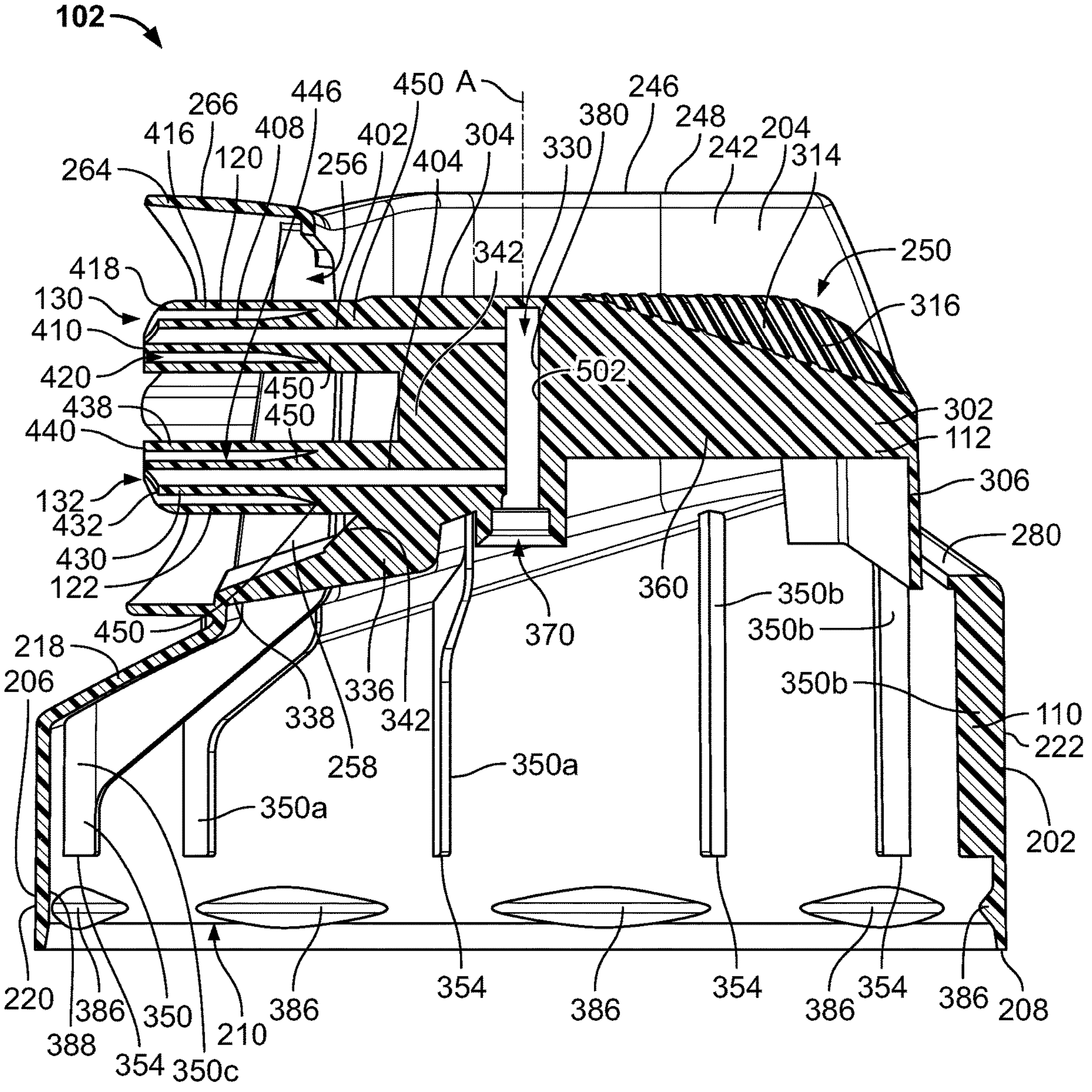
FIG. 14 is a side cross-sectional view of the overcap assembly of FIG. 5 taken along line 14-14 of FIG. 7 in an unactuated state.

Referring to FIG. 7, the first and the second nozzle 120, 122 extend laterally outwardly from the actuating button 112, orthogonal to the longitudinal axis A. In preferred embodiments, the first and the second nozzle 120, 122 are integrally connected with the actuating button 112. As will be discussed in further details herein, the actuating button 112 defines a fluid passageway 330 extending therethrough such that fluid from the container 104 may flow through the actuating button 112 and out the first nozzle 120 and the second nozzle 122 via the first exit aperture 130 and the second exit aperture 132, respectively (see FIG. 4). Therefore, the first and the second nozzle 120, 122 define portions of the fluid passageway 330 extending through the actuating button 112. As illustrated in FIGS. 7 and 14, the actuating button 112 comprises a bridge 336 that extends outwardly from the longitudinal axis A and connects the actuating button 112 with the body 110 at a pivot point 338. As will become more apparent upon further discussion herein, the actuating button 112 translates and/or pivots relative to the body 110 about the pivot point 338 from the unactuated state (see FIG. 14) to the actuated state (see FIG. 26), i.e., the bridge 336 and the pivot point 338 create a living hinge. As further illustrated in FIGS. 7 and 14, the bridge 336 comprises a generally concave geometry (see FIG. 7). The concave geometry of the bridge 336 helps to limit side-to-side motion during actuation of the actuating button 112 and allows the actuating button 112 to depress easier from the unactuated state (see FIG. 14) to the actuated state (see FIG. 26). In alternative embodiments, the bridge 336 may be more rounded than illustrated or may be substantially flat, i.e., not concave.

Referring to FIGS. 7 and 14, the actuating button 112 comprises gussets 342 extending between the first and the second nozzle 120, 122 and between the second nozzle 122 and the bridge 336. The gussets 342 extend from the actuator body 302 and along the first and the second nozzle 120, 122. In preferred embodiments, the gussets 342 add additional support and stability to the actuating button 112 and the first and the second nozzle 120, 122. In particular, the gussets 342 assist in prohibiting the first and the second nozzle 120, 122 from flexing under a torque force, i.e., actuation of the actuating button 112. Specifically, the gussets 342 keep the first and the second nozzles 120, 122 aligned and parallel with each other during use of the overcap assembly 102. Therefore, the gussets 342 limit the nozzles from flexing while a user pushes on the actuating button 112. In some embodiments, the actuating button 112 may not include the gussets 342. In other embodiments, the gussets 342 may be larger or smaller than illustrated (see FIGS. 27 and 32).

Turing to FIGS. 11-13, the lower opening 210 of the body 110 is shown positioned adjacent the lower edge 208 for receiving portions of the container 104 (see FIG. 4). As best seen in FIGS. 11-14, the body 110 includes a plurality of inwardly protruding guiding ribs 350 disposed along an inner surface 352 of the body 110. The guiding ribs 350 are radially spaced from one another and extend from the lower edge 208 in an inward and upward manner from the lower sidewall 206 of the lower portion 202 of the body 110 along the inner surface 352 to the upper portion 204 of the body 110. As illustrated in FIGS. 11 and 12, some of the guiding ribs **350*a* extend inwardly along the angled step 218 and upwardly into the upper portion of the body 110. However, as illustrated in FIG. 13, a few of the guiding ribs 350*b* only extend on the lower sidewall 206 of the lower portion 202 of the body 110. In this case, the guiding ribs 350*b* comprise a generally rectangular shape and stop short of the recessed lip 280**.

Referring to FIG. 12, two of the guiding ribs **350*c* extend along the inner surface 352 of the body 110 past the window 256. In particular, the two guiding ribs 350*c* form the window sidewalls 258 in the upper portion 204 of the body 110. As illustrated in FIGS. 12-14, a lower surface 354 of each of the guiding ribs 350 is depicted, wherein such lower surfaces 354 are fashioned to engage with the rim 168 of the container 104 when the overcap assembly 102 is coupled thereto (see FIG. 4). It is contemplated that the guiding ribs 350 may comprises any type of shape and can extend to any height along the inner surface 352 of the body 110. In some embodiments, the body 110 may comprise more or fewer guiding ribs 350 than shown (see FIGS. 30 and 40). As illustrated in FIGS. 11-13, the body 110 and the actuating button 112 comprise a plurality of support ribs 360. The support ribs 360 offer additional support and structural integrity to the overcap assembly 102. It is contemplated that the overcap assembly 102 may include more or fewer support ribs 360 depending on the type of material used, the intended use of the overcap assembly 102, and the operating performance needed by the user. As further illustrated in FIGS. 11-13, an inlet 370 of a vertical conduit 380 of the actuating button 112 extends to join the valve stem 184, resulting in a fluid connection between the actuating button 112 and the container 104 (see FIG. 4). During operation, the vertical conduit 380 is configured to receive a fluid when the actuating button 112 is depressed (see FIG. 26**).

Referring to FIGS. 12-14, a plurality of equidistantly spaced securement protrusions 386 are disposed circumferentially about an interior surface 388 of the lower sidewall 206 and are adapted to secure the overcap assembly 102 to the container 104 and/or to allow for variances of different container sizes for use with the overcap assembly 102 (see FIG. 4). In preferred embodiments, the protrusions 386 limit rotation of the body 110 with respect to the container 104 because the protrusions 386 have a light interface with the groove 164 adjacent the rim 168 of the container 104 (see FIG. 4). The protrusions 386 may also relieve pressure on the lower sidewall 206 of the lower portion 202 of the body 110 in the event that a container having a larger diameter, i.e. a diameter that is substantially similar to that of the body 110, is inserted into the body 110 of the overcap assembly 102.

As best seen in FIGS. 3 and 4, upon placement of the overcap assembly 102 onto the container 104, the securement protrusions 386 are fittingly retained within the groove 164 in a snap-fit type manner. Any number and size of the protrusions 386 may be included that circumscribe the interior surface 388 of the lower sidewall 206 to assist in attaching the overcap assembly 102 to the container 104. Alternatively, other methods may be utilized to secure the overcap assembly 102 to the container 104 as are known in the art. Additional stabilizing ribs (not shown) and/or additional securement protrusions 386 may also provide additional structural integrity and/or alignment assistance to the overcap assembly 102 for allowing for secure retention of the overcap assembly 102. Such alignment assistance helps to ensure that the actuating button 112 is positioned correctly onto the valve stem 184.

Figure 15:
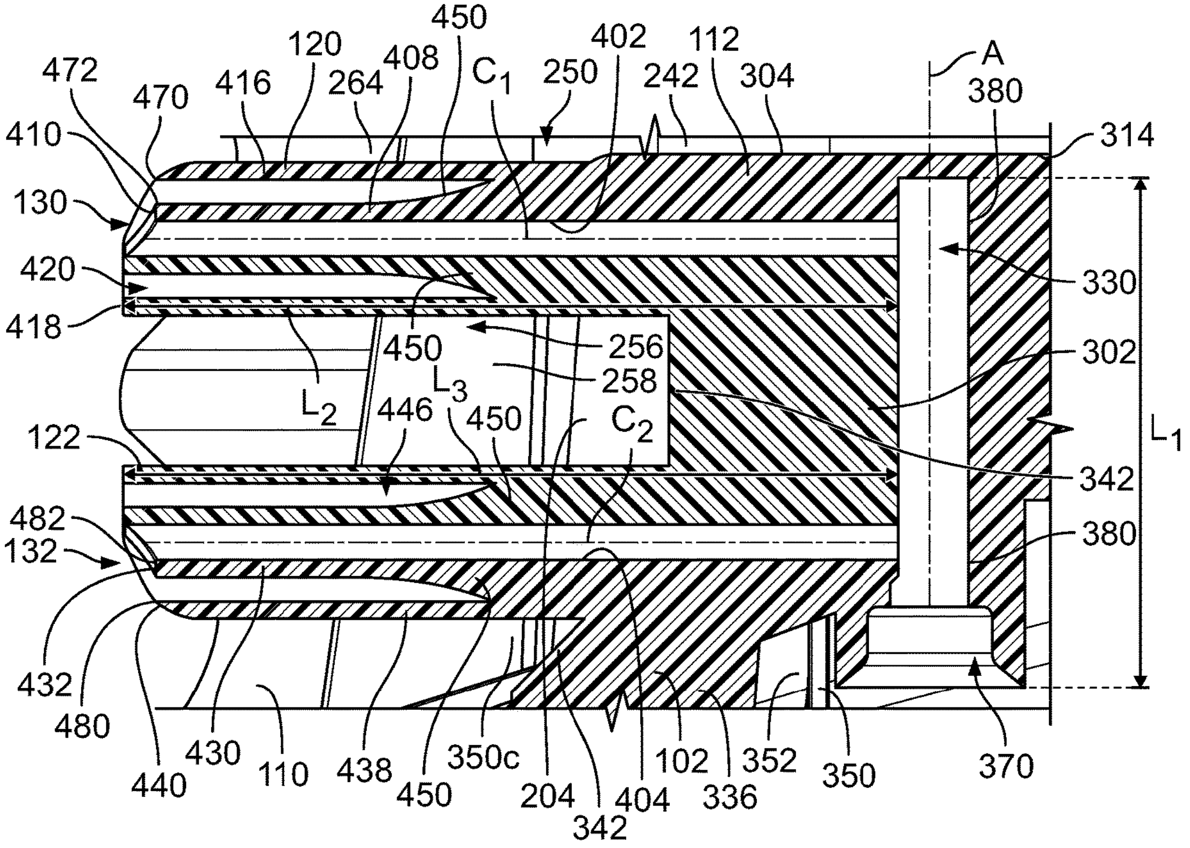
FIG. 15 is a partial, enlarged cross-sectional view of the overcap assembly of FIG. 14.

Referring to FIGS. 14 and 15, the vertical conduit 380 of the actuating button 112 comprises a length $L_1$ (see FIG. 15) and is shown extending upward toward the upper wall 304 of the actuating button 112 along the longitudinal axis A. As discussed above, the vertical conduit 380 is configured to receive a fluid when the actuating button is depressed. As illustrated in FIG. 15, the vertical conduit 380 is intersected at two separate positions by a first horizontal conduit 402 and a second horizontal conduit 404 extending laterally from and/or orthogonal to the vertical conduit 380 and the longitudinal axis A. In particular, the first horizontal conduit 402 and the second horizontal conduit 404 are in fluid communication with the vertical conduit 380, and the first horizontal conduit 402 is positioned above, spaced apart from, and parallel to the second horizontal conduit 404. As illustrated in FIGS. 14 and 15, the first horizontal conduit 402 defines a portion of the first nozzle 120 and the second horizontal conduit 404 defines a portion of the second nozzle 122. The first and the second horizontal conduit 402, 404 extend from the vertical conduit 380 toward the first exit aperture 130 and the second exit aperture 132, respectively. As such, the first exit aperture 130 defines a portion of the first horizontal conduit 402 and the second exit aperture 132 defines a portion of the second horizontal conduit 404. Additionally, the vertical conduit 380, the first horizontal conduit 402, and the second horizontal conduit 404 generally define the fluid passageway 330 of the actuating button 112.

Referring again to FIG. 15, the first horizontal conduit 402 defines a longitudinal axis $C_1$ that is orthogonal to the longitudinal axis A, and the first horizontal conduit 402 defines a length $L_2$. The second horizontal conduit 404 also defines a longitudinal axis $C_2$ that is orthogonal to the longitudinal axis A, and the second horizontal conduit 404 also defines a length $L_3$. As illustrated in FIG. 15, the longitudinal axis $C_1$ is parallel to the longitudinal axis $C_2$ and the length $L_2$ of the first horizontal conduit 402 is equal to the length $L_3$ of the second horizontal conduit 404. In alternative embodiments, first horizontal conduit 402 may comprises a larger or smaller length $L_2$ than the second horizontal conduit 404. As further illustrated in FIG. 15, the length $L_2$ of the first horizontal conduit 402 and the length $L_3$ of the second horizontal conduit 404 are both greater than the length $L_1$ of the vertical conduit 380. However, in alternative embodiments, the length $L_1$ of the vertical conduit 380 may be larger than the length $L_2$ of the first horizontal conduit 402 and/or the length $L_3$ of the second horizontal conduit 404. In preferred embodiments, the length $L_1$ of the vertical conduit 380 can be between about 0.3 inches (7.6 mm) and about 1.5 inches (38.1 mm), the length $L_2$ of the first horizontal conduit 402 can be equal to the length $L_1$ and up to 2.0 times the length $L_1$, i.e., between about 0.3 inches (7.6 mm) and about 3.0 inches (76.2 mm), and the length $L_3$ of the second horizontal conduit 404 can be equal to the length $L_1$ and up to 2.0 times the length of $L_1$, i.e., between about 0.30 inches (7.6 mm) and about 3.0 inches (76.2 mm). It is contemplated that the lengths $L_1$, $L_2$, and $L_3$ can comprise any length such that the overcap assembly 102 can affect the aforementioned spray output.

Referring still to FIG. 15, the first horizontal conduit 402 extends through the actuating button 112 and is surrounded by a first inner cylindrical wall 408. As illustrated in FIG. 15, the first inner cylindrical wall 408 extends substantially parallel to the longitudinal axis $C_1$ from the actuator body 302 of the actuating button 112 to a first inner distal end 410 at the first exit aperture 130. The first inner distal end 410 defines the outermost section (away from the longitudinal axis A) of the first inner cylindrical wall 408. In particular, the first inner distal end 410 defines the first exit aperture 130. As noted herein, the first inner cylindrical wall 408 also defines a portion of the first horizontal conduit 402. As further illustrated in FIG. 15, a first outer cylindrical wall 416 is spaced apart from and surrounds the first inner cylindrical wall 408. The first outer cylindrical wall 416 also extends substantially parallel to the longitudinal axis $C_1$ from the actuator body 302 of the actuating button 112 to a first outer distal end 418, adjacent to the first exit aperture 130. The first outer distal end 418 defines the outermost section (away from the longitudinal axis A) of the first outer cylindrical wall 416. A first interior space 420 is defined between the first outer cylindrical wall 416 and the first inner cylindrical wall 408. The first interior space 420 comprises a generally annular shape and extends entirely around the first inner cylindrical wall 408, inside the first outer cylindrical wall 416. As a result, the first interior space 420 can be configured to catch any liquid that may drip or spill out of the first exit aperture 130. In some embodiments, the first interior space 420 may not be annular and may not extend entirely around the first inner cylindrical wall 408. Therefore, it is contemplated that the first interior space 420 may comprise any shape or configuration around or partially around the first inner cylindrical wall 408, so long as a portion of the first interior space 420 is provided to catch any liquid that may drip or spill out of the first exit aperture 130. As further noted herein, the first horizontal conduit 402, the first inner cylindrical wall 408, the first outer cylindrical wall 416, and the first exit aperture 130 define the first nozzle 120.

Referring again to FIG. 15, the second horizontal conduit 404, positioned below the first horizontal conduit 402, extends through the actuating button 112 and is surrounded by a second inner cylindrical wall 430. As illustrated in FIG. 15, the second inner cylindrical wall 430 extends substantially parallel to the longitudinal axis $C_2$ from the actuator body 302 of the actuating button 112 to a second inner distal end 432 at the second exit aperture 132. The second inner distal end 432 defines the outermost section (away from the longitudinal axis A) of the second inner cylindrical wall 430. In particular, the second inner distal end 432 defines the second exit aperture 132. As noted herein, the second inner cylindrical wall 430 also defines a portion of the second horizontal conduit 404. As further illustrated in FIG. 15, a second outer cylindrical wall 438 is spaced apart from and surrounds the second inner cylindrical wall 430. The second outer cylindrical wall 438 also extends substantially parallel to the longitudinal axis $C_2$ from the actuator body 302 of the actuating button 112 to a second outer distal end 440, adjacent to the second exit aperture 132. The second outer distal end 440 defines the outermost section (away from the longitudinal axis A) of the second outer cylindrical wall 438. A second interior space 446 is defined between the second outer cylindrical wall 438 and the second inner cylindrical wall 430. The second interior space 446 comprises a generally annular shape and extends entirely around the second inner cylindrical wall 430, inside the second outer cylindrical wall 438. Similar to the first interior space 420, the second interior space 446 can be configured to catch any liquid that may drip or spill out of the second exit aperture 132. In some embodiments, the second interior space 446 may not be annular and may not extend entirely around the second inner cylindrical wall 430. Therefore, it is contemplated that the second interior space 446 may comprise any shape or configuration around or partially around the second inner cylindrical wall 430, so long as a portion of the second interior space 446 is provided to catch any liquid that may drip or spill out of the second exit aperture 132. As further noted herein, the second horizontal conduit 404, the second inner cylindrical wall 430, the second outer cylindrical wall 438, and the second exit aperture 132 define the second nozzle 122.

Referring to FIGS. 7 and 15, a plurality of ribs 450 extend in-between the first and the second outer cylindrical wall 416, 438 and the first and the second inner cylindrical wall 408, 430, respectively. In particular, the ribs 450 offer additional support to the first and the second nozzle 120, 122. As illustrated in FIG. 7, the ribs 450 are provided in the first interior space 420 and the second interior space 446. Specifically, each nozzle 120, 122 includes four ribs 450 on each side of the first and the second inner cylindrical wall 408, 430, i.e., top, bottom, right, and left side. As illustrated in FIG. 15, the ribs 450 taper toward the longitudinal axis $C_1$ and $C_2$ as they extend from the actuator body 302 toward the first and the second exit aperture 130, 132. In alternative embodiments, each of the nozzles 120, 122 can comprises more or fewer ribs 450.

Referring still to FIG. 15, the first and the second inner cylindrical wall 408, 430 and the first and the second outer cylindrical wall 416, 438 facilitate ribbing for the first and the second nozzle 120, 122, respectively. In particular, the first and the second inner cylindrical wall 408, 430 and the first and the second outer cylindrical wall 416, 438 allow the first and the second nozzle 120, 122 to be double walled. This double walled configuration gives the first and the second nozzles 120, 122 additional support and, therefore, limits deformation in the first and the second nozzle 120, 122. Additionally, the double walled configuration limits the first and the second nozzle 120, 122 from warping, which limits the spray paths of the first and the second nozzle 120, 122 from colliding. Further, besides offering structural support for the first and the second nozzle 120, 122, the double walled configuration also provides a unique visual cue and a recognizable appearance to the user. Specifically, the double walled configuration of the first and the second nozzle 120, 122 shifts the user's attention to the geometry used for the first and second exit apertures 130, 132 in the first and second nozzles 120, 122.

Figure 16:
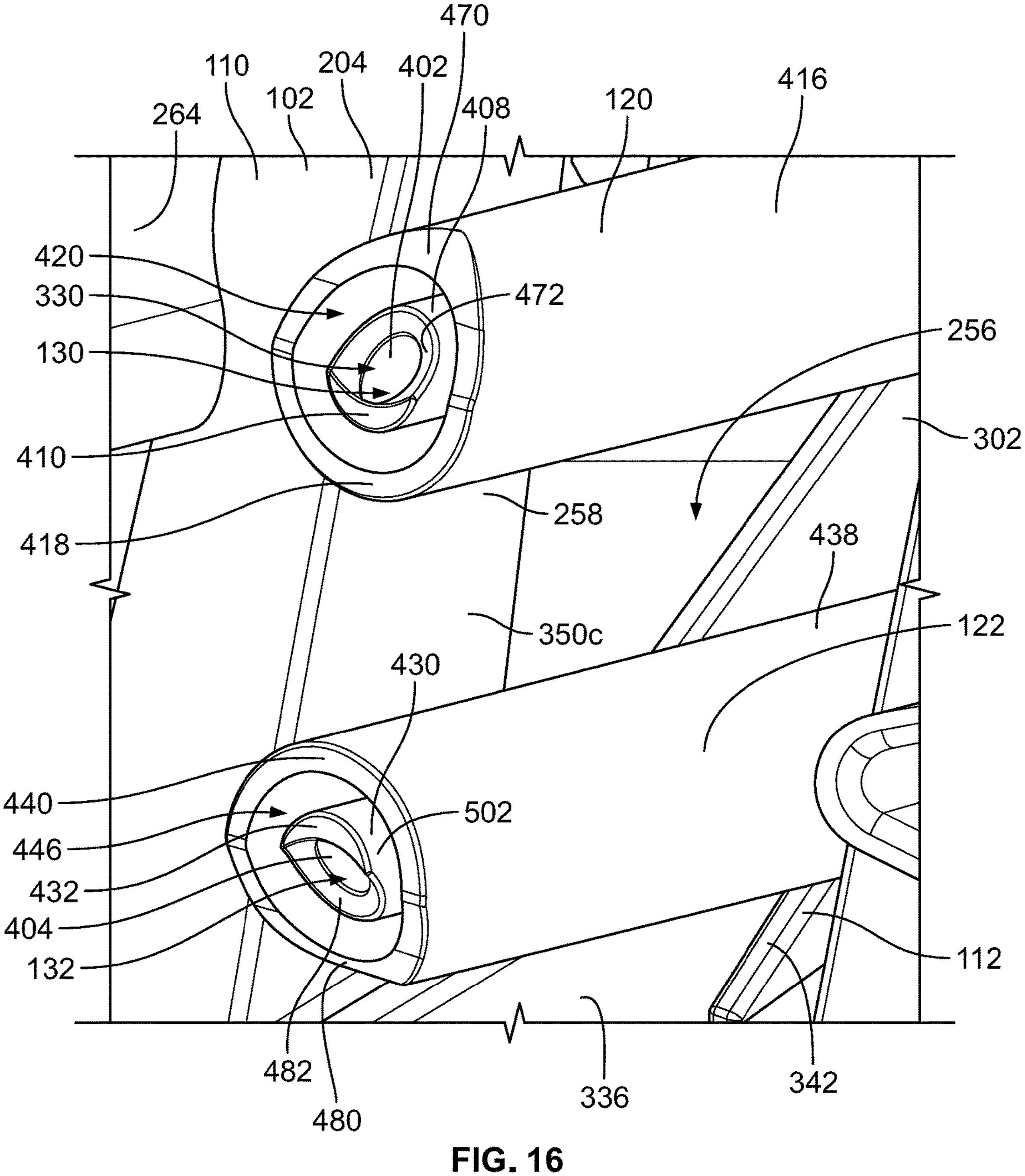
FIG. 16 is a top, front isometric view of a first and a second exit aperture of the overcap assembly of FIG. 5.
Figure 17:
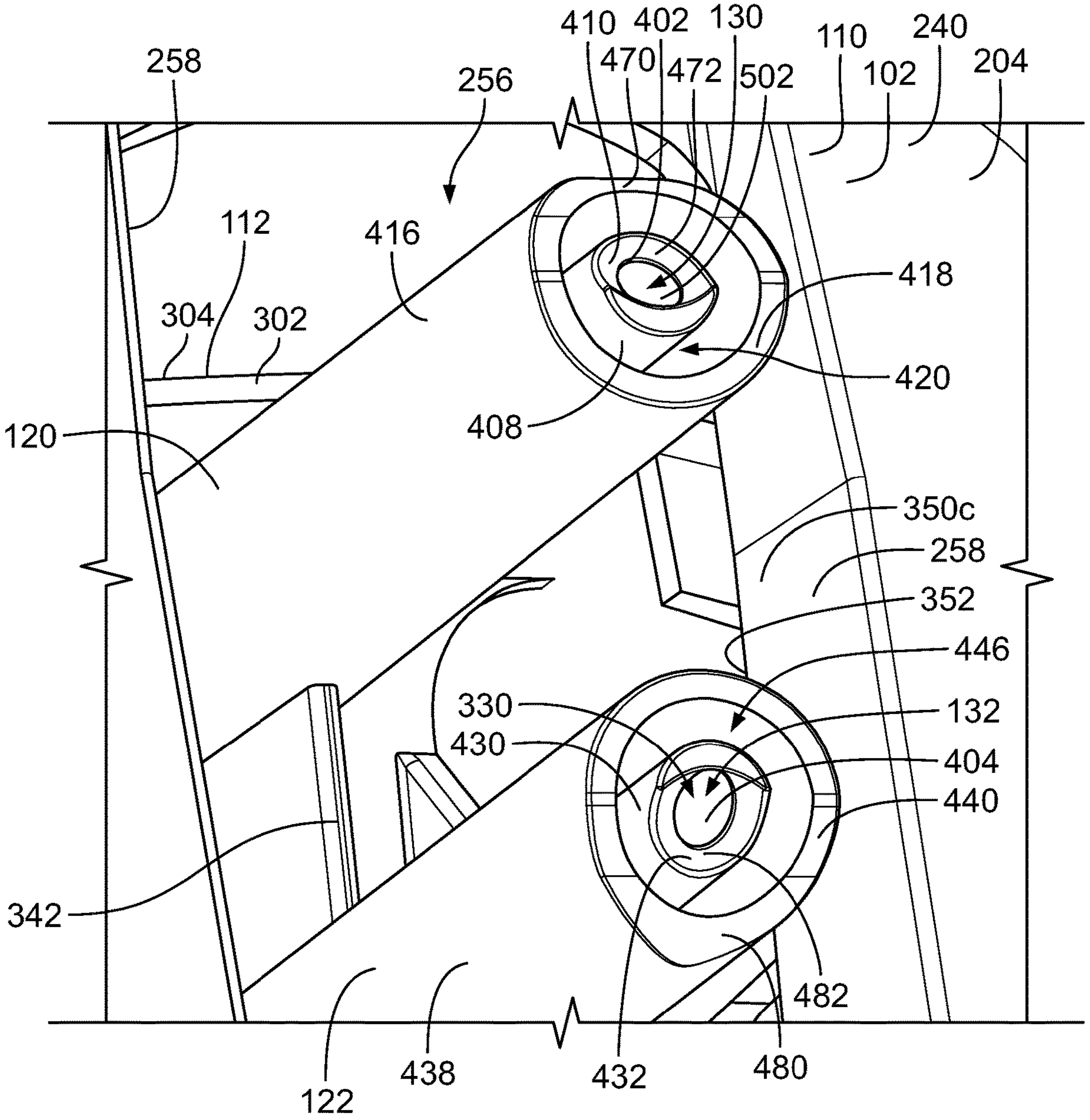
FIG. 17 is a bottom, front isometric view of the first and the second exit apertures of the overcap assembly of FIG. 16.

Referring to FIGS. 15-17, the first and second exit apertures 130, 132 are shown having a spherical opening angled with respect to the longitudinal axis $C_1$ and $C_2$, respectively. In particular, the first exit aperture 130 is configured to direct the fluid from the container 104 in an upward direction with respect to the longitudinal axis $C_1$, and the second exit aperture 132 is configured to direct the fluid from the container 104 in a downward direction with respect to the longitudinal axis $C_2$ (see FIG. 15). Put differently, the geometries of the first exit aperture 130 and the second exit aperture 132 are positioned 1800 opposite from each other in a vertical orientation.

Referring to FIG. 15, the first exit aperture 130 and the second exit aperture 132 are not perpendicular and square to the longitudinal axis $C_1$ and $C_2$. Instead, the first inner distal end 410 of the first inner cylindrical wall 408 and the second inner distal end 432 of the second inner cylindrical wall 430 are spherically cut or truncated at an angle square to the longitudinal axis $C_1$ and $C_2$, i.e., non-parallel to the longitudinal axis A. In particular, portions of the first inner distal end 410 of the first inner cylindrical wall 408 and the second inner distal end 432 of the second inner cylindrical wall 430 form curved surfaces or arcs therein (see FIGS. 16-19). Since the first and the second inner distal ends 410, 432 of the first and the second nozzles 120, 122 are spherically cut at an angle with respect to the longitudinal axis $C_1$ and $C_2$, the fluid from the container 104 may be directed in diverging directions from one another. The angled spherical cuts defining the first and the second exit aperture 130, 132 allow the fluid to travel farther from the overcap assembly 102 and produce a larger spray pattern or profile on a target. As such, the first and the second nozzle 120, 122 allow the user to not be as accurate while aiming the overcap assembly 102, i.e., the overcap assembly 102 creates a larger and farther moving fluid footprint over the target area. Further, the spherical geometric pattern on the first and the second exit aperture 130, 132 allow the fluid to flow better while exiting the first and the second exit aperture 130, 132. Specifically, the spherical geometry pattern on the first and the second exit aperture 130, 132 limits impingement of the fluid flow and provides better atomization of the fluid.

Figure 18:
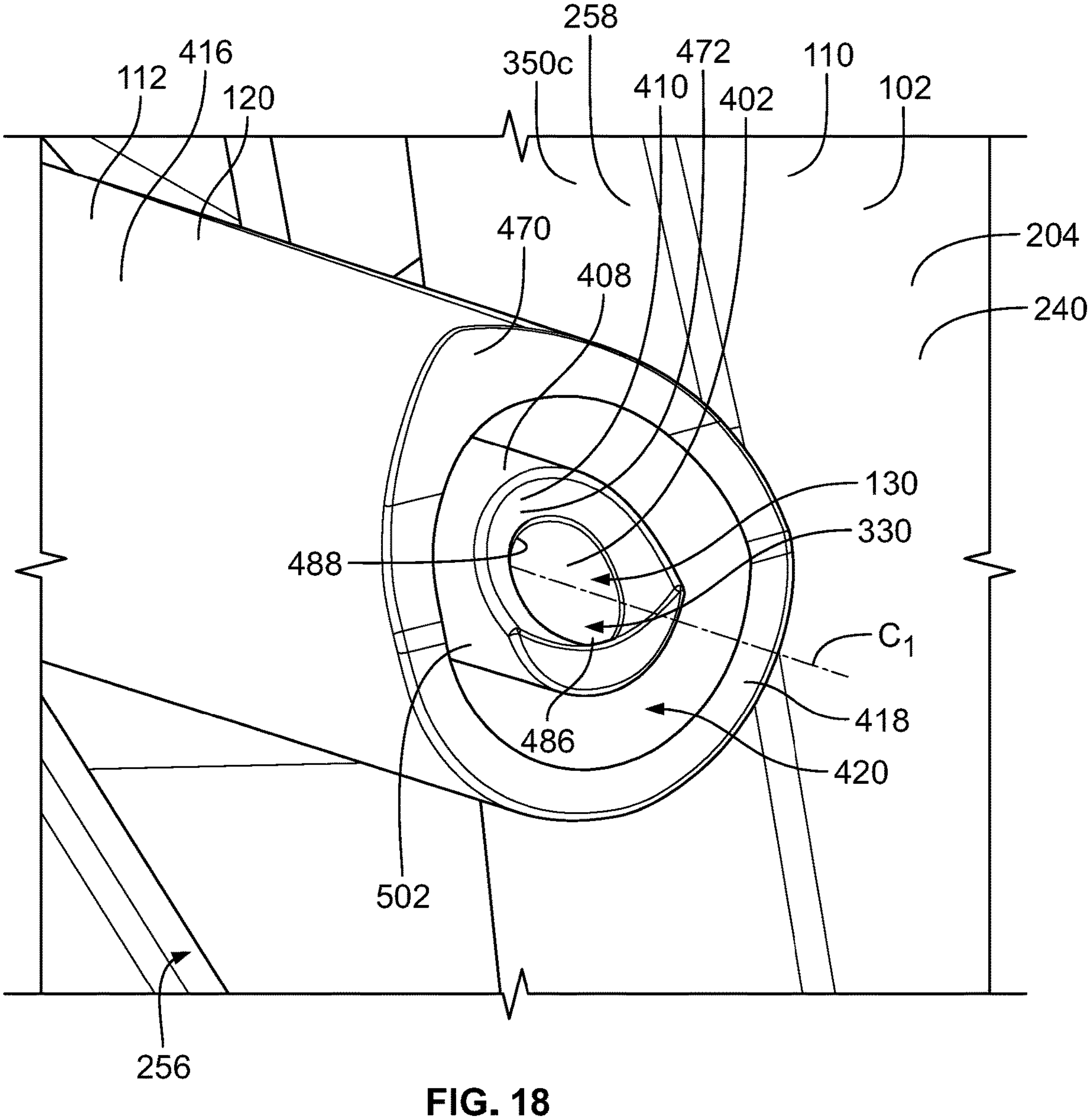
FIG. 18 is an enlarged, top, front isometric view of the first exit aperture of the overcap assembly of FIG. 16.

Referring to FIG. 18, the first inner distal end 410 of the first inner cylindrical wall 408, defining the first exit aperture 130, is shown having a spherical opening that is angled upward with respect to the longitudinal axis $C_1$. Specifically, the first inner cylindrical wall 408 extends farther below the longitudinal axis $C_1$ than above it. Therefore, fluid moving through the first nozzle 120 may be directed upwards at an angle with respect to the longitudinal axis $C_1$. Since the first inner distal end 410 of the first inner cylindrical wall 408 is configured to direct fluid upward, the first outer distal end 418 of the first outer cylindrical wall 416 is also cut at a similar angle with respect to the longitudinal axis $C_1$ as the first inner distal end 410. In particular, the first outer cylindrical wall 416 compliments the first inner cylindrical wall 408 such that there is no (or substantially no) impingement of the flow during actuation of the overcap assembly 102. As such, a top portion 470 of the first outer distal end 418 is vertically positioned or aligned above a top portion 472 of the first inner distal end 410 (see FIG. 15). As noted herein, the top portion 472 of the first inner distal end 410 and the top portion 470 of the first outer distal end 418 define the points or portions of the first inner distal end 410 and the first outer distal end 418, respectively, that extend the least along the horizontal direction (away from the longitudinal axis A), as illustrated in FIG. 15. Therefore, flow exiting the first exit aperture 130 will not be caught by the first outer cylindrical wall 416 or the first inner cylindrical wall 408. In some embodiments, the top portion 470 of the first outer distal end 418 may not extend as far as shown in FIG. 15. Therefore, it is contemplated that the first inner cylindrical wall 408 and the first outer cylindrical wall 416 may extend along the horizontal direction to any length from the longitudinal axis A (see FIG. 15). For example, in some embodiments, the first inner cylindrical wall 408 may extend farther along the horizontal direction (away from the longitudinal axis A) than the first outer cylindrical wall 416. Further, in alternative embodiments, the first outer distal end 418 of the first outer cylindrical wall 416 may comprise multiple sections or portions that have varying length from the longitudinal axis A. For example, a top and bottom portion (relative to the longitudinal axis $C_1$) of the first outer distal end 418 may extend to one position along the horizontal direction from the longitudinal axis A while the sides of the first outer distal end 418 may extend to a different position along the horizontal direction from the longitudinal axis A.

Figure 19:
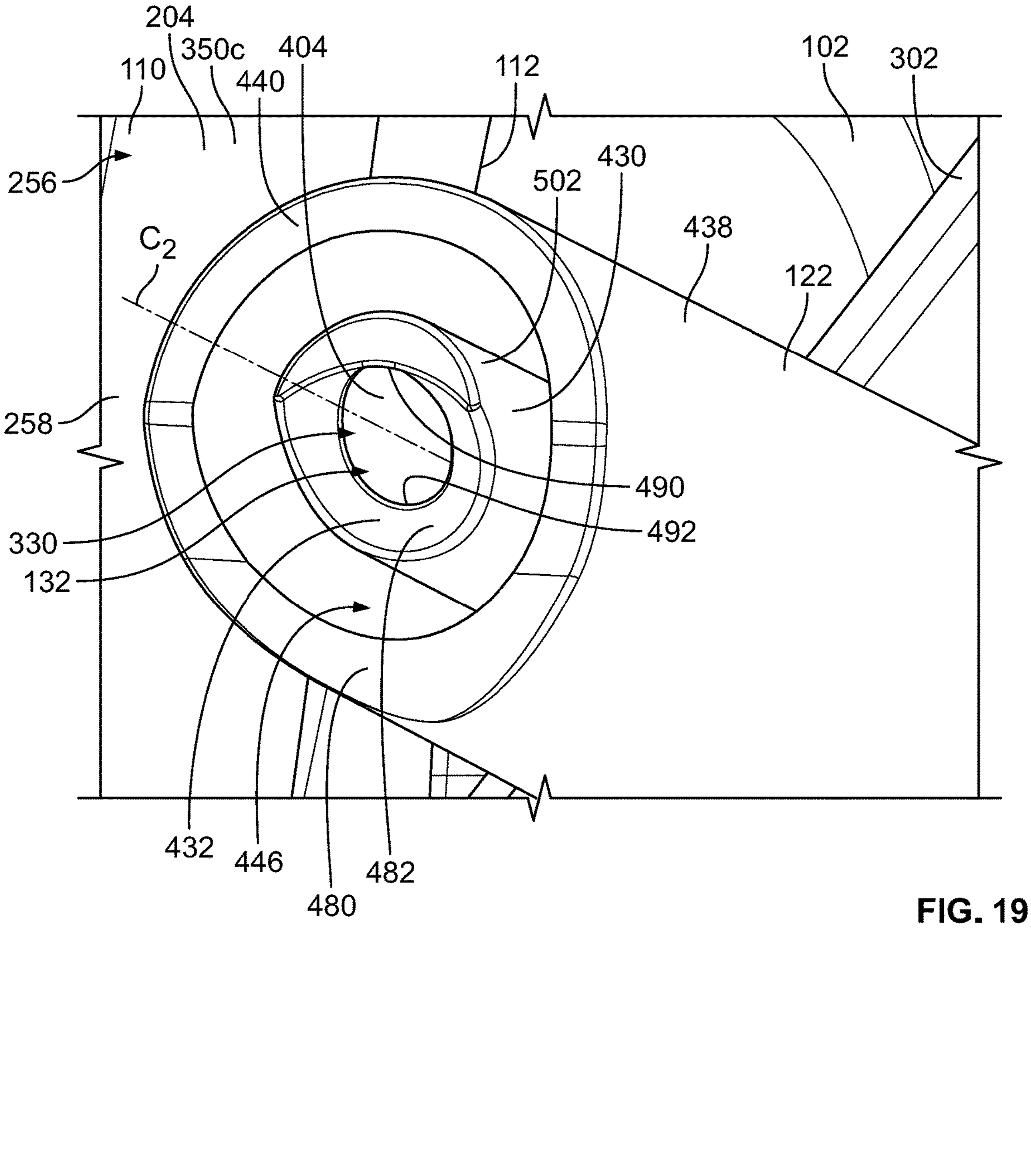
FIG. 19 is an enlarged, bottom, front isometric view of the second exit aperture of the overcap assembly of FIG. 16.

Referring to FIG. 19, the second inner distal end 432 of the second inner cylindrical wall 430, defining the second exit aperture 132, is shown having a spherical opening that is angled downward with respect to the longitudinal axis $C_2$. Specifically, the second inner cylindrical wall 430 extends farther above the longitudinal axis $C_2$ than below it. Therefore, fluid moving through the second nozzle 122 may be directed downwards at an angle with respect to the longitudinal axis $C_2$. Since the second inner distal end 432 of the second inner cylindrical wall 430 is configured to direct fluid downward, the second outer distal end 440 of the second outer cylindrical wall 438 is also cut at a similar angle with respect to the longitudinal axis $C_2$ as the second inner distal end 432. In particular, the second outer cylindrical wall 438 compliments the second inner cylindrical wall 430 such that there is no (or substantially no) impingement of the flow during actuation of the overcap assembly 102. As such, a bottom portion 480 of the second outer distal end 440 is vertically positioned or aligned below a bottom portion 482 of the second inner distal end 432 (see FIG. 15). As noted herein, the bottom portion 482 of the second inner distal end 432 and the bottom portion 480 of the second outer distal end 440 define the points or portions of the second inner distal end 432 and the second outer distal end 440, respectively, that extend the least along the horizontal direction (away from the longitudinal axis A), as illustrated in FIG. 15. Therefore, flow exiting the second exit aperture 132 will not be caught by the second outer cylindrical wall 438 or the second inner cylindrical wall 430. In some embodiments, the bottom portion 480 of the second outer distal end 440 may not extend as far as shown in FIG. 15. Therefore, it is contemplated that the second inner cylindrical wall 430 and the second outer cylindrical wall 438 may extend along the horizontal direction to any length from the longitudinal axis A (see FIG. 15). For example, in some embodiments, the second inner cylindrical wall 430 may extend farther along the horizontal direction (away from the longitudinal axis A) than the second outer cylindrical wall 438. Further, in alternative embodiments, the second outer distal end 440 of the second outer cylindrical wall 438 may comprise multiple sections or portions that have varying length from the longitudinal axis A. For example, a top and bottom portion (relative to the longitudinal axis $C_2$) of the second outer distal end 440 may extend to one position along the horizontal direction from the longitudinal axis A while the sides of the second outer distal end 440 may extend to a different position along the horizontal direction from the longitudinal axis A.

Referring to FIGS. 15-19, the first and the second exit aperture 130, 132 are shown having a spherical cut at an angle relative to the longitudinal axis $C_1$ and $C_2$. As noted herein, a spherical cut refers to any type of cut/cut-out where portions of the first inner distal end 410 of the first inner cylindrical wall 408 and/or the second inner distal end 432 of the second inner cylindrical wall 430 are defined by a curved or arched surface creating an arc. However, in some embodiments, the first and the second exit aperture 130, 132 may comprise any type of geometric cut. In particular, the first inner distal end 410 of the first inner cylindrical wall 408 and the second inner distal end 432 of the second inner cylindrical wall 430 may comprise any type of spherical, spheroid, curved, or angled cut such that the fluid from the container 104 is directed in different or diverging directions. For example, in some embodiments, the first inner distal end 410 of the first inner cylindrical wall 408 and the second inner distal end 432 of the second inner cylindrical wall 430 may comprise a straight-line angled cut instead of a spherical cut. Further, in other embodiments, the first nozzle 120 may comprise one type of cut, e.g., spherical cut, and the second nozzle 122 may comprises a different type of cut, e.g., straight-line angled cut. Furthermore, in some embodiments, the first inner distal end 410 of the first inner cylindrical wall 408, defining the first exit aperture 130, and the second inner distal end 432 of the second inner cylindrical wall 430, defining the second exit aperture 132, may comprise a radial spray pattern instead of an angled pattern. In other embodiments, the first inner distal end 410 of the first inner cylindrical wall 408 and/or the second inner distal end 432 of the second inner cylindrical wall 430 may comprise one or more surfaces or portions with a combination of curves and straight-line cuts. Therefore, it is contemplated that the first nozzle 120 and the second nozzle 122 can comprise any type of geometric angled or radial cut. Furthermore, it is also contemplated that the first nozzle 120 and the second nozzle 122 may have a straight cut, orthogonal to the longitudinal axis $C_1$ and $C_2$. As discussed above, in some embodiments, the overcap assembly 102 may include a third nozzle extending between and aligned with (vertically between, i.e., along the longitudinal axis A) the first nozzle 120 and the second nozzle 122. The third nozzle may be identical to the first nozzle 120 and/or the second nozzle 122. In some embodiments, the third nozzle may be identical to the first nozzle 120 and/or the second nozzle 122 except for an exit aperture of the third nozzle. For example, the exit aperture of the third nozzle may include a straight cut, orthogonal to the longitudinal axis of the third nozzle, i.e., substantially parallel with the longitudinal axis A and/or substantially orthogonal to the longitudinal axis $C_1$ and $C_2$, instead of an angled, spherical cut like the first and second exit apertures 130, 132. Therefore, in use, the first nozzle 120 and the second nozzle 122 would spray the fluid moving through the overcap assembly 102 in diverging directions while the third nozzle would spray the fluid moving through the overcap assembly 102 in a substantially straight direction. It is contemplated that the third nozzle may direct the fluid in a similar or different direction than the first nozzle 120 and/or the second nozzle 122. In some embodiments, the first inner distal end 410 of the first inner cylindrical wall 408 and the second inner distal end 432 of the second inner cylindrical wall 430 may comprise a rounded lip.

As will be discussed in further detail herein, the first inner distal end 410 of the first inner cylindrical wall 408 and the second inner distal end 432 of the second inner cylindrical wall 430 may be cut at any angle relative to the longitudinal axis $C_1$ and $C_2$. Therefore, it is contemplated that the first exit aperture 130 and the second exit aperture 132 can direct fluid in any direction. It is further contemplated that the first exit aperture 130 and the second exit aperture 132 can direct fluid in the same direction, converging directions, diverging directions, or combinations thereof.

Figure 20:
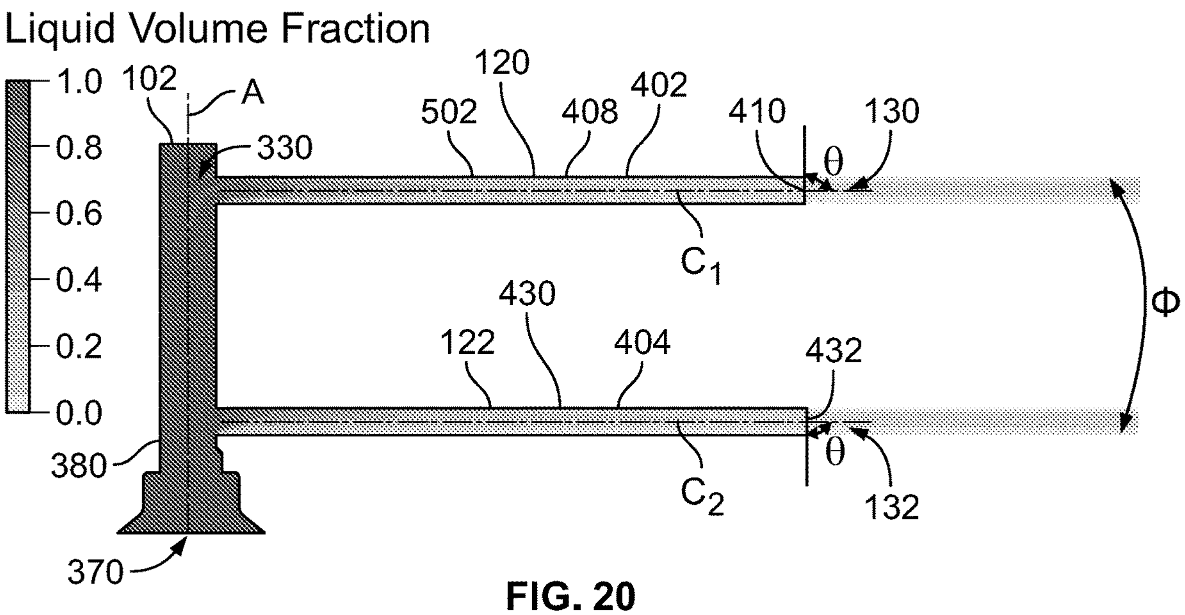
FIG. 20 is a computational fluid dynamics model of a fluid passageway of the overcap assembly of FIG. 5 having an angle $\Theta$ of 90°.
Figure 21:
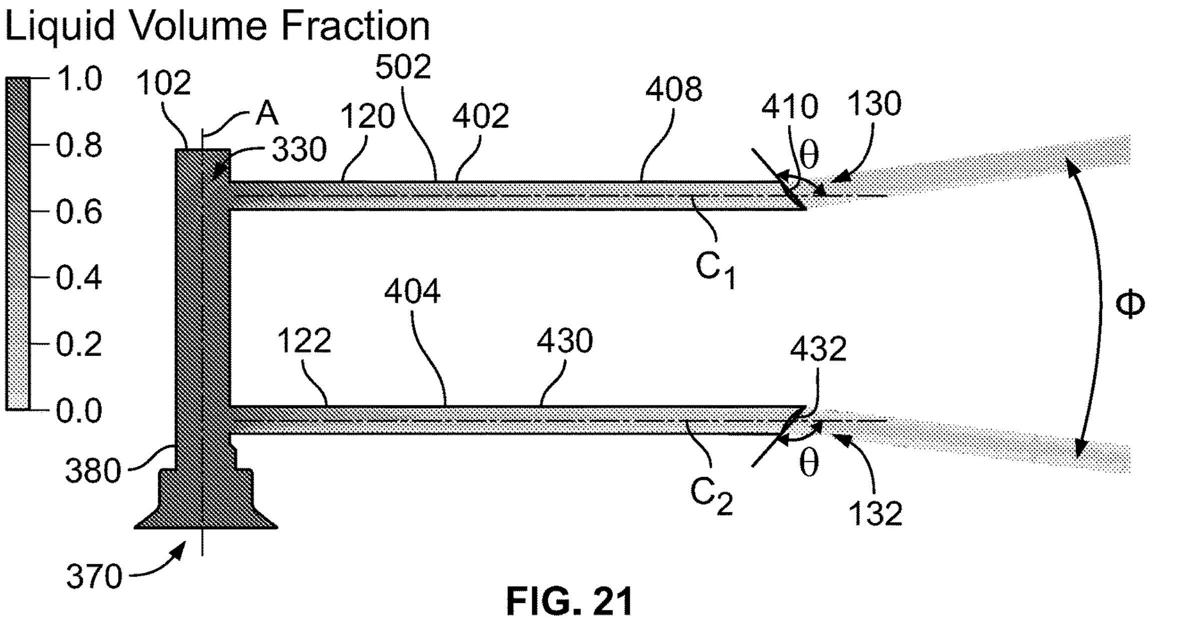
FIG. 21 is another computational fluid dynamics model of a fluid passageway of the overcap assembly of FIG. 5 having an angle $\Theta$ of 130°.
Figure 22:
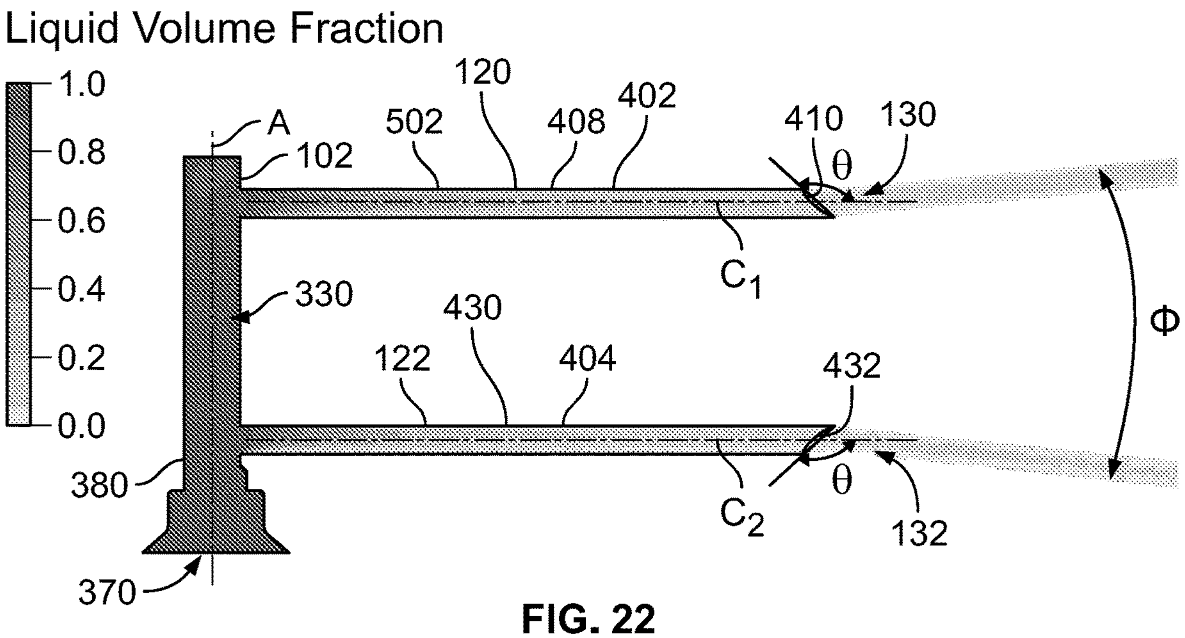
FIG. 22 is yet another computational fluid dynamics model of a fluid passageway of the overcap assembly of FIG. 5 having an angle Θ of 140°.

Referring to FIG. 20-22, computational fluid dynamics models of the fluid passageway 330 are shown having different angled first and second exit apertures 130, 132. In particular, each figure shows the direction of the fluid exiting the first and the second exit aperture 130, 132 depending on the angle of the cut taken on the first inner distal end 410 of the first inner cylindrical wall 408 and the second inner distal end 432 of the second inner cylindrical wall 430. As noted herein, an angle Θ represents the angle of the cut relative to the longitudinal axis $C_1$ and $C_2$. In particular, the angle Θ is measured from the longitudinal axis $C_1$ and $C_2$ to the topmost edge (relative to the longitudinal axis $C_1$) of the first inner distal end 410 and to a bottom most edge (relative to the longitudinal axis $C_2$) of the second inner distal end 132 when viewed from the sectional view of FIGS. 21 and 22. Further, an angle (represents the angle between the fluid exiting the first nozzle 120 and the fluid exiting the second nozzle 122. As would be apparent to those of ordinary skill of the art, the computational fluid dynamics models shown in FIGS. 20-22 illustrate the angle of the flow of the fluid immediately outside the first nozzle 120 and the second nozzle 122, prior to the flow expanding in the atmosphere.

Referring to FIG. 20, the angle Θ is about 90°, i.e., the first and the second exit aperture 130, 132 are perpendicular and square to the longitudinal axis $C_1$ and $C_2$. Therefore, the angle (between the fluid leaving the first and the second nozzle 120, 122 is 0° since the first and the second exit aperture 130, 132 are not angled. FIG. 20 illustrates the flow of fluid in typical double nozzle configurations.

Referring to FIG. 21, the angle Θ is about 130°, i.e., the first inner distal end 410 of the first inner cylindrical wall 408 and the second inner distal end 432 of the second inner cylindrical wall 430 are spherically cut at an angle of about 130°. As such, the angle (between the fluid leaving the first and the second nozzle 120, 122 is about 11°. As noted herein, the angle Θ of the first and the second exit aperture 130, 132 of the overcap assembly 102 illustrated in FIGS. 1, 3-19, and 26 is about 130° relative to the longitudinal axis $C_1$ and $C_2$, respectively. However, in some embodiments, the angle Θ can be between about 90° and about 170°, or between about 100° and about 160°, or between about 110° and about 150°, or about 130°, or at least 90°, or at least 100°, or at least 110°, or at least 130°, or at least 150°. In preferred embodiments, the angle Θ is between about 90° and about 150°.

Referring to FIG. 22, the angle Θ is about 140°, i.e., the first inner distal end 410 of the first inner cylindrical wall 408 and the second inner distal end 432 of the second inner cylindrical wall 430 are spherically cut at an angle of about 140°. Thus, the angle (between the fluid leaving the first and the second nozzle 120, 122 is about 13°. Therefore, depending on the angle Θ used, the angle Φ of the fluid leaving the first and the second nozzle 120, 122 can be altered accordingly. In some embodiments, the angle (can be between about 1° and about 80°, or between about 3° and about 40°, or between about 5° and 20°, or between about 9° and 15°, or at least 10, or at least 3°, or at least 5°, or at least 9°, or at least 15°, or at least 20°. However, in preferred embodiments, the angle Φ is between about 9° and 15°.

As further noted herein, the angle of the second exit aperture 132 will be opposite the angle Θ of the first exit aperture 130. For example, the angle Θ of the first exit aperture 130 in FIG. 21 is about 130° above the longitudinal axis $C_1$, whereas the angle Θ of the second exit aperture 132 in FIG. 21 is about 130° below the longitudinal axis $C_2$. As discussed above, it is contemplated that the first inner distal end 410 of the first inner cylindrical wall 408 and the second inner distal end 432 of the second inner cylindrical wall 430 can be cut at any angle relative to the longitudinal axis $C_1$ and $C_2$ to form the first and the second exit aperture 130, 132 such that the fluid flowing from the first and the second exit aperture 130, 132 are directed in different or diverging directions.

Figure 23:
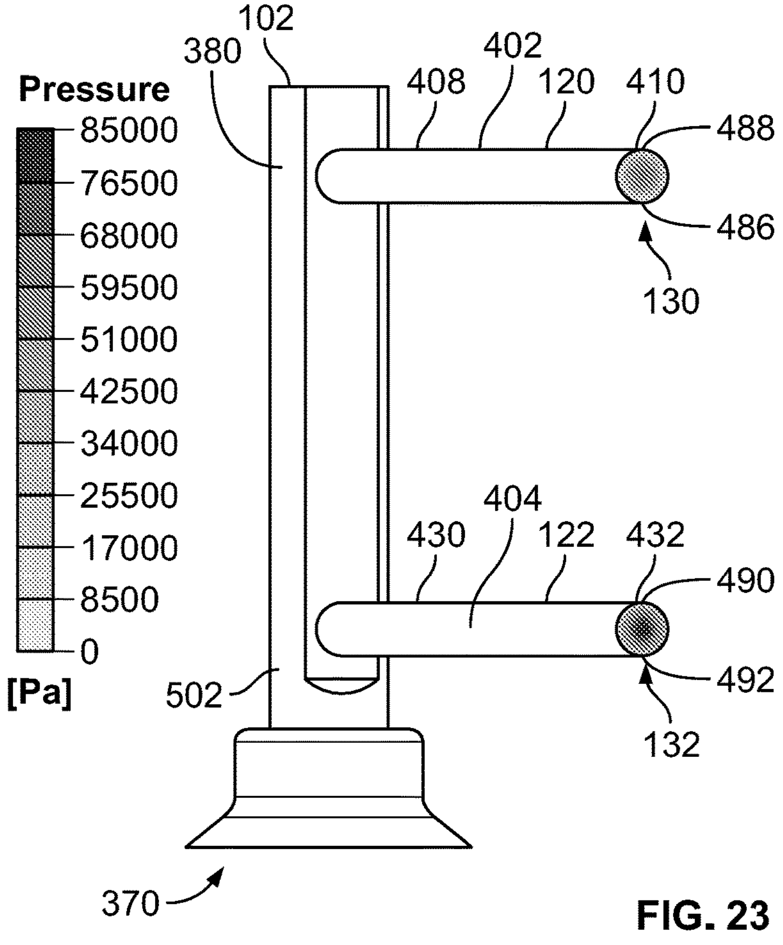
FIG. 23 is a pressure profile of a fluid at a first and a second exit aperture of the overcap assembly of FIG. 5 having an angle Θ of 90°.
Figure 24:
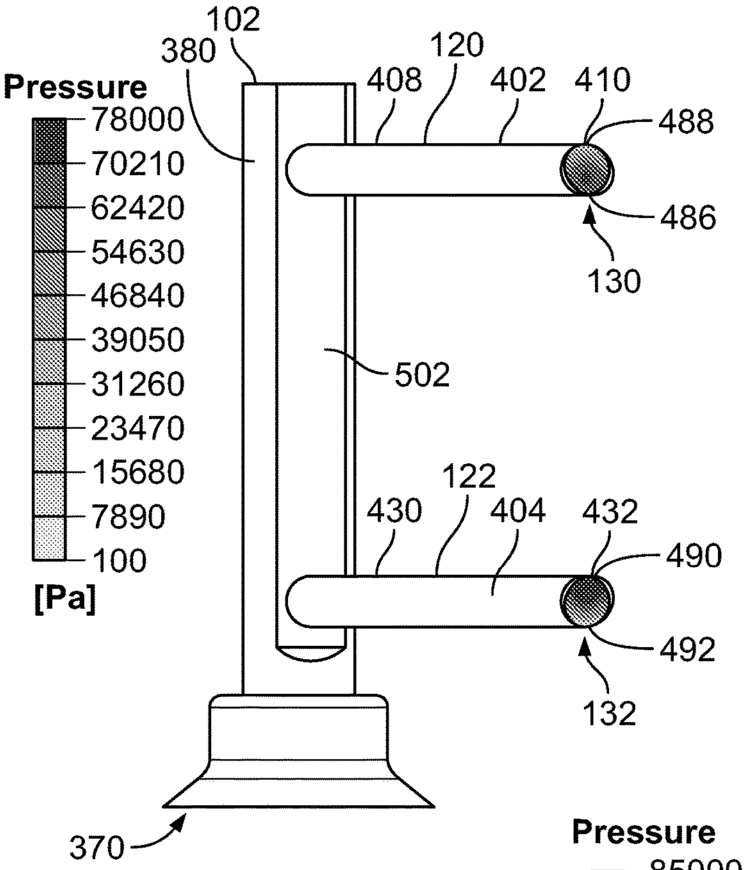
FIG. 24 is another pressure profile of a fluid at a first and a second exit aperture of the overcap assembly of FIG. 5 having an angle Θ of 130°.
Figure 25:
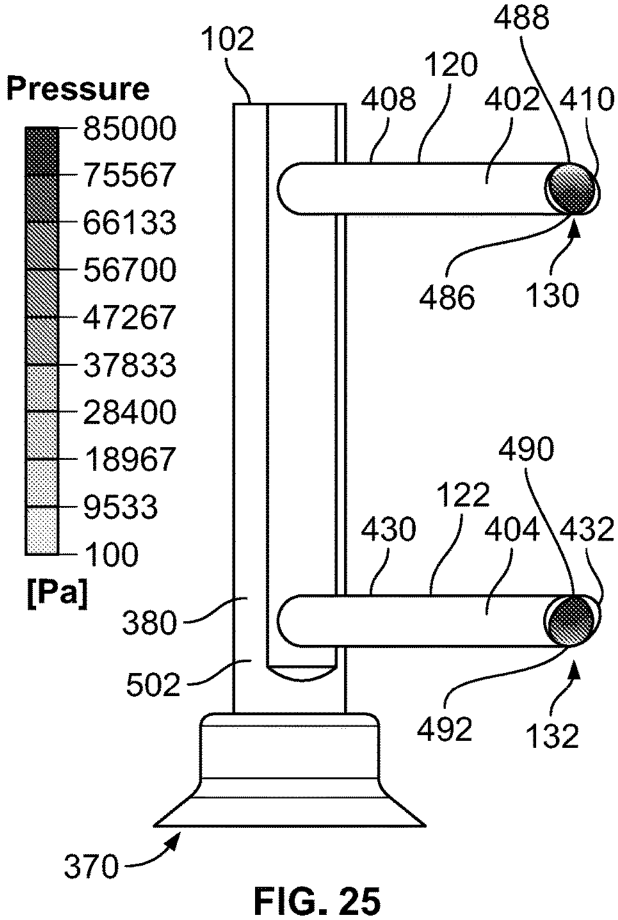
FIG. 25 is yet another pressure profile of a fluid at a first and a second exit aperture of the overcap assembly of FIG. 5 having an angle Θ of 140°.

Referring to FIGS. 23-25, pressure profiles of the fluid at the first and the second exit aperture 130, 132 during actuation of the overcap assembly 102 are shown. In particular, FIG. 23 illustrates the pressure profile when the angle Θ of the first and the second exit apertures 130, 132 is about 90°, i.e., the first inner distal end 410 of the first inner cylindrical wall 408 and the second inner distal end 432 of the second inner cylindrical wall 430 are cut orthogonal to the longitudinal axis $C_1$ and $C_2$ (see FIG. 20). As illustrated in FIG. 23, the pressure profile is symmetrical (or substantially symmetrical) about the center of the first and the second exit aperture 130, 132. As noted herein, FIGS. 23-25 illustrate the pressure profiles of the fluid at the first and the second exit aperture 130, 132 just before the fluid reaches the atmosphere.

Referring to FIG. 24, the angle Θ of the first and the second exit aperture 130, 132 is about 130° (see FIG. 21). As such, the pressure of the fluid is higher near a bottom portion 486 of the first horizontal conduit 402 than a top portion 488 of the first horizontal conduit 402. Additionally, the pressure of the fluid is higher near a top portion 490 of the second horizontal conduit 404 than a bottom portion 492 of the second horizontal conduit 404. Thus, the pressure profile of the fluid exiting the angled first and second exit apertures 130, 132 (see FIG. 24) is different than the pressure profile of the fluid exiting the non-angled first and second exit apertures 130, 132 (see FIG. 23). In particular, the pressure profile or gradient of the fluid follows the shape of the first and the second exit apertures 130, 132 when Θ equals 90° (see FIG. 23). In other words, the fluid profile has a circular uniform distribution of pressure around the center of the first and the second exit aperture 130, 132 when Θ equals 90° (see FIG. 23). Alternatively, the pressure profile or gradient of the fluid is asymmetrical to the shape of the first and the second exit aperture 130, 132 when Θ is greater than 900 (see FIGS. 24 and 25). Therefore, as the angle Θ increases from 90°, the pressure profile of the fluid will move away from a symmetrical gradient.

Referring to FIG. 25, the angle Θ of the first and the second exit aperture 130, 132 is about 140° (see FIG. 22). As a result, similar to FIG. 24, the pressure of the fluid in FIG. 25 is highest near the bottom portion 486 of the first horizontal conduit 402 or first nozzle 120 and the top portion 488 of the second horizontal conduit 404 or second nozzle 122.

Referring to FIGS. 23-25, the pressure profile of the fluid changes depending on the angle Θ used. In particular, when spherically angled first and second exit aperture 130, 132 are used, the pressure of the fluid increases in the bottom of the first horizontal conduit 402 and the top of the second horizontal conduit 404. This results in the pressure gradient of the fluid changing vertically (see FIGS. 24 and 25) as opposed to radially (see FIG. 23) when the first and second exit aperture 130, 132 are not angled. Further, the spherically angled exit apertures 130, 132 increase the pressure across the first and the second exit aperture 130, 132. Specifically, as illustrated in FIG. 25, the pressure profile at the first and the second exit aperture 130, 132 is substantially larger across a larger area than the pressure profile shown in FIG. 23. The larger pressure profiles across the first and the second exit aperture 130, 132 help to better distribute the fluid into the atmosphere and create a wider and/or larger spray area. In preferred embodiments, the first and the second angled exit aperture 130, 132 (see FIGS. 24 and 25) create about a 10%-40% wider and/or larger spray area than non-angled exit apertures 130, 132 (see FIG. 23). In some embodiments, the first and the second angled exit apertures 130, 132 create about a 30% wider and/or larger spray area.

Referring back to FIG. 23, the pressure of the fluid is circumferentially consistent at each radial level of the non-angled first and the second exit aperture 130, 132, i.e., the pressure change between two points on a circumference of a circle inside and centered in the first and the second exit aperture 130, 132 will be generally zero. Put differently, the net pressure gradient around a circumference of a circle defined in the first and the second exit aperture 130, 132 (and centered therein about the longitudinal axes $C_1$, $C_2$) will be generally zero in the non-angled case (see FIG. 23). In contrast, the net pressure gradient around a circumference of a circle in the angled first and the second exit aperture 130, 132 (see FIGS. 24 and 25) is not equal to zero, i.e., the pressure change between two points on a circumference of a circle inside and centered (along the longitudinal axes $C_1$, $C_2$) in the first and the second exit aperture 130, 132 will not be zero. Therefore, as illustrated in FIGS. 24 and 25, the pressure profile of the first and the second exit aperture 130, 132 will be generally irregular when the angle Θ is greater than 90°. In particular, as discussed above, the maximum pressure is located near the bottom portion 486 of the first horizontal conduit 402 and near the top portion 490 of the second horizontal conduit 404. In some embodiments, the net pressure gradient around a circumference of a circle centered (along the longitudinal axes $C_1$, $C_2$) in the angled first and the second exit aperture 130, 132 can be +/−0-300,000 Pa.

Referring to FIGS. 15-19 and 23-25, the first and the second exit aperture 130, 132 and the first and the second horizontal conduit 402, 404 comprise a generally circular cross section (see FIGS. 23-25). However, in alternative embodiments, the first and the second exit aperture 130, 132 and the first and the second horizontal conduit 402, 404 may comprise any type of cross sectional profile. For example, the first and the second exit aperture 130, 132 and the first and the second horizontal conduit 402, 404 may comprise an hourglass shaped profile, a square profile, a triangular profile, or any type of polygonal shaped profile. In some embodiments, the first and the second exit aperture 130, 132 and the first and the second horizontal conduit 402, 404 may be shaped as an ellipse. Depending on the shape of the first and the second exit aperture 130, 132 and the first and the second horizontal conduit 402, 404, the pressure profile of the fluid will generally follow the shape of the first and the second exit aperture 130, 132 and the first and the second horizontal conduit 402, 404 when the angle Θ is equal to 90°. In contrast, the pressure profile of the fluid will differ once the angle Θ is greater than 90°.

Referring back to FIGS. 14 and 15, when a user actuates the actuating button 112 for dispensement, fluid travels through the valve stem 184 (see FIG. 4), into the vertical conduit 380, and into the first and/or the second horizontal conduit 402, 404, where the pressurized fluid exits the overcap assembly 102 into the surrounding atmosphere through the first exit aperture 130 and the second exit aperture 132. Therefore, the fluid may travel out of the actuating button 112 through either the first horizontal conduit 402 or the second horizontal conduit 404. In preferred embodiments, a cross section of the passageway within the vertical conduit 380 is greater than a cross section of the passageway within the first and the second horizontal conduit 402, 404, which may necessarily result in a higher fluid pressure in the first and the second horizontal conduit 402, 404 during dispensement of the fluid. As a result, pressure of the fluid at different points along the fluid passageway 330 can be adjusted based on varying cross-sectional areas of different portions of the fluid passageway 330.

Referring still to FIGS. 14 and 15, the cross section of the passageway within the first horizontal conduit 402 is the same as the cross section of the passageway within the second horizontal conduit 404. However, in alternative embodiments, the cross section of the passageway within the first horizontal conduit 402 may be smaller than the cross section of the passageway within the second horizontal conduit 404 and vise-versa. As such, the discharge rate of the fluid can be balanced between the first horizontal conduit 402 and the second horizontal conduit 404. Further, in some embodiments, the first horizontal conduit 402 and/or the second horizontal conduit 404 may include a choke (see FIGS. 32 and 43). For example, one section of the first horizontal conduit 402 and/or the second horizontal conduit 404 may include a diameter smaller than a different section of the first horizontal conduit 402 and/or the second horizontal conduit 404. The variation and size of the cross section of the passageway for the first and the second horizontal conduits 402, 404 influences the particle droplet size of the fluid. Therefore, the first and the second horizontal conduits 402, 404 may be adjusted to produce an ideal particle droplet size of the fluid. As noted herein, the vertical conduit 380, the first horizontal conduit 402, and the second horizontal conduit 404 define a manifold 502.

Figure 26:
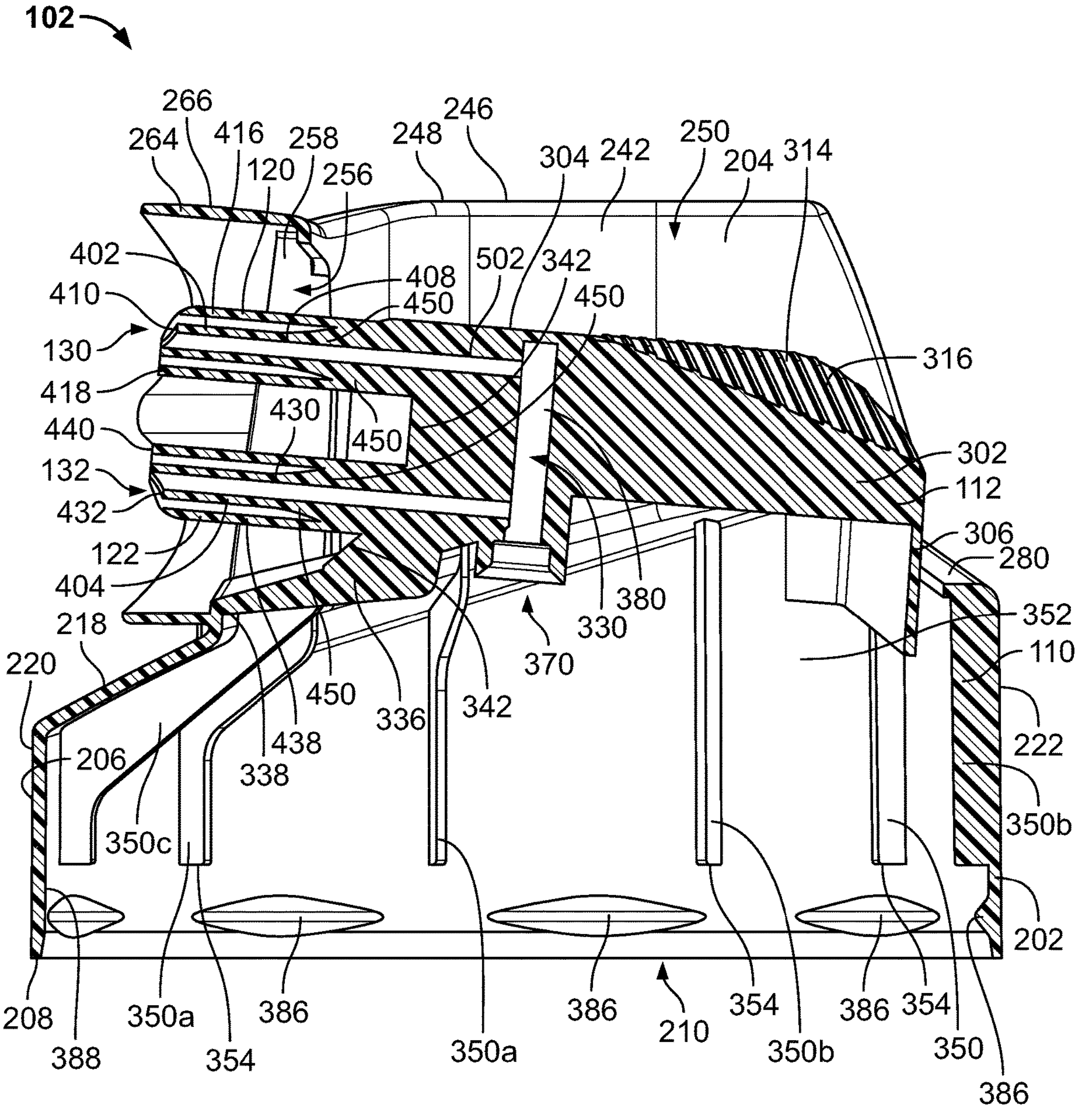
FIG. 26 is a side cross-sectional view of the overcap assembly of FIG. 14 in an actuated state.

Now referring to FIGS. 14 and 26, operation of the overcap assembly 102 will be described in greater detail. The overcap assembly 102 is shown in a non-actuated configuration in FIG. 14 and an actuated configuration in FIG. 26. In use, the product or fluid is sprayed from the dispensing system 100 by exerting a force on the actuating button 112 (see FIG. 4). Referring to FIG. 26, which shows the overcap assembly 102 during actuation, the vertical conduit 380 is forced downward, and presses down on the valve stem 184 (see FIG. 4) to cause the valve assembly to allow product or fluid to enter into the manifold 502. In particular, once the user engages the landing area 314 of the actuating button 112, the actuating button 112 translates and pivots about the pivot point 338. In a preferred embodiment, the valve stem 184 translates between about 0.0 inches (0.0 mm) and about 0.2 inches (5.1 mm) from the non-actuation position to the actuation position (see FIG. 4). Upon removal of force from the actuating button 112, the manifold 502 returns to the non-actuation position, as shown in FIG. 14. The actuating button 112 is moved to the non-actuation position by the force of the valve stem 184 moving upwardly by the valve spring (not shown) to close the valve assembly within the container 104 (see FIG. 4).

It should also be noted that the overcap assembly 102 depicted in FIG. 26 in the actuation state is shown in a fully actuated state. However, depending on the tolerance or specific characteristics of the container and/or valve stem and accompanying valve assembly, it is possible that spraying may be effected either fully or partially by pressing the actuating button 112 downward somewhere between the two positions shown in FIG. 14 (non-actuated) and FIG. 26 (fully actuated). However, for purposes of explaining the functionality and interaction of the actuating button 112 with the body 110, the term "actuation state" as it relates to the overcap assembly 102 shown in FIG. 26 refers to what is, in fact, a fully actuated state of the overcap assembly 102.

With reference still to FIGS. 14 and 26, when a user exerts a force on the landing area 314 of the actuating button 112 to translate the actuating button 112 from its non-actuation state, the first and the second exit aperture 130, 132 move from a first position to a second position. Referring to FIG. 14, the actuating button 112 remains in the non-actuation state due to the force of the valve spring (not shown) until a user presses downwardly on the landing area 314 of the actuating button 112 to translate and/or rotate the actuating button 112 from the non-actuation state to the actuation state. Referring now to FIG. 26, the actuating button 112 is shown translated vertically downward and rotated in a clockwise direction about the pivot point 338 to the actuation state. As discussed above, the actuating button 112 remains in the actuation state until a user releases the landing area 314 of the actuating button 112 to allow translation and/or rotation of the actuating button 112 from the actuation state (FIG. 26) back to the non-actuation state (FIG. 14).

Figure 27:
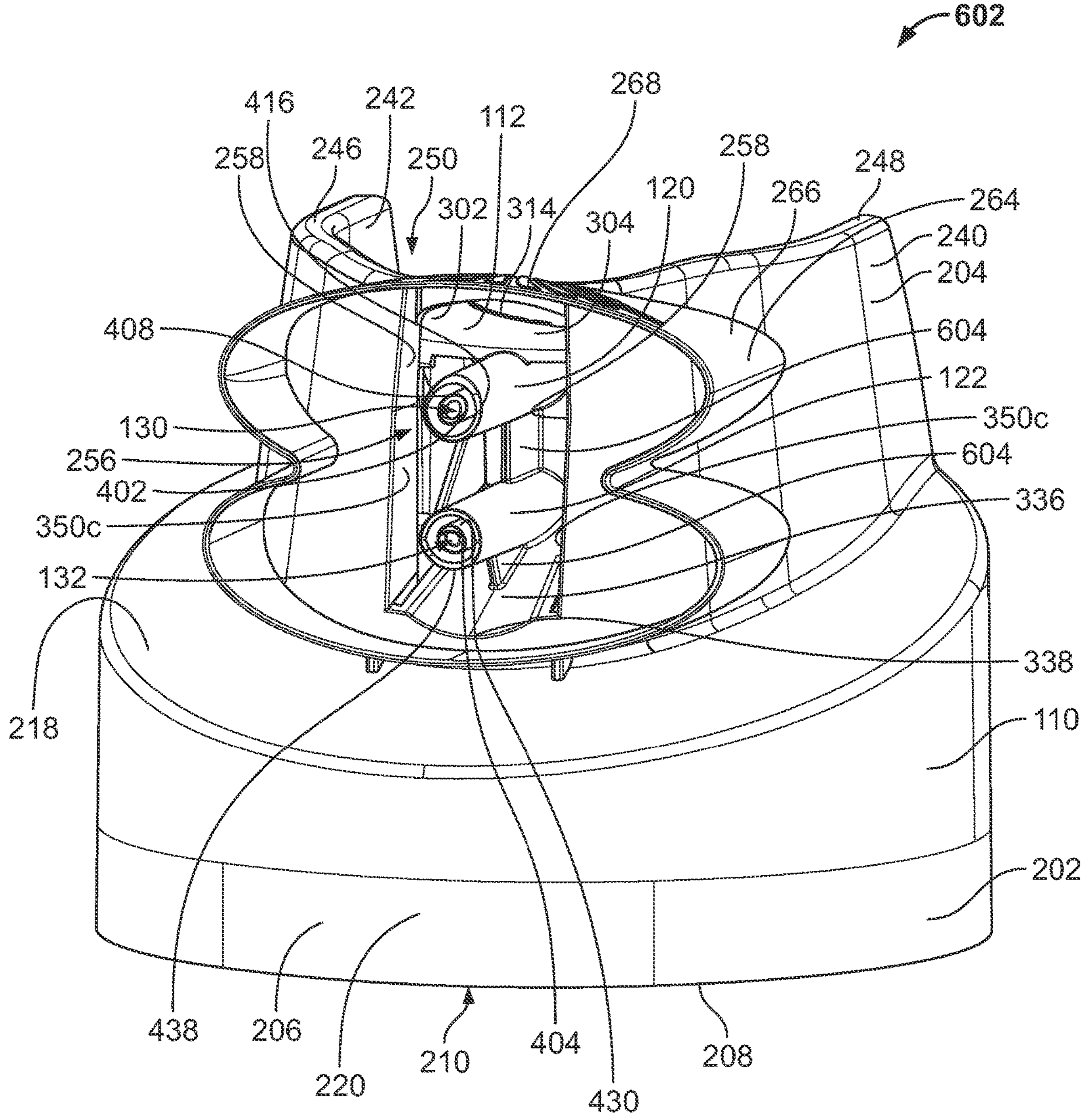
FIG. 27 is a top, front isometric view of another overcap assembly, according to another embodiment of the present disclosure.
Figure 28:
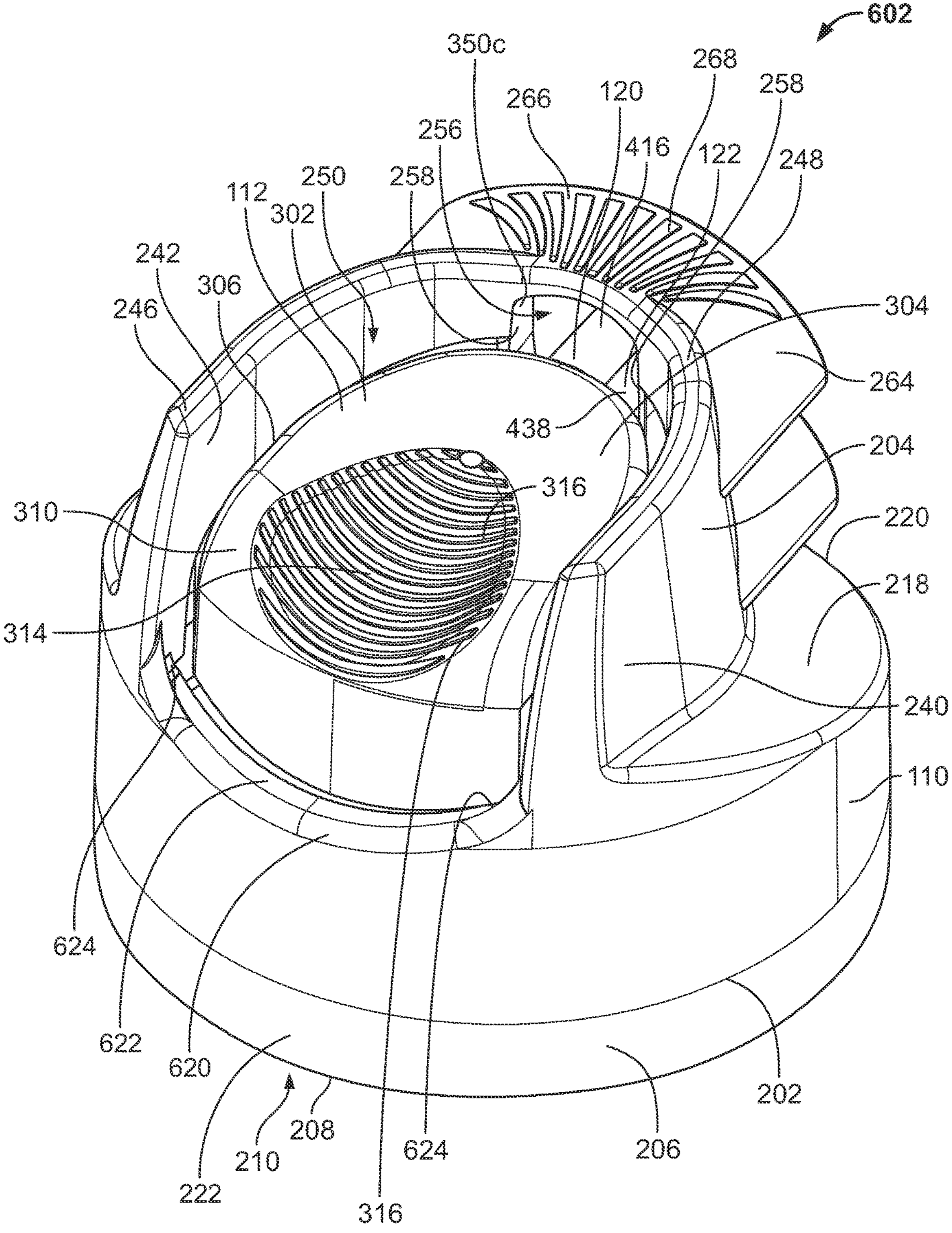
FIG. 28 is a top, rear isometric view of the overcap assembly of FIG. 27.
Figure 29:
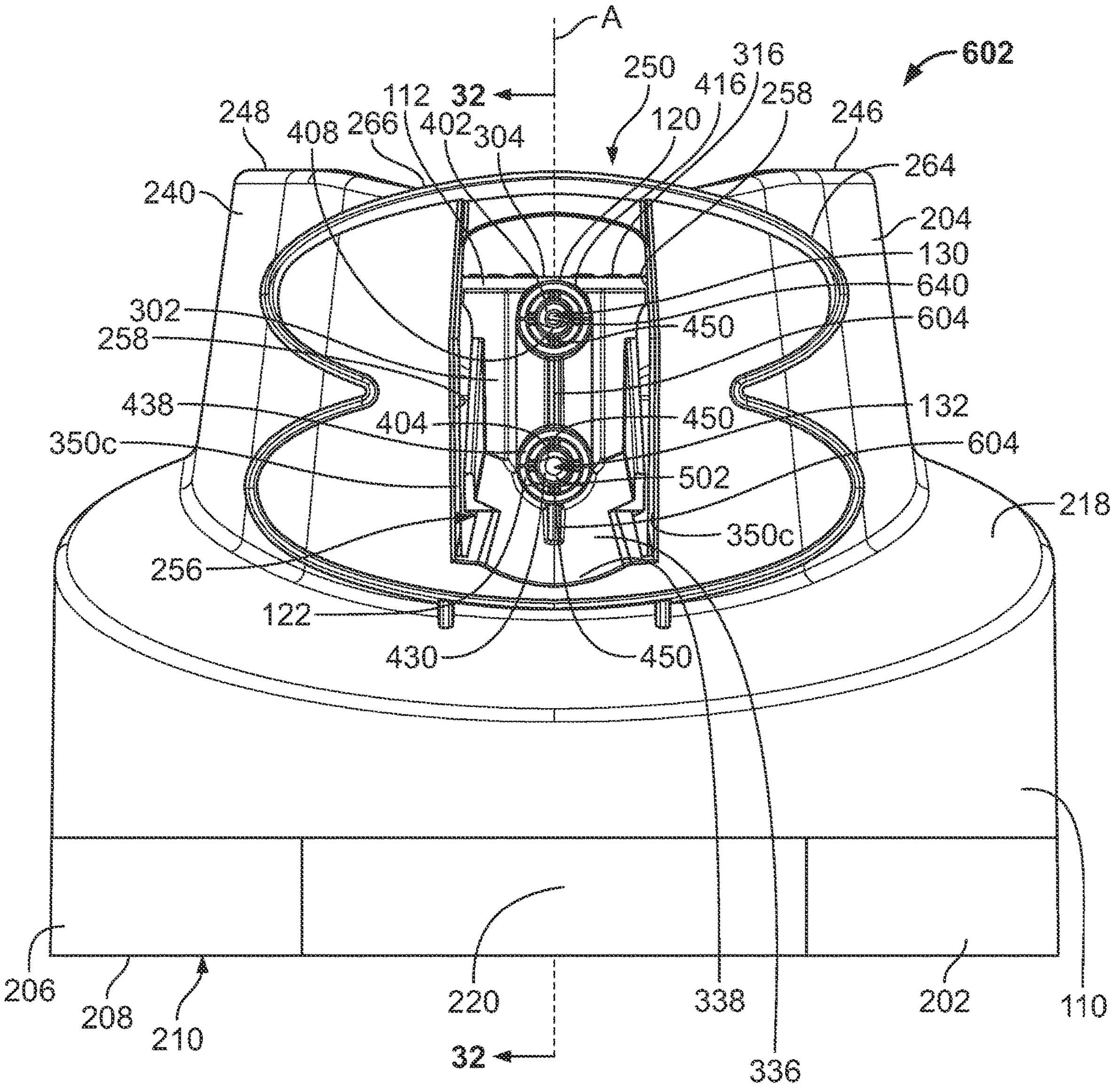
FIG. 29 is a front elevational view of the overcap assembly of FIG. 27.
Figure 30:
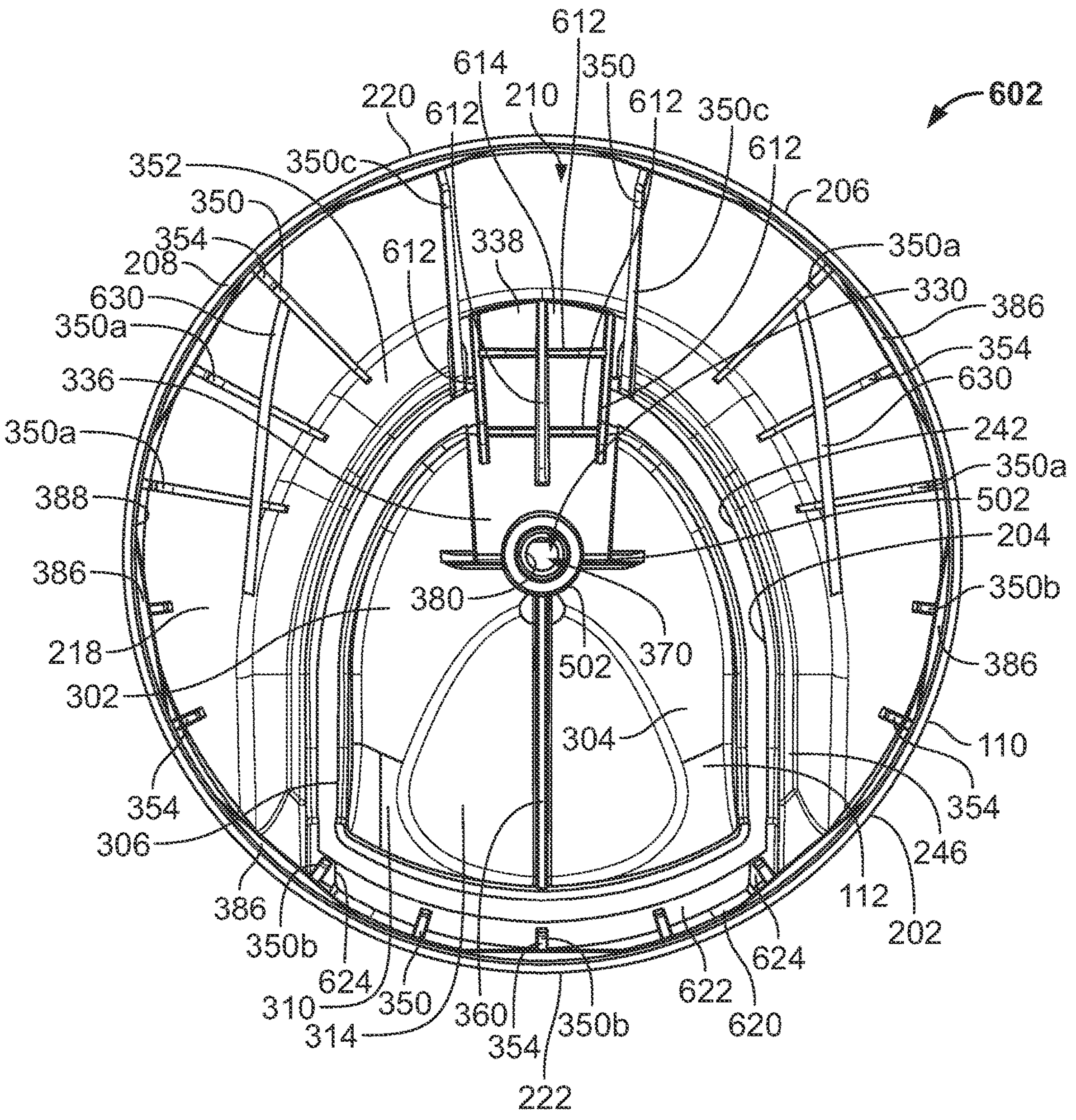
FIG. 30 is a bottom plan view of the overcap assembly of FIG. 27.
Figure 31:
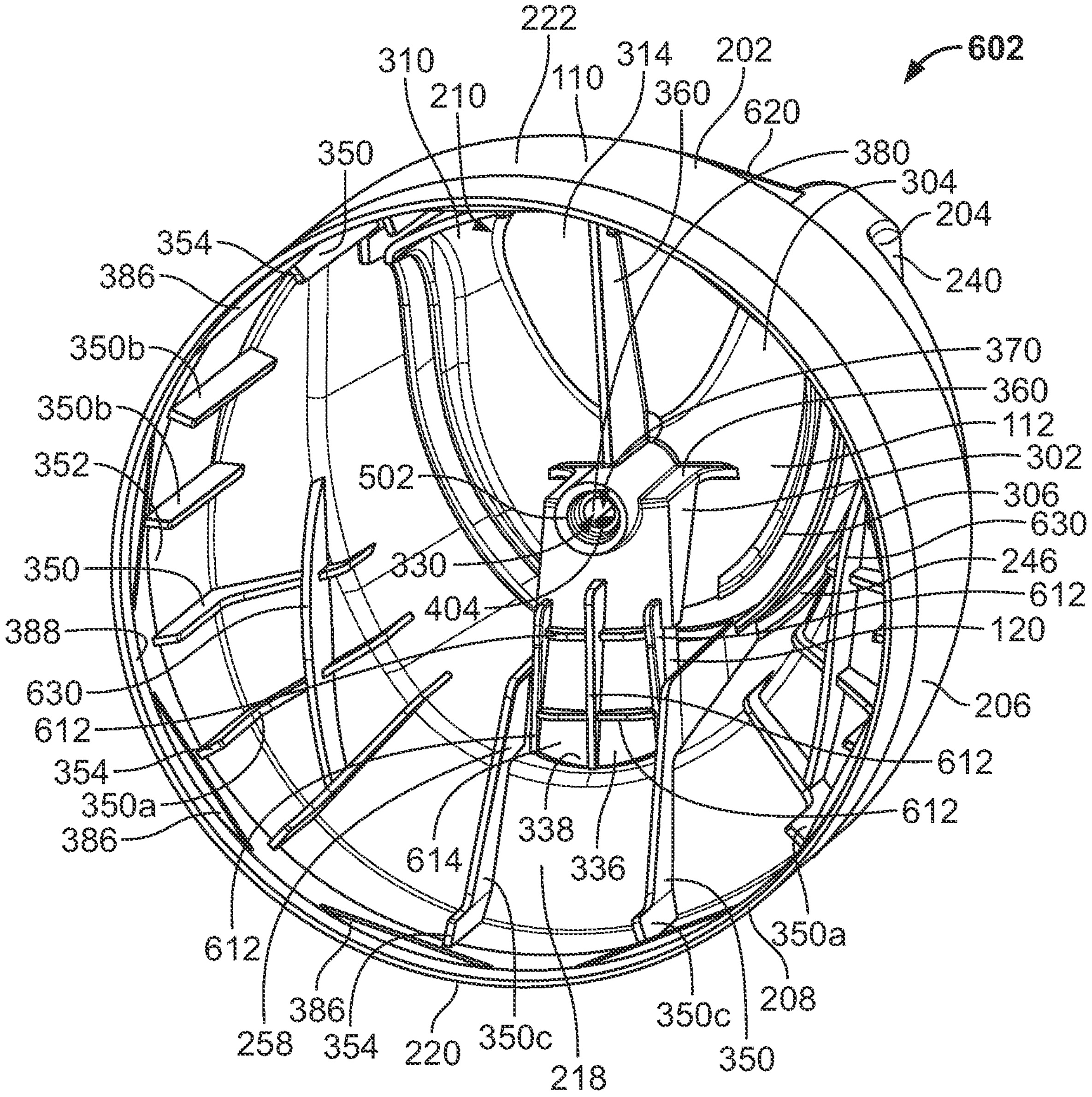
FIG. 31 is a bottom, rear isometric view of the overcap assembly of FIG. 27.
Figure 32:
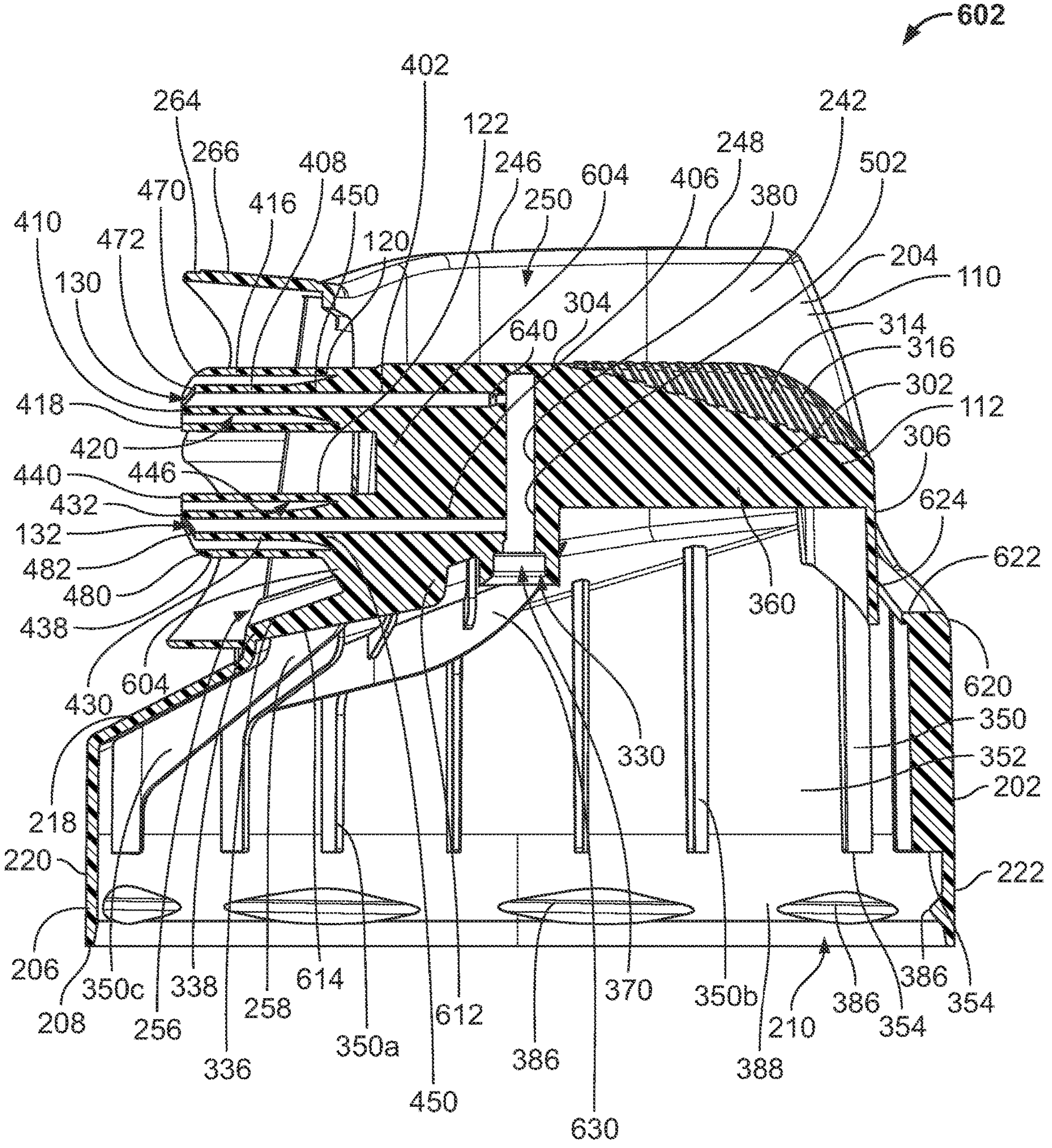
FIG. 32 is a side cross-sectional view of the overcap assembly of FIG. 27 taken along line 32-32 of FIG. 29.

With reference to FIGS. 27-32, like reference numbers are used with regard to an alternative embodiment of an overcap assembly 602. As noted herein, the overcap assembly 602 is configured to attach to the container 104 (see FIG. 2) and is substantially similar to the overcap assembly 102 except for a few differences, which will be explained in detail below. As illustrated in FIGS. 27, 29, and 32, the actuating button 112 of the overcap assembly 602 comprises gussets 604 that extend between the first and the second nozzle 120, 122 and between the second nozzle 122 and the bridge 336. As noted herein, the gussets 604 extend farther outward from the actuator body 302 than the gussets 342 (see FIGS. 7 and 14). Therefore, the gussets 604 are able to provide additional stability and support to the first and the second nozzle 120, 122 and the actuating button 112. As discussed above, the gussets 604 keep the first and the second nozzle 120, 122 aligned and parallel while the actuating button 112 is under a torque force, e.g., when the user presses on the actuating button 112 to dispense the fluid. Therefore, the fluid streams exiting the first and the second nozzle 120, 122 are consistent each time the actuating button 112 is depressed.

With reference to FIGS. 27 and 29-32, the bridge 336 comprises a concave geometry (see FIG. 29). In alternative embodiments, the bridge 336 may comprises any type of geometry, e.g., flat or splined geometry. As illustrated in FIGS. 30 and 31, the bridge 336 also comprises a plurality of reinforcing ribs 612 on an underside 614 of the bridge 336. The plurality of reinforcing ribs 612 extend horizontally and generally vertically along the underside 614 of the bridge 336. The concave geometry of the bridge 336 and the plurality of reinforcing ribs 612 help to limit side-to-side movement of the bridge 336 and the actuating button 112 during actuation. Therefore, the concave geometry of the bridge 336 and the plurality of reinforcing ribs 612 incline the actuating button 112 to track closer to a centerline of the actuating button 112, of which the cross sectional view of FIG. 32 defines the centerline of the actuating button 112 of the overcap assembly 602. In some embodiments, the underside 614 of the bridge 336 may comprise more or fewer reinforcing ribs 612 than shown.

With reference to FIG. 28, the body 110 of the overcap assembly 602 comprises a lip 620 in the rear portion 222 of the body 110. The lip 620 extends upward along the inner wall 242 of the upper portion 204 of the body 110 on both sides of the overcap assembly 602. In particular, the lip 620 comprises a generally concave shape as it extends between both sides of upper portion 204. A recessed wall 622 extends from the lip 620 and toward the actuating button 112. As illustrated in FIG. 28, outer edges 624 of the recessed wall 622 are positioned behind the lip 620. In preferred embodiments, the outer edges 624 of the recessed wall 622 also extend upward along the inner wall 242 of the upper portion 204 of the body 110 on both sides of the overcap assembly 602. However, in some embodiments, the outer edges 624 may not extend upward along the inner wall 242 of the upper portion 204 of the body 110. As illustrated in FIG. 32, the recessed wall 622 extends generally straight from the lip 620 and toward the actuating button 112, however, in some embodiments, the recessed wall 622 may extend upwards at a slight angle from the lip 620 and toward the actuating button 112. The lip 620 and the recessed wall 622 help give the overcap assembly 602 additional structural support.

With reference to FIGS. 30 and 31, the overcap assembly 602 includes additional guiding ribs 350 than previously shown (see the overcap assembly 102 in FIGS. 11-13). In particular, the overcap assembly 602 incudes about twice as many guiding ribs 350 than the overcap assembly 102. As illustrated in FIGS. 30 and 31, the body 110 of the overcap assembly 602 includes curved ribs 630 that extend along the angled step 218 of the body 110 and through the guiding ribs 350*a*. The curved ribs 630 extend on opposite sides of the body 110 and are generally symmetrical about the center line of the overcap assembly 602. The additional guiding ribs 350 and the curved ribs 630 add additional structural support to the overcap assembly 602. Specifically, the additional guiding ribs 350 and the curved ribs 630 increase the overcap assembly's 602 ability to withstand higher top load forces for package distribution requirements, i.e., the overcap assembly 602 is able to be stored longer without the overcap assembly 602 collapsing. The increased structural support also allows the overcap assembly 602 to have a longer life span. As illustrated in FIG. 30, the overcap assembly 602 includes two curved ribs 630, however, in alternative embodiments, the overcap assembly 602 may include more or fewer curved ribs 630.

With reference to FIG. 32, the first horizontal conduit 402 comprises a choke 640 near the vertical conduit 380. As illustrated in FIG. 32, the choke 640 causes the diameter of the first horizontal conduit 402 to increase from its initial diameter which is connected with the vertical conduit 380. The choke 640 helps balance the discharge rate of the fluid between the first horizontal conduit 402 and the second horizontal conduit 404. In some embodiments, the second horizontal conduit 404 may also include a choke similar to the choke 640 in the first horizontal conduit 402. In other embodiments, the first horizontal conduit 402 may not include the choke 640. Further, in some embodiments, the overcap assembly 602 may include a third nozzle, as discussed above.

As noted herein, the overcap assembly 602 functions the same as the overcap assembly 102. In particular, once the actuating button 112 of the overcap assembly 602 is depressed, fluid from the valve stem 184 of the container 104 (see FIG. 2) moves through the fluid passageway 330 (see FIG. 30) and out one of the first and the second exit aperture 130, 132. The first and the second exit aperture 130, 132 of the overcap assembly 602 comprise a spherical angled cut in order to direct the fluid in diverging directions, similar as described above with respect to the overcap assembly 102. Furthermore, the overcap assembly 602 comprises the same manifold 502 as the overcap assembly 102. Thus, the overcap assembly 602 comprises the same vertical conduit 380, the first horizontal conduit 402, and the second horizontal conduit 404 as the overcap assembly 102.

Figure 33:
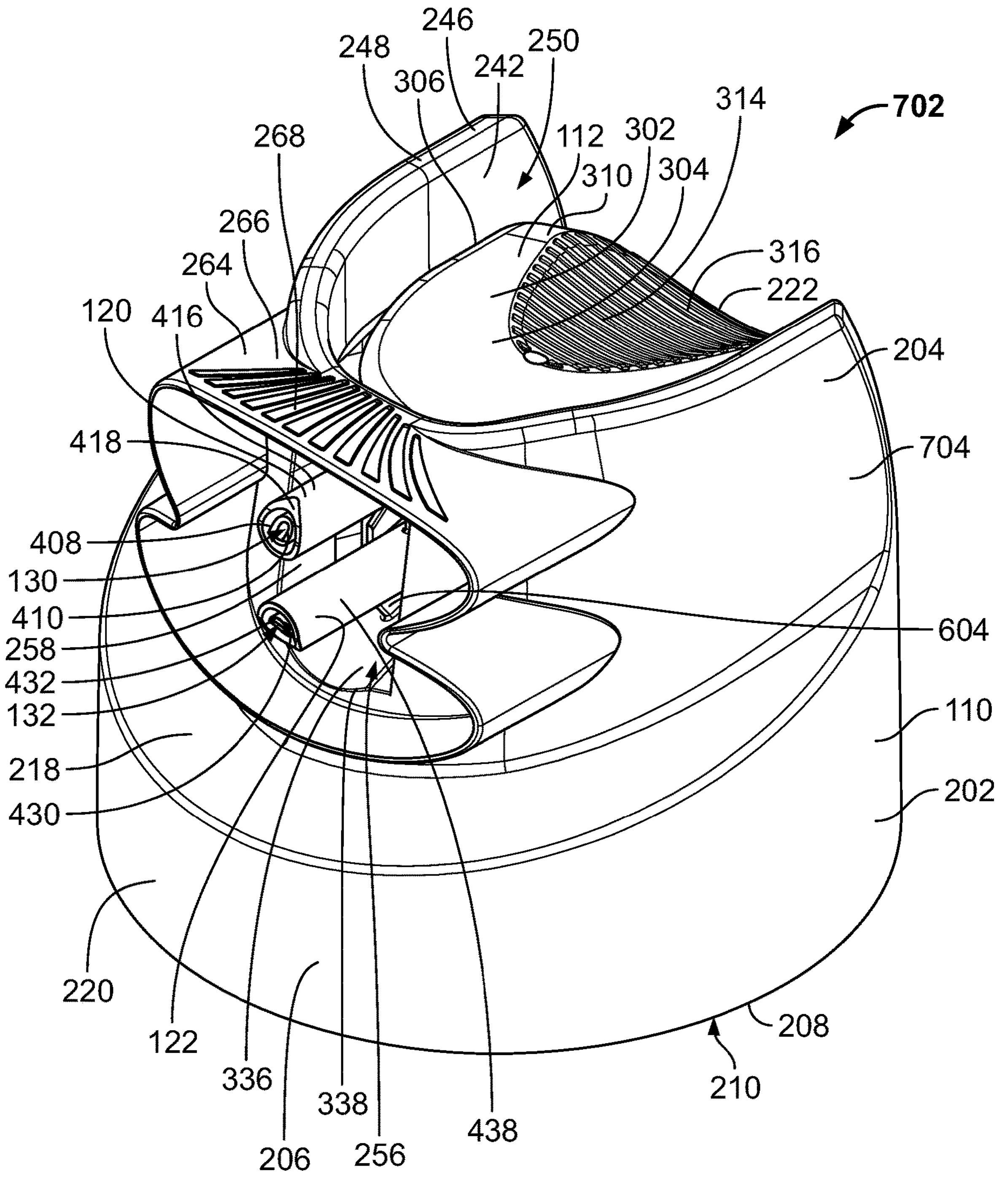
FIG. 33 is a top, front isometric view of yet another overcap assembly, according to another embodiment of the present disclosure.
Figure 34:
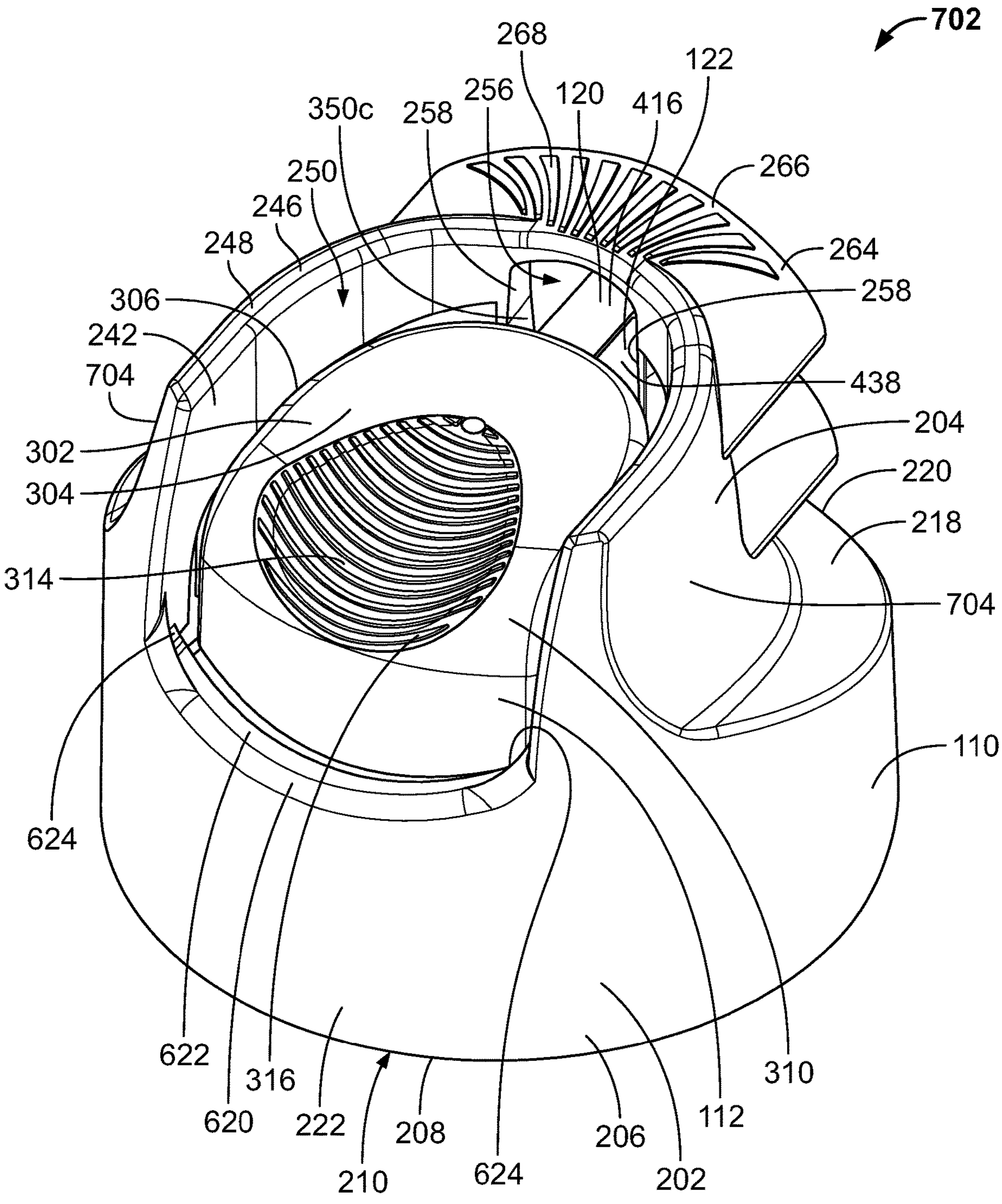
FIG. 34 is a top, rear isometric view of the overcap assembly of FIG. 33.
Figure 35:
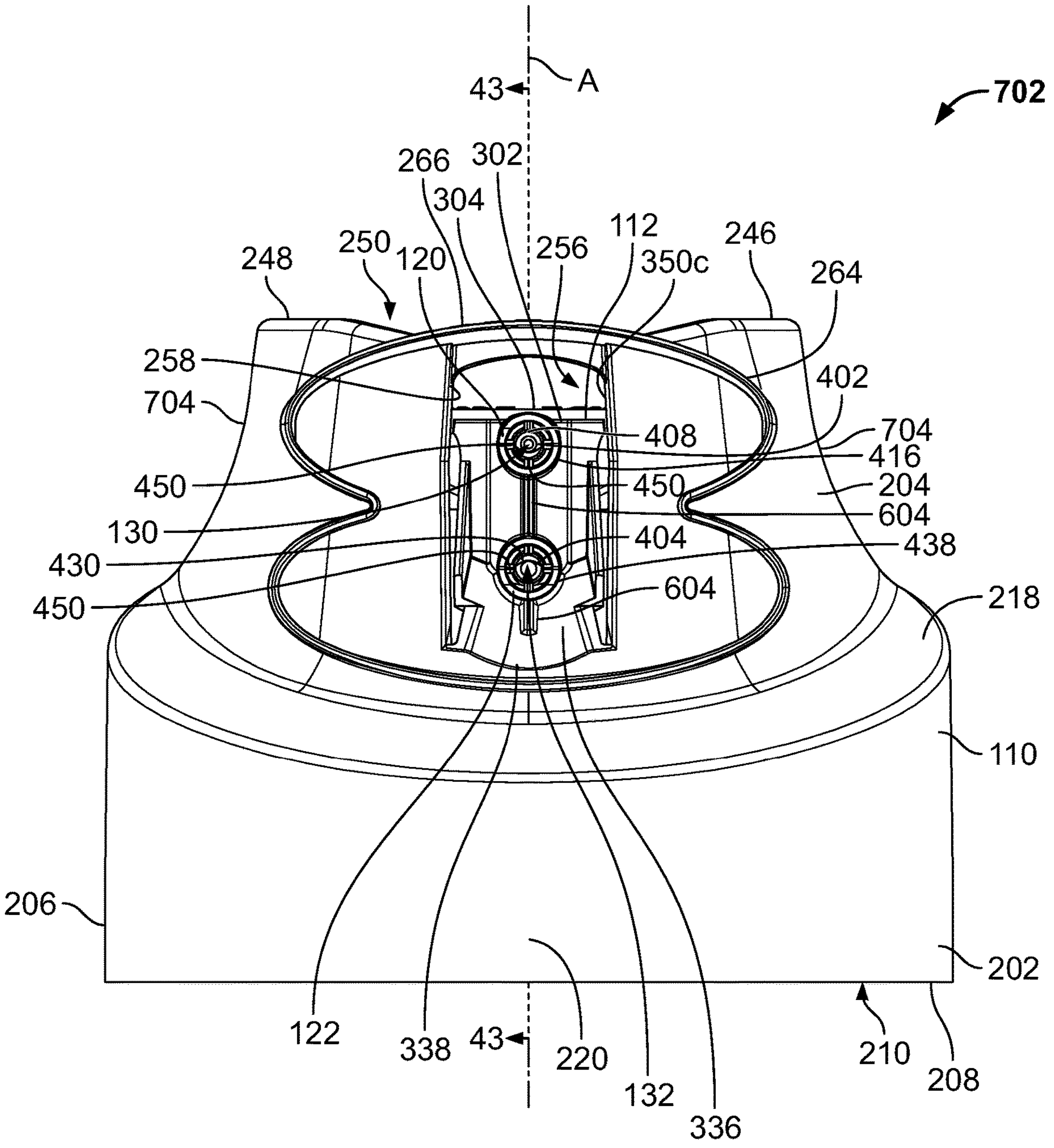
FIG. 35 is a front elevational view of the overcap assembly of FIG. 33.
Figure 36:
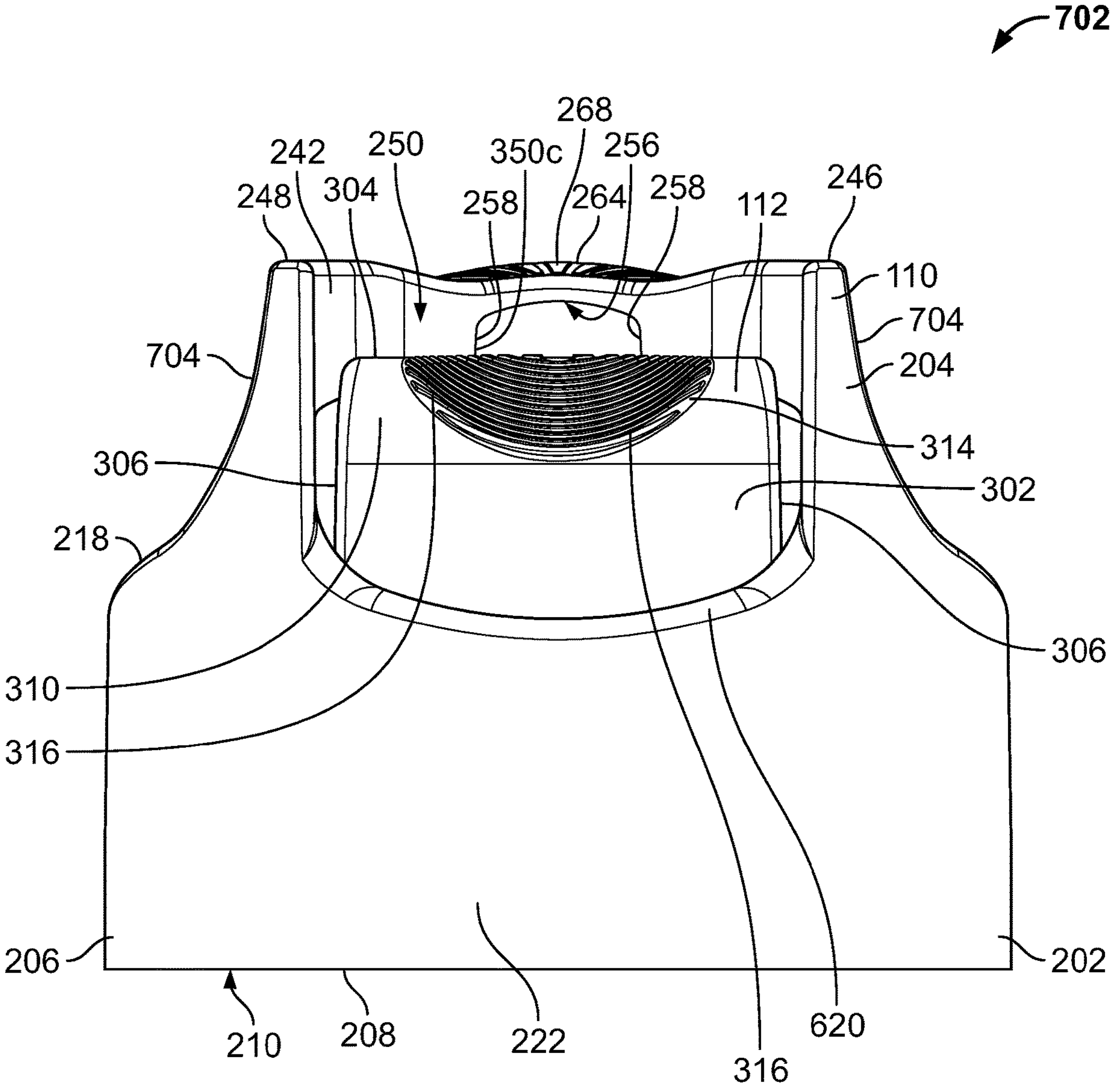
FIG. 36 is a rear elevational view of the overcap assembly of FIG. 33.
Figure 37:
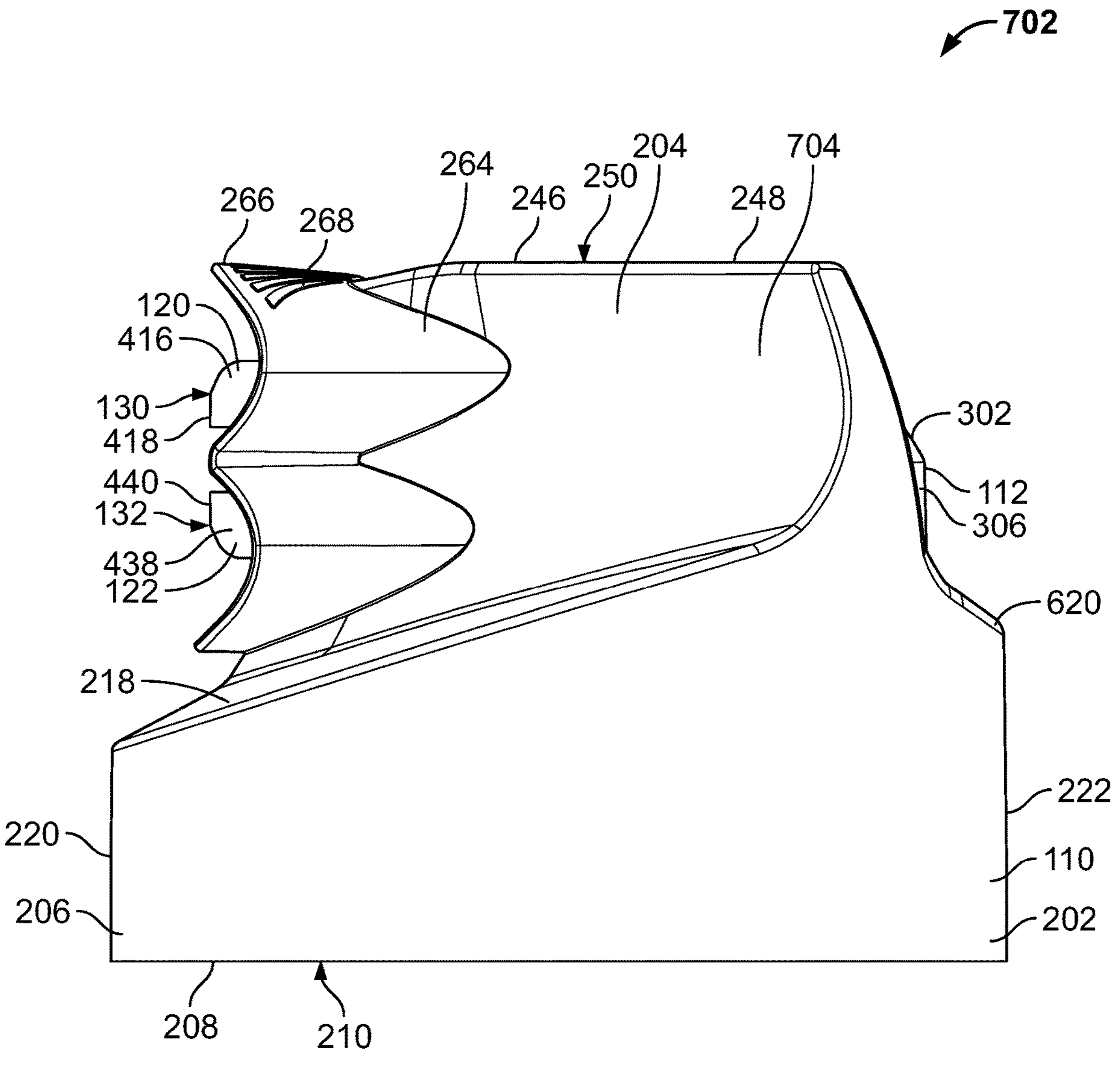
FIG. 37 is a right side elevational view of the overcap assembly of FIG. 33.
Figure 38:
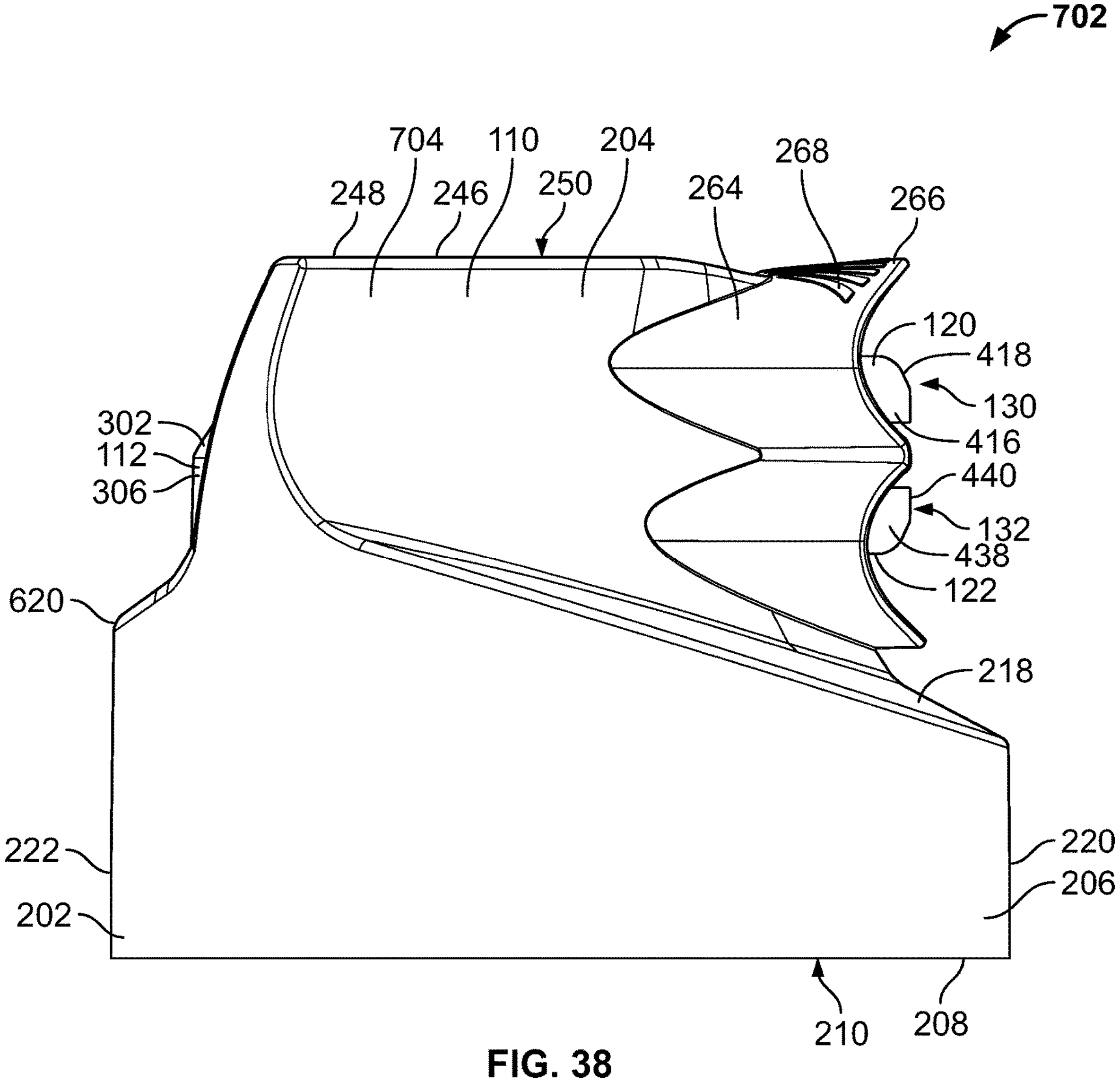
FIG. 38 is a left side elevational view of the overcap assembly of FIG. 33.
Figure 39:
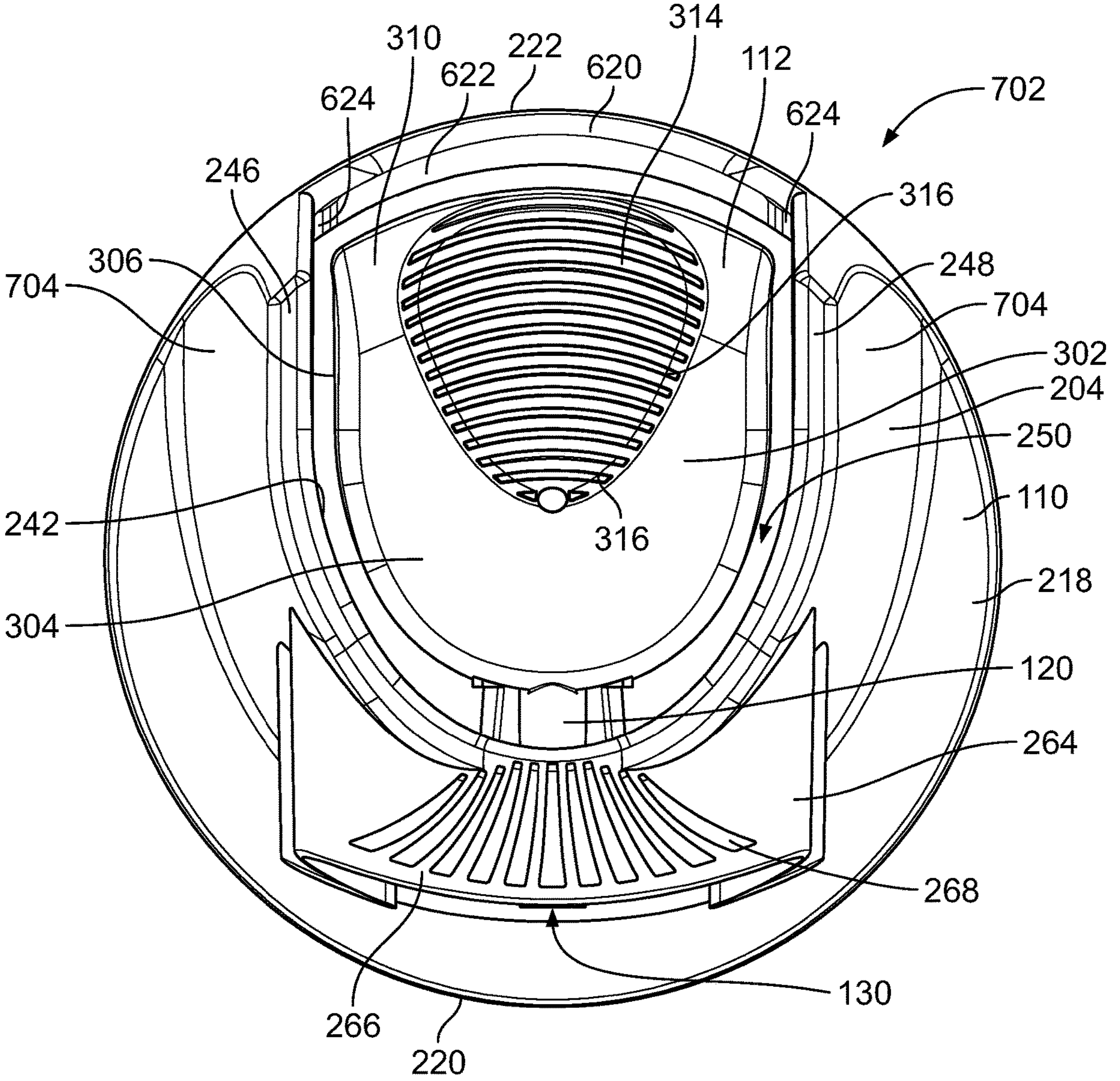
FIG. 39 is a top plan view of the overcap assembly of FIG. 33.

With reference to FIGS. 33-43, like reference numbers are used with regard to another alternative embodiment of an overcap assembly 702. As noted herein, the overcap assembly 702 is configured to attach to the container 104 (see FIG. 2) and is substantially similar to the overcap assembly 102, 602 except for a few differences, which will be explained in detail below. As illustrated in FIGS. 33, 35, and 36, the upper portion 204 of the body 110 of the overcap assembly 702 comprises a curved outer wall 704. As illustrated in FIG. 35, the curved outer wall 704 generally curves toward the longitudinal axis A from the angled step 218 and ends at the top edge 248 of the body 110. The curved outer wall 704 defines a generally concave shape when viewing the overcap assembly 702 from the right and left sides (see FIG. 35). Further, the curved outer wall 704 is more pronounced near the right and left sides of the body 110 than the front portion 220 of the body 110 (see FIGS. 33 and 35). As illustrated in FIG. 36, the curved outer wall 704 also creates a smoother transition between the curved outer wall 704, the angled step 218, and the lower portion 202 of the body 110.

With reference to FIG. 35, the curved outer wall 704 of the body 110 extends farther down toward the lower portion 202 of the body 110 than the outer wall 240 of the overcap assembly 102, 602. As a result, the angled step 218 in the overcap assembly 702 is smaller, i.e., has a smaller surface area, than the angled step 218 in the overcap assembly 102, 602 (see FIGS. 7 and 29). As noted herein, the curved outer wall 704 of the body 110 of the overcap assembly 702 increases the top load capability of the overcap assembly 702. Specifically, the curved outer wall 704 increases the overcap assembly's 702 ability to withstand higher top load forces for package distribution requirements, i.e., the overcap assembly 702 is able to be stored longer without the overcap assembly 702 collapsing. The curved outer wall 704 also allows the overcap assembly 702 to have a longer life span. As illustrated in FIG. 35, unlike the overcap assembly 102, 602, the horn 264 of the overcap assembly 702 is not connected to the angled step 218. However, in some embodiments, the horn 264 of the overcap assembly 702 may comprise various ribs or supports that connect with the angled step 218.

Figure 40:
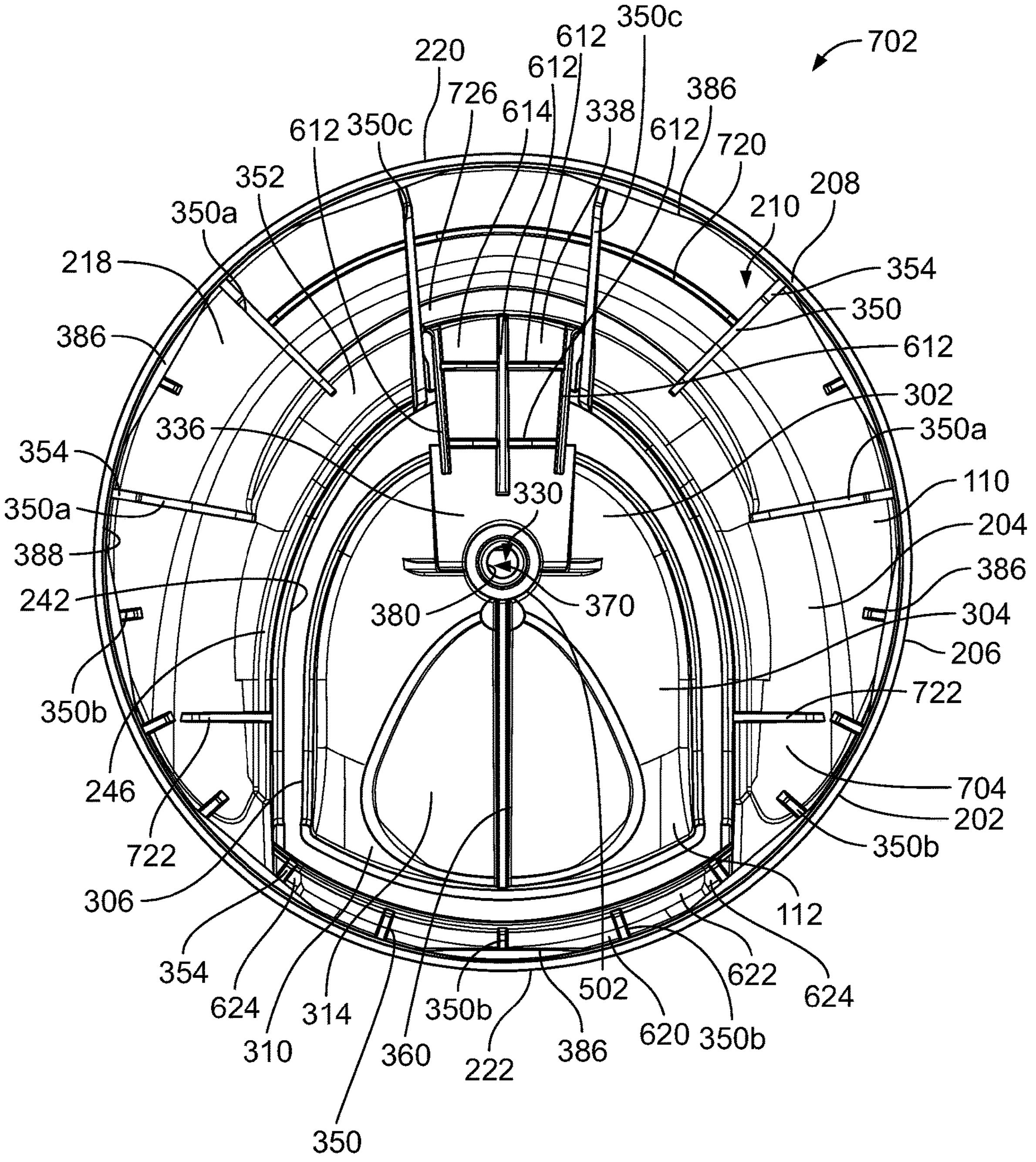
FIG. 40 is a bottom plan view of the overcap assembly of FIG. 33.
Figure 41:
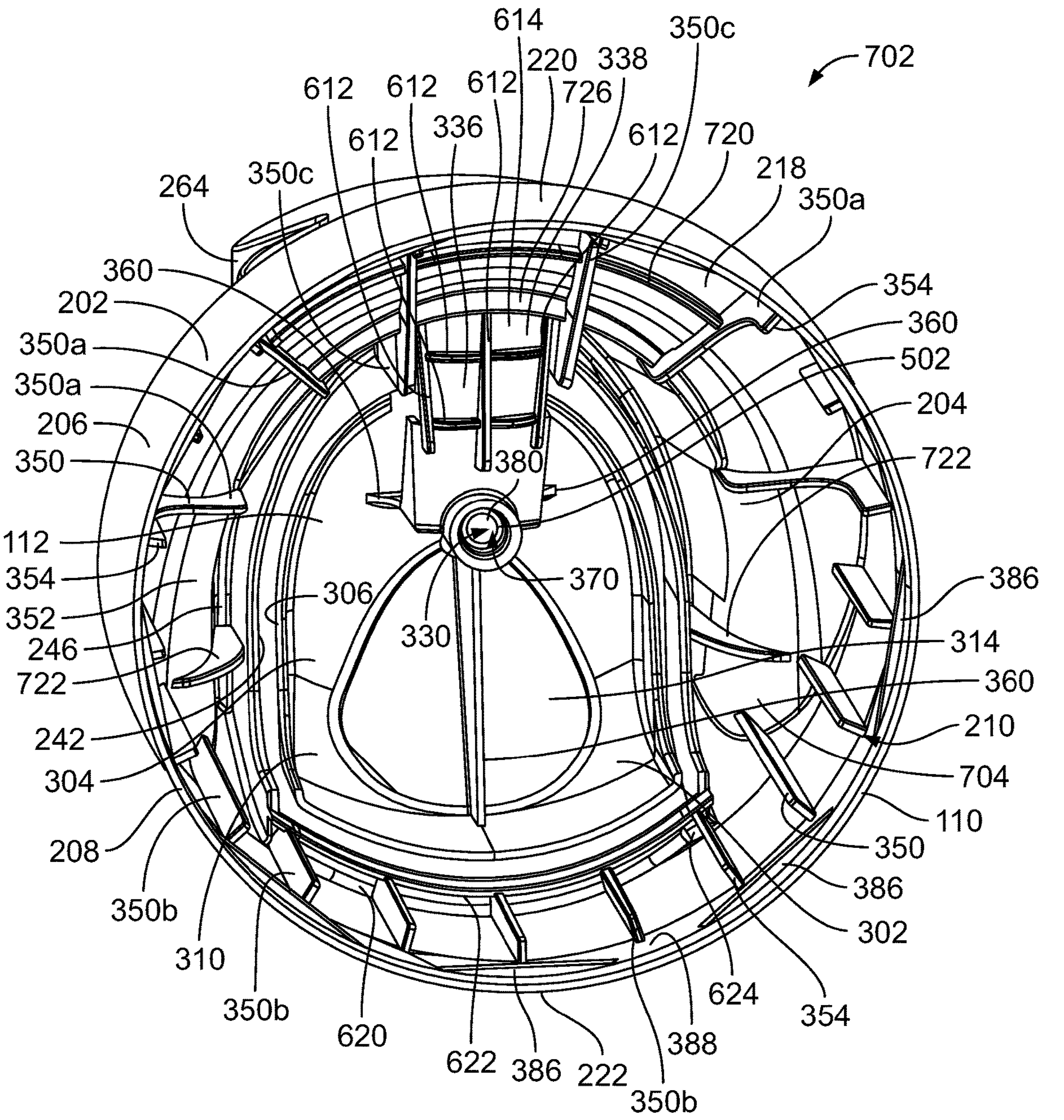
FIG. 41 is a bottom, front isometric view of the overcap assembly of FIG. 33.

With reference to FIGS. 40 and 41, the overcap assembly 702 includes a different configuration of the guiding ribs 350 than previously shown (see the overcap assembly 102 in FIGS. 11-13 and the overcap assembly 602 in FIGS. 30 and 31). In particular, the overcap assembly 702 includes more guiding ribs **350*a* and a different configuration of guiding ribs 350*b* than the overcap assembly 102, 602. Further, the body 110 of the overcap assembly 702 includes a rounded rib 720 that extends along the angled step 218 of the body 110 and through some of the guiding ribs 350*b*. The rounded rib 720 is positioned near the front portion 220 of the body 110 and forms a crescent like shape that extends through the two guiding ribs 350*c*. As illustrated in FIG. 40, the rounded rib 720 starts and ends at one of the guiding ribs 350*b*. However, in some embodiments, the rounded rib 720** may extend farther or shorter than shown.

Figure 43:
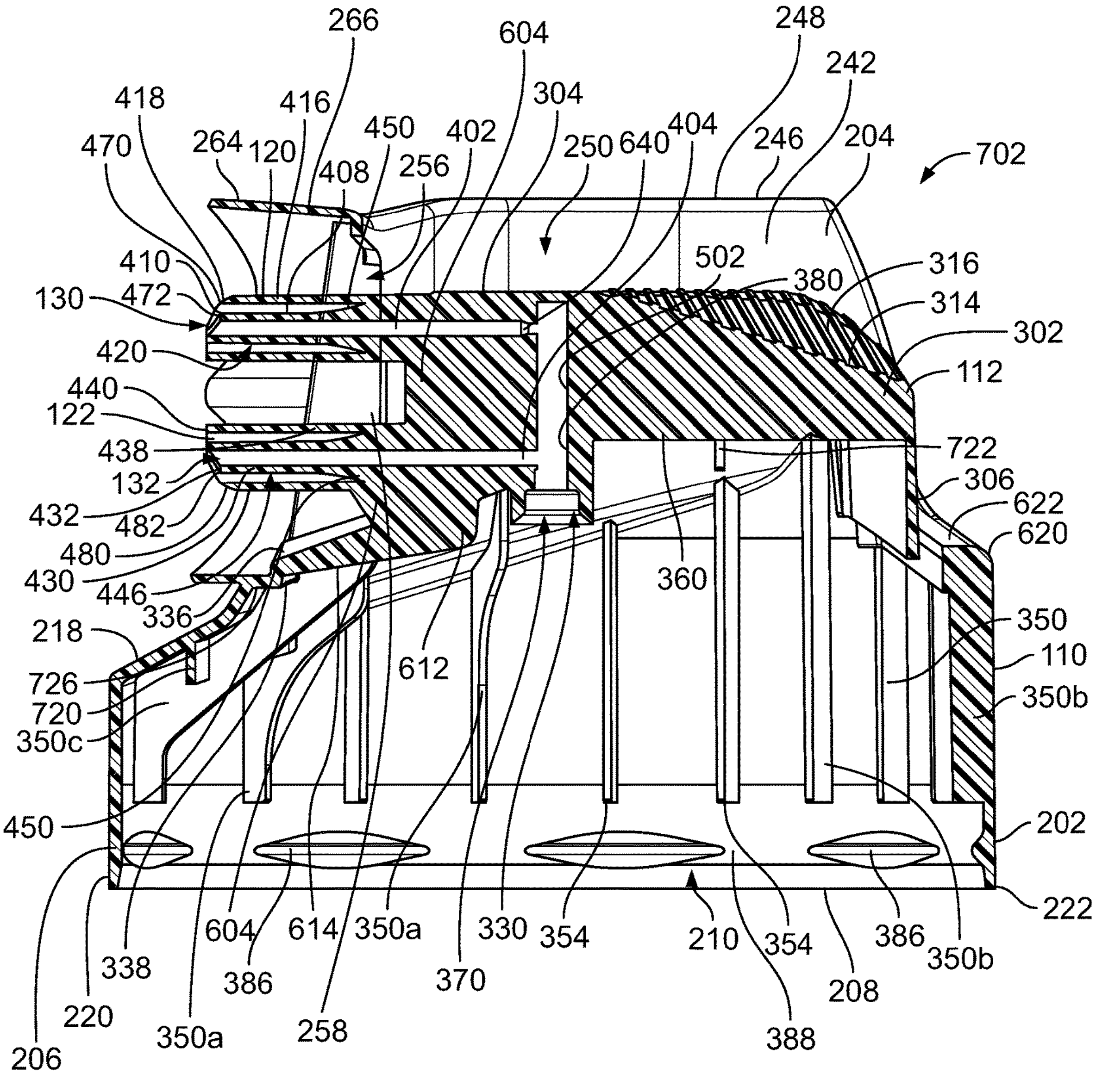
FIG. 43 is a side cross-sectional view of the overcap assembly of FIG. 33 taken along line 43-43 of FIG. 35.

With reference still to FIGS. 40 and 41, the overcap assembly 702 also comprises an upper wall rib 722 on both sides of the body 110. The upper wall ribs 722 are elongated round ribs (saber-tooth shaped) that extend from a lower portion of the curved outer wall 704 (adjacent the angled step 218) to the top wall 246 of the body 110. The upper wall ribs 722 are also connected with the inner wall 242 of the body 110. The additional guiding ribs 350, the rounded rib 720, and the upper wall ribs 722 add additional structural support to the overcap assembly 702. Specifically, the additional guiding ribs 350, the rounded rib 720, and the upper wall ribs 722 increase the overcap assembly's 702 ability to withstand higher top load forces for package distribution requirements and/or support the curved outer wall 704 of the body 110. In some embodiments, the body 110 of the overcap assembly 702 may comprise more or fewer rounded ribs 720 and/or upper wall ribs 722 than shown. As illustrated in FIGS. 40, 41, and 43, the overcap assembly 702 also comprises a ledge 726 positioned between the rounded rib 720 and the plurality of reinforcing ribs 612 on the underside 614 of the bridge 336. The ledge 726 extends along a similar path as the rounded rib 720.

With reference to FIG. 43, similar to the overcap assembly 602, the overcap assembly 702 comprises the choke 640 within the first horizontal conduit 402 near the vertical conduit 380. As discussed above, the choke 640 causes the diameter of the first horizontal conduit 402 to increase from its initial diameter, which is connected with the vertical conduit 380. The choke 640 helps balance the discharge rate of the fluid between the first horizontal conduit 402 and the second horizontal conduit 404. In particular, the choke 640 can increase the speed and/or pressure of the fluid that extends through the first horizontal conduit 402. As noted herein, the choke 640 can comprise any diameter gradient in the first horizontal conduit 402 in order to achieve the desired spray characterizes. For example, in some embodiments, the choke 640 may increase the diameter of the first horizontal conduit 402 more or less than shown. Further, in some embodiments, the second horizontal conduit 404 may also include a choke similar to the choke 640 in the first horizontal conduit 402. In other embodiments, the first horizontal conduit 402 may not include the choke 640 (see FIG. 14). Furthermore, in some embodiments, the first horizontal conduit 402 and/or the second horizontal conduit 404 may comprise a choke with a decreasing diameter, i.e., the diameter within the first horizontal conduit 402 and/or the second horizontal conduit 404 decreases from its initial diameter. Further, in some embodiments, the overcap assembly 702 may include a third nozzle, as discussed above.

Figure 42:
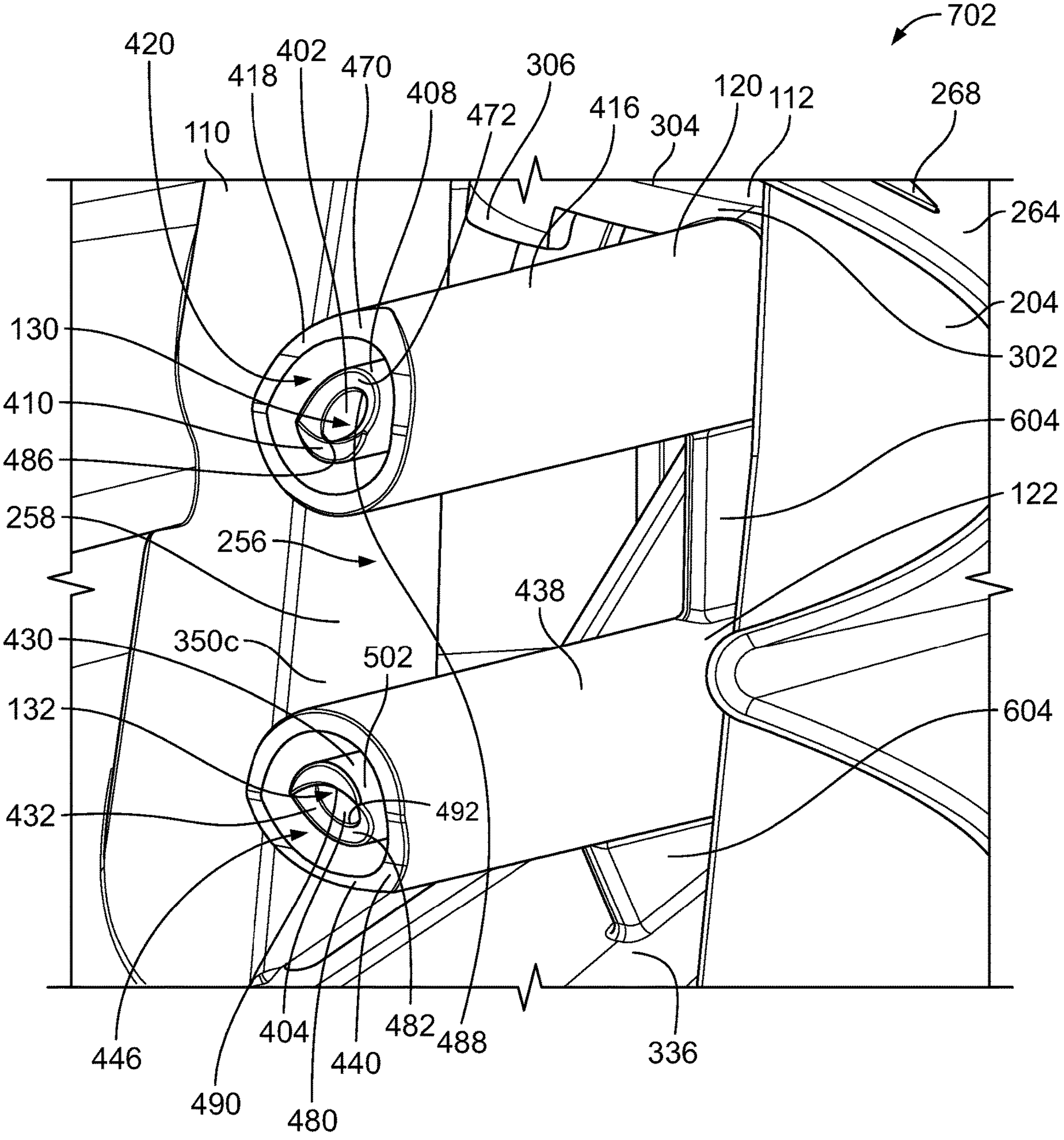
FIG. 42 is a top, front isometric view of a first and a second exit aperture of the overcap assembly of FIG. 33.

With reference to FIG. 42, the first and the second exit aperture 130, 132 of the overcap assembly 702 comprises a spherical angled cut that directs the fluid from the container 104 (see FIG. 2) in diverging directions, similar as described above with respect to the overcap assembly 102, 602. Further, as noted herein, the overcap assembly 702 functions the same as the overcap assembly 102, 602. In particular, once the actuating button 112 of the overcap assembly 702 is depressed, fluid from the valve stem 184 of the container 104 (see FIG. 2) moves through the fluid passageway 330 (see FIG. 43) and out one of the first and the second exit aperture 130, 132. Furthermore, the overcap assembly 702 comprises the same manifold 502 as the overcap assembly 102. Thus, the overcap assembly 702 comprises the same vertical conduit 380, the first horizontal conduit 402, and the second horizontal conduit 404 as the overcap assembly 102.

From the foregoing, it will be appreciated that the overcap assembly 102, 602, 702 allows for the fluid from the container 104 to flow through the manifold 502 and out the first and the second nozzle 120, 122 in diverging directions because of the spherical angled geometry at the first and the second exit aperture 130, 132. Since the fluid exits the overcap assembly 102, 602, 702 in diverging directions, the fluid can travel farther into the atmosphere from the overcap assembly 102, 602 and produce a larger spray profile or pattern on a target, thus allowing a larger area to receive the fluid from the container 104.

It is contemplated that the overcap assembly 102, 602, 702 disclosed herein may be mated with a container that has a non-vertical valve assembly or with a valve stem that requires angular motion for actuation. Further, while the teachings of the present overcap assemblies are particularly beneficial to containers having smaller footprints, the present embodiments could be utilized with any size container.

Any of the embodiments described herein may be modified to include any of the structures or methodologies disclosed in connection with different embodiments. Further, the present disclosure is not limited to aerosol containers of the type specifically shown. Still further, the overcaps of any of the embodiments disclosed herein may be modified to work with any type of aerosol or non-aerosol container.

INDUSTRIAL APPLICABILITY

Numerous modifications to the present invention will be apparent to those skilled in the art in view of the foregoing description. Accordingly, this description is to be construed as illustrative only and is presented for the purpose of enabling those skilled in the art to make and use the invention. The exclusive rights to all modifications which come within the scope of the appended claims are reserved.

We claim:

1. An overcap assembly, comprising:

a body configured to attach to a container;

an actuating button attached to and surrounded by the body, wherein the actuating button comprises a fluid passageway therein, and wherein the fluid passageway is configured to receive a fluid when the actuating button is depressed;

a first nozzle extending from the actuating button and in fluid communication with the fluid passageway, wherein the first nozzle comprises a first exit aperture; and a second nozzle extending from the actuating button and positioned below the first nozzle, wherein the second nozzle is in fluid communication with the fluid passageway, and wherein the second nozzle comprises a second exit aperture angled differently than the first exit aperture, wherein the first nozzle and the second nozzle each comprise an inner cylindrical wall and an outer cylindrical wall surrounding and spaced apart from the inner cylindrical wall.

2. The overcap assembly of claim 1, wherein the first exit aperture and the second exit aperture are configured to direct the fluid in diverging directions from one another immediately outside the first nozzle and the second nozzle, respectively, prior to the fluids expanding in the atmosphere.

3. The overcap assembly of claim 1, wherein the first nozzle and the second nozzle are parallel.

4. The overcap assembly of claim 1, wherein the actuating button defines a longitudinal axis, and wherein the first nozzle comprises a first longitudinal axis $C_1$ and the second nozzle comprises a second longitudinal axis $C_2$.

5. The overcap assembly of claim 4, wherein the inner cylindrical wall of the first nozzle extends farther from the longitudinal axis of the actuating button below the longitudinal axis $C_1$ than above it.

6. The overcap assembly of claim 4, wherein the inner cylindrical wall of the second nozzle extends farther from the longitudinal axis of the actuating button above the longitudinal axis $C_2$ than below it.

7. The overcap assembly of claim 1, wherein the outer cylindrical wall of the first nozzle comprises an outer distal end, and wherein a top portion of the outer distal end of the first nozzle is not vertically aligned with a bottom portion of the outer distal end of the first nozzle.

8. The overcap assembly of claim 1, wherein the outer cylindrical wall of the second nozzle comprises an outer distal end, and wherein a top portion of the outer distal end of the second nozzle is not vertically aligned with a bottom portion of the outer distal end of the second nozzle.

9. An overcap assembly configured to attach to a container, the overcap assembly comprising:

a body;

an actuator integrally attached with the body and defining a longitudinal axis, wherein the actuator comprises a fluid passageway extending therein, and wherein the fluid passageway is configured to receive a fluid when the actuator is depressed; and a first nozzle and a second nozzle extending laterally from the actuator, the first nozzle and the second nozzle define a portion of the fluid passageway, wherein the first nozzle comprises a first exit aperture and the second nozzle comprises a second exit aperture, and wherein the first nozzle and the second nozzle each comprise an inner cylindrical wall and an outer cylindrical wall surrounding and spaced apart from the inner cylindrical wall, wherein the first exit aperture is configured to direct the fluid immediately exiting the first exit aperture when the actuator is depressed, prior to the fluid expanding in the atmosphere, in a first direction and the second exit aperture is configured to direct the fluid immediately exiting the second exit aperture when the actuator is depressed, prior to the fluid expanding in the atmosphere, in a second direction, the first direction being non-parallel to the second direction.

10. The overcap assembly of claim 9, wherein the first direction diverges from the second direction.

11. The overcap assembly of claim 9, wherein the first nozzle and the second nozzle are orthogonal to the longitudinal axis.

12. The overcap assembly of claim 9, wherein the first exit aperture and the second exit aperture comprise a spherical opening.

13. The overcap assembly of claim 9, wherein each of the outer cylindrical walls defines an outer distal end, wherein each of the inner cylindrical walls defines an inner distal end, wherein a top portion of the outer distal end of the first nozzle is vertically aligned above a top portion of the inner distal end of the first nozzle, and wherein a bottom portion of the outer distal end of the second nozzle is vertically aligned below a bottom portion of the inner distal end of the second nozzle.

14. An overcap assembly configured to attach to a container, the overcap assembly comprising:

a body;

an actuator integrally attached with the body and defining a longitudinal axis, wherein the actuator comprises a fluid passageway extending therein;

a first nozzle extending laterally from the actuator, wherein the first nozzle comprises a first distal end that defines a first exit aperture, wherein a portion of the first distal end defines a curved surface, and wherein the first nozzle comprises a first longitudinal axis $C_1$; and a second nozzle extending from the actuator parallel to the first nozzle, wherein the second nozzle comprises a second distal end that defines a second exit aperture, wherein a portion of the second distal end defines a curved surface, wherein the second nozzle comprises a second longitudinal axis $C_2$, and wherein the second nozzle comprises a first inner cylindrical wall and a first outer cylindrical wall surrounding and spaced apart from the first inner cylindrical wall, wherein the first distal end includes an opening that is angled upward with respect to the longitudinal axis $C_1$ and that defines the first exit aperture, and the second distal end includes an opening that is angled downward with respect to the longitudinal axis $C_2$ and that defines the second exit aperture.

15. The overcap assembly of claim 14, wherein the first exit aperture and the second exit aperture are configured to direct a fluid in diverging directions from one another immediately outside the first nozzle and the second nozzle, respectively, prior to the fluids expanding in the atmosphere.

16. The overcap assembly of claim 14, wherein the first nozzle comprises a second inner cylindrical wall and a second outer cylindrical wall surrounding and spaced apart from the second inner cylindrical wall.

17. The overcap assembly of claim 16, wherein each of the first and second inner cylindrical walls defines an inner distal end, and wherein an angle Θ is measured from the first longitudinal axis $C_1$ to a topmost edge of the inner distal end of the first nozzle and from the second longitudinal axis $C_2$ to a bottom most edge of the inner distal end of the second nozzle.

18. The overcap assembly of claim 17, wherein the angle Θ of at least one of the first nozzle and the second nozzle is between about 100° and about 170°.

19. The overcap assembly of claim 17, wherein the angle Θ of at least one of the first nozzle and the second nozzle is at least 100°.

20. The overcap assembly of claim 17, wherein the angle Θ of at least one of the first nozzle and the second nozzle is between about 110° and about 150°.

* * * * *